(12) United States Patent
Diemel, Jr. et al.

(10) Patent No.: US 12,130,004 B2
(45) Date of Patent: Oct. 29, 2024

(54) MIRROR AND CABINET APPARATUS

(71) Applicant: Kohler Co., Kohler, WI (US)

(72) Inventors: Douglas J. Diemel, Jr., Kohler, WI (US); Alexander V. Letourneau, Sheboygan, WI (US); Sandeep Pawar, Maharashtra (IN)

(73) Assignee: Kohler Co., Kohler, WI (US)

( * ) Notice: Subject to any disclaimer, the term of this patent is extended or adjusted under 35 U.S.C. 154(b) by 86 days.

(21) Appl. No.: 17/850,642

(22) Filed: Jun. 27, 2022

(65) Prior Publication Data

US 2023/0014204 A1    Jan. 19, 2023

Related U.S. Application Data

(60) Provisional application No. 63/292,189, filed on Dec. 21, 2021, provisional application No. 63/245,290, filed on Sep. 17, 2021, provisional application No. 63/221,225, filed on Jul. 13, 2021, provisional application No. 63/221,182, filed on Jul. 13, 2021.

(51) Int. Cl.
  *F21V 33/00*    (2006.01)
(52) U.S. Cl.
  CPC .................. *F21V 33/004* (2013.01)
(58) Field of Classification Search
  CPC ..................................................... F21V 33/004
  See application file for complete search history.

(56) References Cited

U.S. PATENT DOCUMENTS

| | | | |
|---|---|---|---|
| 1,930,244 A | 10/1933 | Lewinsohn et al. |
| 2,201,251 A | 5/1940 | Van Patten |
| 2,313,838 A | 3/1943 | Nordquist |
| 2,331,655 A | 10/1943 | Colwill et al. |
| | (Continued) | |

FOREIGN PATENT DOCUMENTS

| | | | |
|---|---|---|---|
| DE | 2362102 B2 | 6/1977 |
| DE | 20115989 U1 | 2/2003 |
| | (Continued) | |

OTHER PUBLICATIONS

Search Report issued in European Application No. 22181992.3 on Nov. 24, 2022.

(Continued)

*Primary Examiner* — Julie A Bannan
(74) *Attorney, Agent, or Firm* — Lempia Summerfield Katz LLC

(57) ABSTRACT

The present invention is directed to improvements in mirror apparatus. In one embodiment, a lighted mirror apparatus is disclosed that comprises a mirror with first and second light assemblies positioned along opposing first and second sides of the mirror, each transmitting light to the center plane along a primary light path. In another embodiment, a lighted mirror apparatus is disclosed that comprises a mirror and a light assembly having a light source mounted to the mirror, the light assembly includes an illumination element that receives light from the light source and emits at least a portion of that light from its front light emitting surface. In a further embodiment, a cabinet apparatus is disclosed having a door that can be raised or lowered and altered between open and closed angular orientations when raised or lowered.

16 Claims, 45 Drawing Sheets

(56) References Cited

U.S. PATENT DOCUMENTS

| | | | |
|---|---|---|---|
| 2,609,485 A | 9/1952 | Holley | |
| 2,677,751 A | 5/1954 | Marchand | |
| 2,876,056 A | 3/1959 | Berger | |
| 3,038,771 A | 6/1962 | Schwartz et al. | |
| RE25,402 E | 6/1963 | Myerberg | |
| 3,526,763 A | 9/1970 | Dorfman | |
| 3,885,844 A | 5/1975 | Schneider | |
| 4,884,176 A | 11/1989 | Palka et al. | |
| 5,575,552 A * | 11/1996 | Faloon | B60Q 3/252 362/135 |
| 6,243,988 B1 | 6/2001 | Salice | |
| 6,430,778 B1 | 8/2002 | King | |
| 6,443,545 B1 | 9/2002 | Woerner | |
| 6,827,458 B2 | 12/2004 | Suga | |
| 7,152,991 B2 | 12/2006 | Jines et al. | |
| 7,367,704 B1 | 5/2008 | Chang | |
| 7,559,668 B1 | 7/2009 | Aubrey | |
| 8,167,474 B2 | 5/2012 | Tanoue et al. | |
| 8,246,126 B1 | 8/2012 | Weber | |
| 9,182,087 B2 | 11/2015 | Chen et al. | |
| 9,375,081 B2 | 6/2016 | Messing et al. | |
| 9,448,353 B2 | 9/2016 | Holman et al. | |
| 9,459,396 B1 | 10/2016 | Householder | |
| 9,675,172 B2 | 6/2017 | Pandorf et al. | |
| 10,436,970 B2 | 10/2019 | Durkee | |
| 10,551,051 B2 | 2/2020 | Smith et al. | |
| 10,605,431 B2 | 3/2020 | Vasylyev | |
| 10,687,618 B2 | 6/2020 | Diemel, Jr. et al. | |
| 10,791,829 B1 | 10/2020 | Carmichael | |
| 10,801,717 B2 | 10/2020 | Smith et al. | |
| 10,859,758 B2 | 12/2020 | Dau et al. | |
| 10,948,176 B1 | 3/2021 | Johnston et al. | |
| 2004/0202003 A1 | 10/2004 | Lyst, Jr. | |
| 2010/0296298 A1 | 11/2010 | Martin, Jr. | |
| 2012/0092888 A1 | 4/2012 | Hsieh | |
| 2014/0197720 A1 | 7/2014 | Sorbara et al. | |
| 2017/0038058 A1 | 2/2017 | Cano et al. | |
| 2018/0314001 A1 | 11/2018 | Veenstra et al. | |
| 2019/0285267 A1 | 9/2019 | Smith et al. | |
| 2019/0380487 A1 | 12/2019 | Sobolewski et al. | |

FOREIGN PATENT DOCUMENTS

| | | | |
|---|---|---|---|
| DE | 102005026594 A1 | 12/2006 | |
| DE | 102012003586 A1 | 8/2013 | |
| EP | 1944633 B1 | 7/2010 | |
| EP | 2327340 A1 | 6/2011 | |
| EP | 2327340 B1 | 5/2012 | |
| FR | 2718619 B1 | 7/1996 | |
| IT | UB20160280 A1 | 7/2017 | |
| JP | 5129781 B2 | 1/2013 | |
| JP | 5483428 B2 | 5/2014 | |
| JP | 5810322 B2 | 11/2015 | |
| JP | 5857270 B2 | 2/2016 | |
| JP | 5919515 B2 | 5/2016 | |
| JP | 201780289 * | 5/2017 | A47B 67/02 |
| JP | 6213805 B2 | 10/2017 | |
| WO | WO201180453 A1 | 7/2011 | |
| WO | 2012165190 A1 | 12/2012 | |
| WO | WO201346448 A1 | 4/2013 | |
| WO | WO2019015956 A1 | 1/2019 | |
| WO | WO2019197944 A1 | 10/2019 | |

OTHER PUBLICATIONS

Edison Opto Corp., PLCC Series, 2835 SE datasheet (2016), pp. 1-19.

Valcucine website, V Motion, https://www.valcucine.com/en/special-features/v-motion/ [retrieved Jun. 30, 2022], pp. 1-4.

Valcucine, Genius Loci kitchen, Valcucine Kitchens, Fuorisalone 2015, Milan Design Week 2015, YouTube video (2015), https://www.youtube.com/watch?t=110&v=5Er_FXnS9uQ&feature=youtu.be, [retrieved Jun. 30, 2022], p. 1.

Valcucine, Valcucine Logica Celata, Valcucine Kitchens, (2019), YouTube video (2019), https://www.youtube.com/watch?v=wzRVHHuL_Qo, [retrieved Jun. 30, 2022], p. 1.

Hafele website, Vertical Sliding Door Hardware, Finetta F-Line32 23A, https://www.hafele.com/us/en/product/vertical-sliding-door-hardware-finetta-f-line32-23a, [retrieved Jun. 30, 2022], pp. 1-3.

Salice website, Vertical Sliding System, https://www.salice.com/ww/en/products/lift-systems-and-flap-doors/lift-systems/mover-vertical-sliding-system-for-wall-cabinet-doors, [retrieved Jun. 30, 2022], pp. 1-3.

* cited by examiner

MIRROR AND CABINET APPARATUS

CROSS-REFERENCE TO RELATED PATENT APPLICATIONS

The present application claims the benefit of: (1) U.S. Provisional Application No. 63/292,189, filed on Dec. 21, 2021; (2) U.S. Provisional Application No. 63/245,290, filed on Sep. 17, 2021; (3) U.S. Provisional Application No. 63/221,182, filed on Jul. 13, 2021; and (4) U.S. Provisional Application No. 63/221,225 filed on Jul. 13, 2021, the entireties of which are hereby incorporated herein by reference.

BACKGROUND

Lighted mirrors are a well-known fixture in homes and other locations. Such mirrors do not direct light, however, in an ideal manner for illuminating a user of the mirror. For example, light may be directed out the side of the mirror but not sufficiently inward towards the user. There is need for a lighted mirror that directs a pleasing and even illumination in a direction ideal for illuminating a user's face and body.

Cabinets are used throughout the home and in certain office environments in order to store items out of sight but in an easily accessible location. For example, medicine cabinets are typically hung in a bathroom and include a mirrored door. People typically store items related to personal hygiene in medicine cabinets, such as deodorant, toothpaste, toothbrushes, hairbrushes, and medication. Some users have a desire to multi-task while performing various activities in the bathroom. For example, users may wish to watch a video on an electronic device to pass the time, take in information, or enhance their experience during a particular activity such as toothbrushing. Users may alternatively desire to read an article on an electronic device or in print while performing such activities. However, there is currently no way to support an electronic device, print article, or the like in such a way that it can be readily viewed by the user, will not be subjected to water damage, and can be easily stowed away when not in use. Thus, a need exists for improvements in the cabinet space that provide a user with a place to support certain articles off the countertop and within the user's field of view during personal hygiene activities.

BRIEF SUMMARY

The present disclosure is directed to a lighted mirror apparatus.

In one aspect, the lighted mirror apparatus comprises a mirror in a viewing state, the mirror having a front surface defining a mirror plane and a centerline, a center plane being orthogonal to and intersecting the mirror plane along the centerline; a first light assembly positioned along a first side of the mirror; and a second light assembly positioned along a second side of the mirror that is opposite the first side of the mirror; each of the first and second light assemblies configured to generate light and transmit the light to the center plane along a primary light path, each of the first and second light assemblies comprising a light source configured to generate light; a light guide member comprising a light output surface, the light output surface defining a first interface reference plane that intersects the center plane at an outwardly and rearwardly facing first acute angle ($\theta_1$); the light source optically coupled to the light guide member so that the light is guided through the light guide member to the light output surface along a first portion of the primary light path, the first portion of the primary light path forming a first angle of incidence ($\Phi_1$) with the light output surface; and the light output surface being part of a first multimedia interface that is configured to refract the light exiting the light output surface of the light guide member at a first angle of refraction ($\Psi_1$) along a second portion of the primary light path, wherein the first angle of refraction ($\Psi_1$) is greater than the first angle of incidence ($\Phi_1$).

In another aspect, the lighted mirror apparatus comprises a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane; each of the first and second light assemblies configured to generate light and refract a primary light path of the light toward center plane.

In another aspect, the lighted mirror apparatus comprises a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane, each of the first and second light assemblies comprising a lens portion comprising a lens light input surface configured to: (i) receive the light traveling along the primary light path at an angle of incidence ($\Phi_2$); and (ii) refract and emit the light through the lens portion along the primary light path at an angle of refraction ($\Psi_2$); and a lens light output surface configured to: (i) receive the light traveling through the lens portion along the primary light path at an angle of incidence ($\Phi_3$); and (ii) refract and emit the light from the lens light output surface along the primary light path at an angle of refraction ($\Psi_3$); wherein the following equation is satisfied: $\Phi_2-\Psi_2 < \Psi_3-\Phi_3$.

In another aspect, the lighted mirror apparatus comprises a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane, each of the first and second light assemblies comprising a light source configured to generate light; a light guide member optically coupled to the light source to receive the light generated by the light source and transmit the light through the light guide member; a reflective surface adjacent to and opposing an inner surface of the light guide member; and a gap between at least a front portion of the reflective surface and the inner surface of the light guide member, the gap having a width that increases in size with decreasing distance from a front edge of the reflective surface.

In another aspect, the lighted mirror apparatus comprises a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane, each of the first and second light assemblies configured to generate light and emit the light from the first and second light assemblies along a final portion of a primary light path, the final portion of the primary light path: (1) exiting the first and second light assemblies a first distance (D1) from the center plane; and (2) forming an emission angle ($\theta_M$) with the mirror plane, wherein $\theta_M$ and D1 are selected such that $\tan(\theta_M) \times D1 = 15$ to 30 inches.

In another aspect, the lighted mirror apparatus comprises a mirror having a front surface defining a mirror plane, a centerline, a center plane that is orthogonal to and intersects the mirror plane along the centerline, and at least one mirror edge; and at least one light assembly mounted to the mirror and comprises a light source for generating light; and an illumination element comprising a front light emitting surface, the illumination element optically coupled to the light source and configured to transmit the light and emit at least a portion of the light from the front light emitting surface; and the illumination element positioned so that: (1) the front light emitting surface is adjacent to and extends along the at least one mirror edge; (2) the front light emitting surface protrudes outward from the at least one mirror edge in a direction away from the center plane; and (3) the front light emitting surface protrudes outward from the mirror plane in a forward direction.

In another aspect, the lighted mirror apparatus comprises a mirror having a front surface and at least one mirror edge; and at least one light assembly mounted to the mirror along the mirror edge and comprises an illumination element comprising an extruded panel comprising a front light emitting surface and a light receiving edge; a light source for generating light, the light source optically coupled to the light receiving edge of the extruded panel; and the extruded panel configured to receive the light from the light source, transmit the light, and emit at least a portion of the light from the front light emitting surface.

In another aspect, the lighted mirror apparatus comprises a mirror having a front surface and at least one mirror edge; and at least one light assembly mounted to the mirror along the mirror edge and comprises an illumination element comprising a multi-layer panel, the multi-layer panel comprising a light receiving edge; a diffusive light guide layer; and an optically clear cover layer that comprises a front light emitting surface of the illumination element; and a light source for generating light, the light source optically coupled to the light receiving edge of the multi-layer panel; the multi-layer panel configured to receive the light from the light source, transmit the light, and emit at least a portion of the light from the front light emitting surface.

In another aspect, a method of forming a lighted mirror apparatus, the method comprises a) extruding an illumination element comprising a front light emitting surface and a light receiving edge; and b) mounting the illumination element along a mirror edge of a mirror, the light receiving edge of the illumination element optically coupled to a light source mounted to the mirror.

In another aspect, the lighted mirror apparatus comprises a mirror having a front surface defining a mirror plane, a centerline, a center plane that is orthogonal to and intersects the mirror plane along the centerline, and at least one mirror edge; and at least one light assembly mounted to the mirror and comprises a light source for generating light; and an illumination element comprising a front light emitting surface, the illumination element optically coupled to the light source and configured to transmit the light and emit at least a portion of the light from the front light emitting surface; and the illumination element positioned so that: (1) the front light emitting surface is adjacent to and extends along the at least one mirror edge; and (2) the front light emitting surface protrudes outward from the at least one mirror edge in a direction away from the center plane; wherein the illumination element comprises a multi-layer panel comprising a diffusive light guide layer, and an optically clear cover layer that comprises the front light emitting surface.

In another aspect, a cabinet comprises a housing defining a storage compartment having a front opening; a door mounted to the housing by at least one hinge, the hinge comprising a first hinge portion coupled to the housing and a second hinge portion coupled to the door, the first hinge portion pivotably coupled to the second hinge portion so that the door can be pivoted about a door axis between a closed angular orientation and an open angular orientation; and one of the first or second hinge portions fixedly coupled to the door or the housing, the other one of the first or second hinge portions slidably coupled to the door or the housing to allow the door to be axially translated relative to the housing between a fully-lowered state and a fully-raised state; and wherein when the door is in the fully-lowered state and the closed angular orientation, the door covers the entirety of the front opening.

In another aspect, the cabinet comprises a housing defining a storage compartment having a front opening; and a door mounted to the housing by a mounting unit, the mounting unit configured to: (1) allow the door to be pivoted relative to the housing about a door pivot axis between a closed angular orientation and an open angular orientation; and (2) allow the door to be axially translated between a fully-lowered state and a fully-raised state.

In another aspect, the cabinet comprises a housing comprising a rear wall, a first sidewall, a second sidewall opposite the first sidewall, a floor, and a ceiling opposite the floor that collectively define a storage compartment having a front opening, the front opening opposite the rear wall; a door mounted to the housing so that the door can be translated relative to the housing between a fully-lowered state and a fully-raised state; and a counterweight mounted to the first sidewall and operably coupled to the door.

In another aspect, the cabinet comprises a housing defining a storage compartment having a front opening; a door mounted to the housing; and a ledge mounted to a lower end of the door and protruding from a front surface of the door, the ledge comprising at least one of: (1) a depth of at least one inch; (2) a width that is less than a width of the door; and (3) a retention element for preventing objects from sliding off an upper surface of the ledge.

In another aspect, a method of forming a combined mirror and electronic display viewing assembly, the method comprises a) positioning an electronic device having a display screen on a ledge coupled to a mirrored door of a cabinet in an upright orientation, the ledge protruding beyond a front surface of the mirrored door, the mirrored door mounted to a housing so that the mirrored door can be translated relative to the housing between a fully-lowered state in which the mirrored door covers the entirety of a front opening of the housing and a raised state in which a lower portion of a storage compartment of the housing is unobstructed by the door; and wherein when the mirrored door is moved between the raised and fully-lowered states, the ledge moves with the mirrored door.

BRIEF DESCRIPTION OF THE DRAWINGS

The present disclosure will become more fully understood from the detailed description and the accompanying drawings, wherein.

Figure 1:
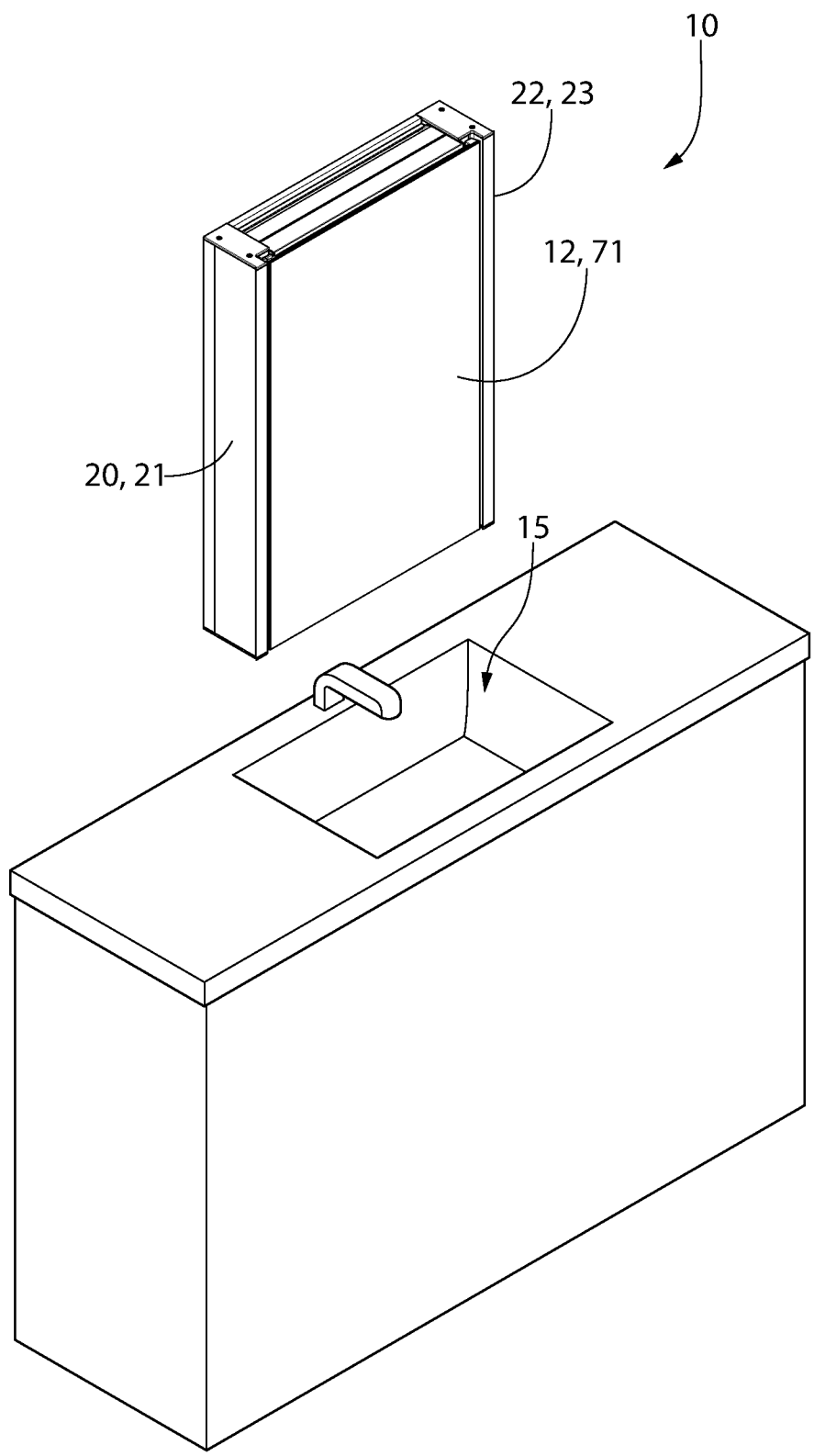
FIG. 1 is an isometric view of a lighted mirror apparatus according to one embodiment.

The drawings represent one or more embodiments of the present invention(s) and do not limit the scope of invention.

DETAILED DESCRIPTION

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, where block diagrams or circuits are shown and described, one of skill in the art will recognize that, for the sake of clarity, not all peripheral components or circuits are shown in the figures or described in the description. For example, common components such as memory devices and power sources may not be discussed herein, as their role would be easily understood by those of ordinary skill in the art. Further, the terms "couple" and "operably couple" can refer to a direct or indirect coupling of two components of a circuit.

Lighted Mirror Apparatus Utilizing Refraction to Increase Useful Light Output

Referring now to the figures, FIG. 1 is an isometric view of a lighted mirror apparatus 10 according to one embodiment. The apparatus 10 includes mirror 10 in a view state. In this embodiment, the apparatus 10 forms part of a medicine cabinet having a door 71, though the invention is not so limited and may be used with any mirror. As will be discussed in more detail below, the apparatus includes a first light assembly 20 along a first side 21 of the mirror, and a second light assembly 22 along a second side 23 of the mirror, the light assemblies 20, 22 directing light toward a user of the mirror. As shown, for example, in FIG. 4, each of the light assemblies 20, 22 is configured to generate light 26 and refract a primary light path 28 of the light toward a center plane 24.

In the exemplified embodiment, a sink area 15 forming part of a bathroom vanity is positioned below the lighted mirror apparatus 10. The invention is not so limited, however, as any other item (e.g., a bathroom cabinet) or no item may be positioned below or near the mirror apparatus 10.

Figure 2:
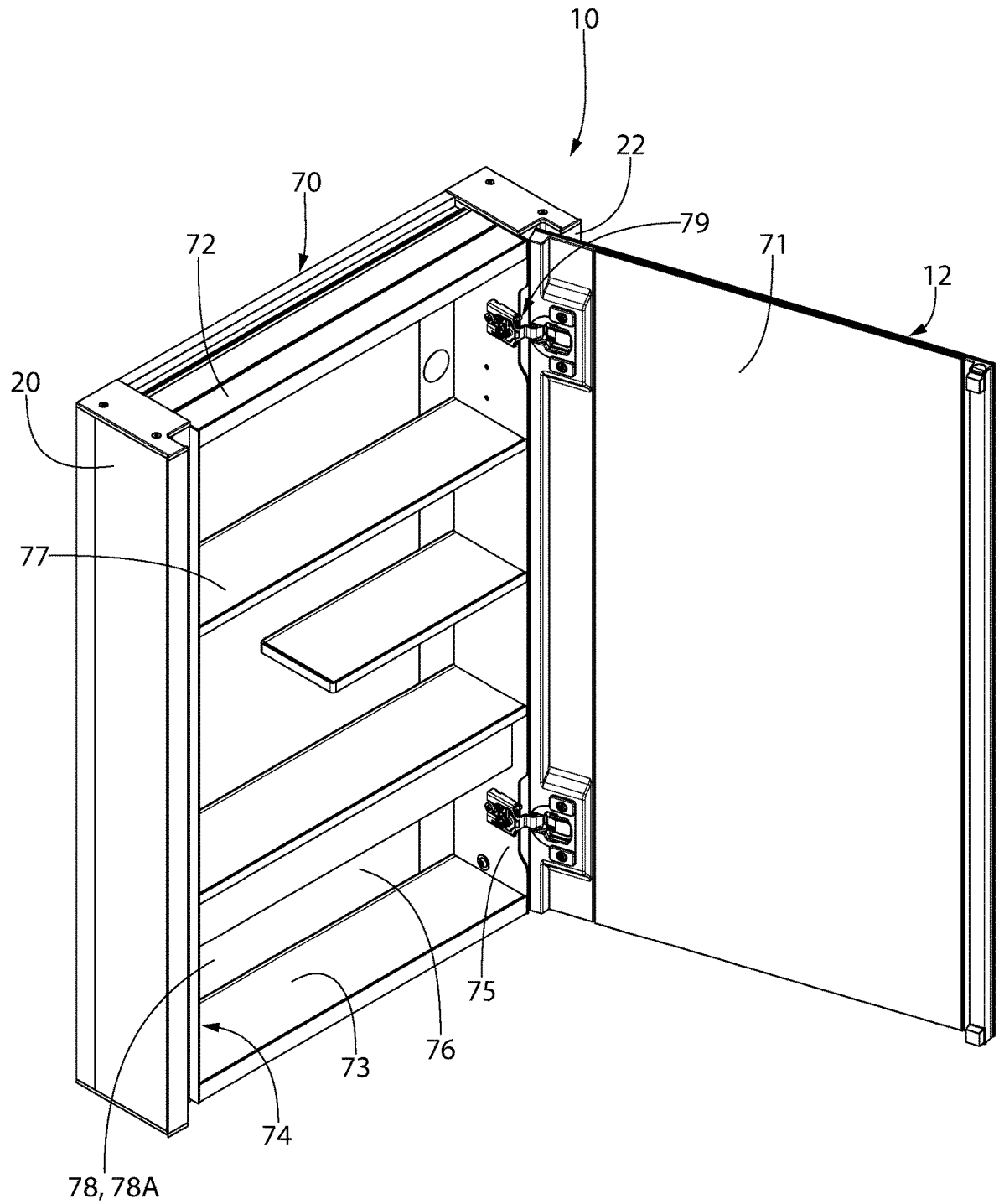
FIG. 2 is an isometric view of the lighted mirror apparatus with its door opened.

FIG. 2 is an isometric view of the exemplified lighted mirror apparatus 10 with its door 71 opened. The door is pivotably coupled to a support structure 70 forming a cabinet box. The support structure 70 forms a storage cavity 78 having an opening 78A. The door 71 comprises the mirror, the mirror 12 being on the front surface of the door 71. Hinge mechanisms 79 enable pivotal coupling. The door 71 is movably mounted to the support structure 70 so as to be alterable between (1) an open state (shown in FIG. 1) in which access is provided to the storage cavity 78 via the opening 78A, and (2) the viewing state (shown in FIG. 1) in which the opening 78A is enclosed by the door 71. The first and second light assemblies 20, 22 are mounted to the support structure 70 on opposite sides of the door when the door is in the closed position (the viewing state).

The exemplified support structure 70 includes a top panel 72, a bottom panel 73, two side panels 74, 75, and a rear panel 76. The rear panel 76 may be the mounting surface for the support structure 70 and may be configured to couple the support structure 70 to a structural wall or panel of a bathroom, according to an exemplary embodiment. The exemplified support structure 70 further includes a plurality of shelves 77. In this embodiment, certain shelves extend an entire width of the support structure 70, while another shelf extends only a partial width of the support structure 70, allowing taller objects to be placed in the spaces between the free ends narrower shelves and the side of the support structure 70. The invention, however, is not limited to any particular configuration of shelves or even to a medicine cabinet, as the invention may be used with any mirror. Co-owned U.S. Pat. No. 10,687,618 is incorporated herein by reference in its entirety.

Figure 3A:
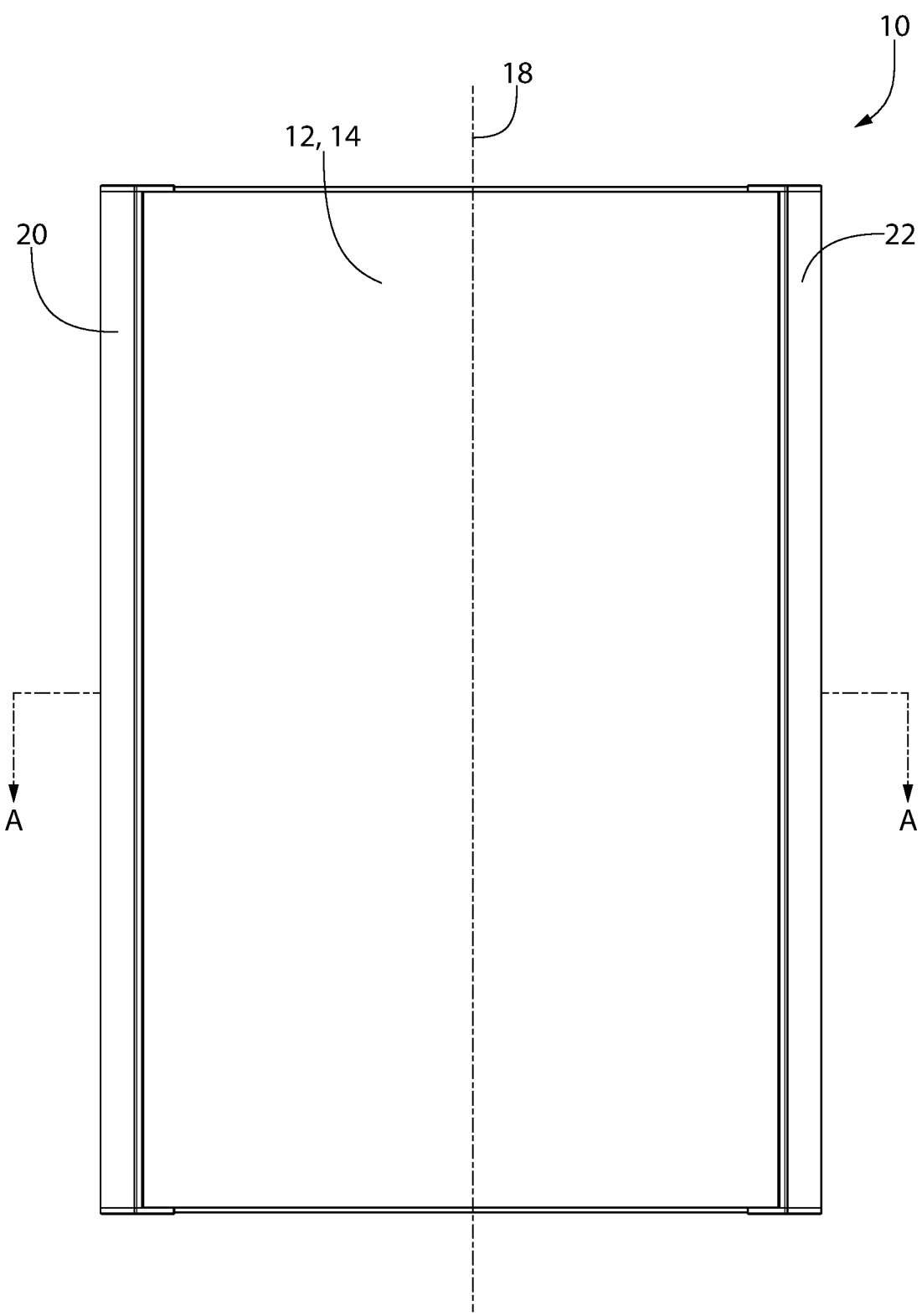
FIG. 3A is a front view of the lighted mirror apparatus.

FIG. 3A is a front view of the lighted mirror apparatus 10 in a viewing state. The first and second light assemblies 20, 22 are shown being positioned on opposite sides of mirror 12. The mirror 12 has a front surface 14 that defines a centerline 18.

Figure 3B:
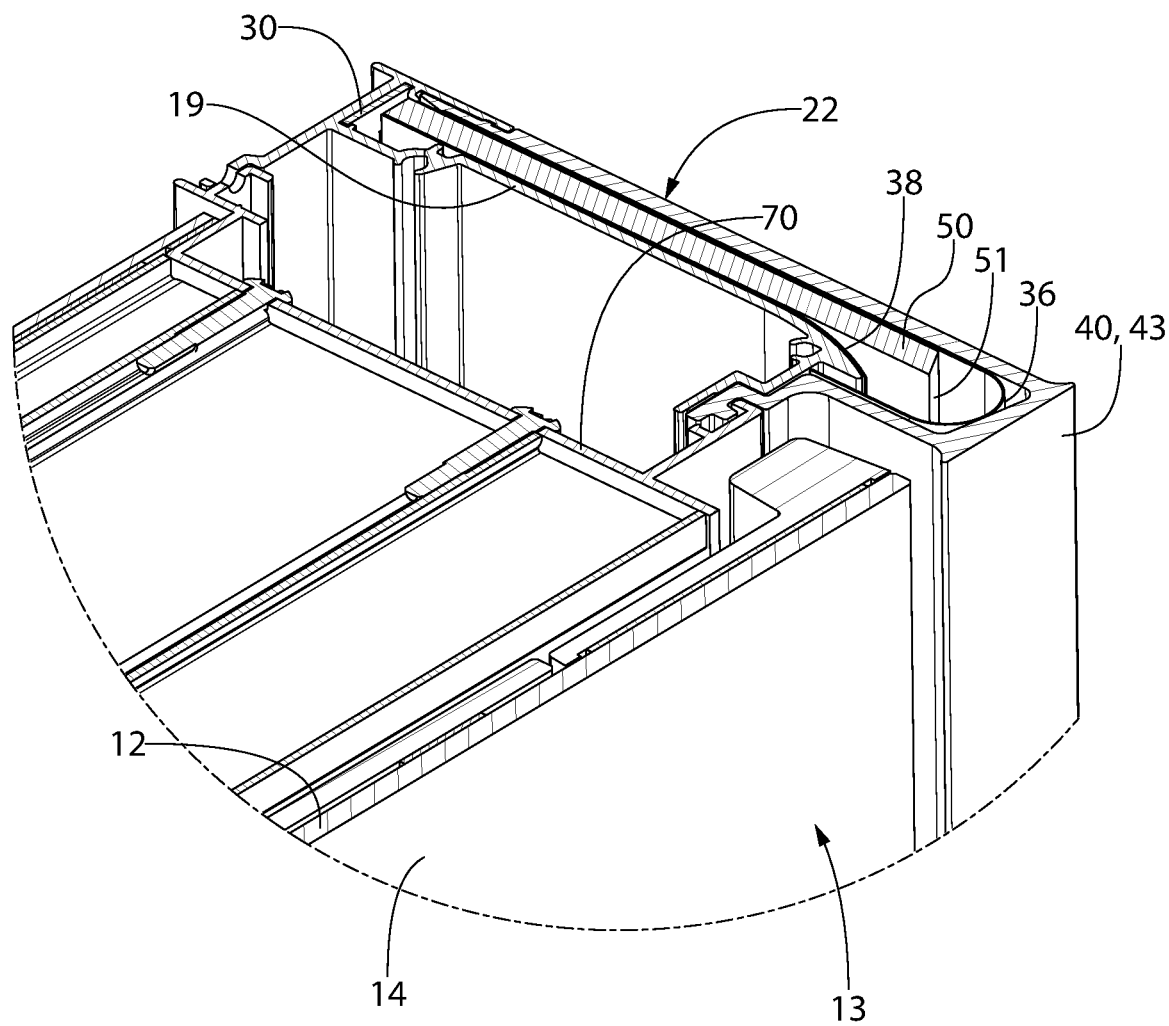
FIG. 3B is an isometric cross section view of the second light assembly taken along line A-A of FIG. 3A.
Figure 4:
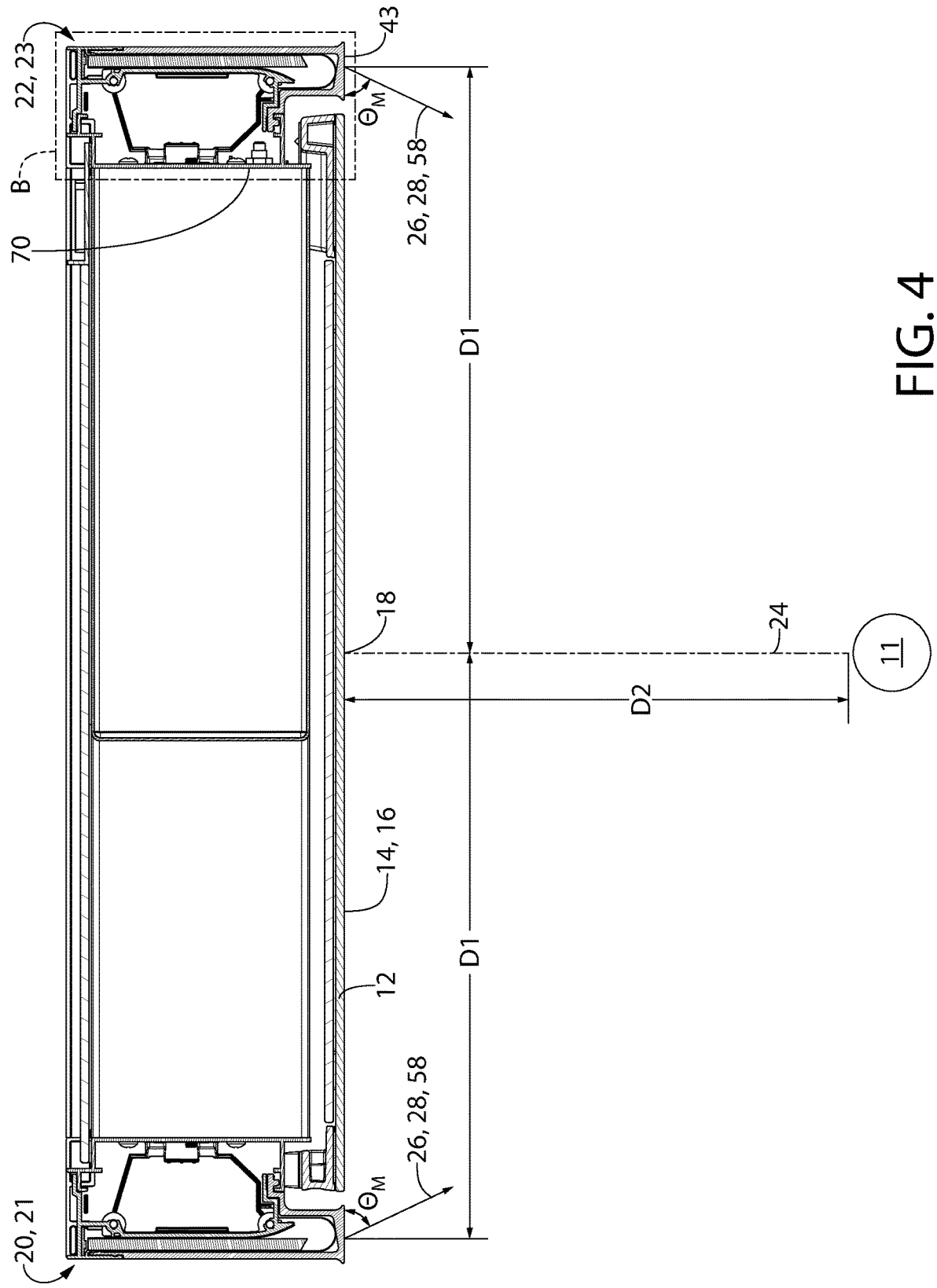
FIG. 4 is a cross section of the apparatus taken along line A-A of FIG. 3A.
Figure 5:
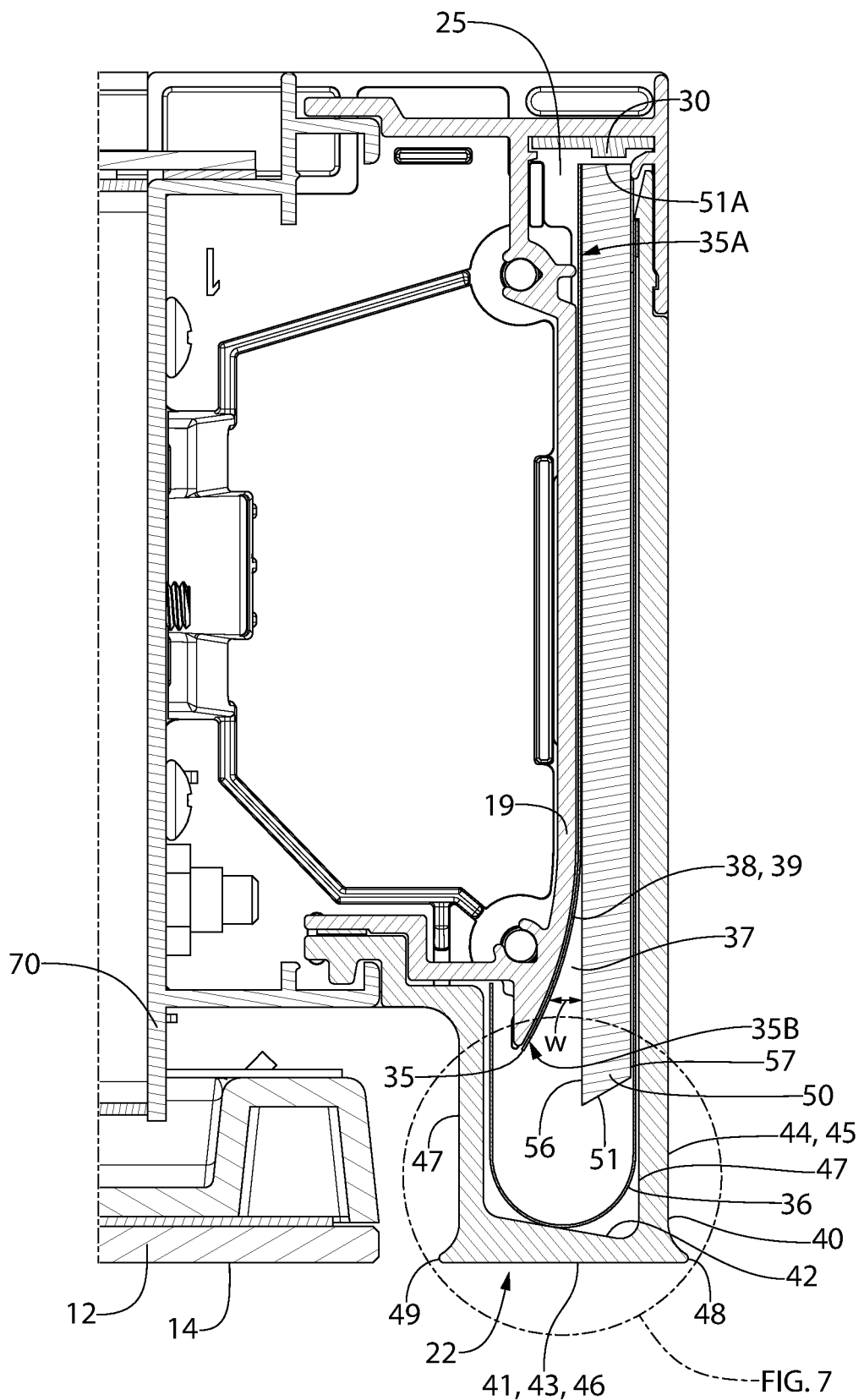
FIG. 5 is close up view of area B of FIG. 4.
Figure 6:
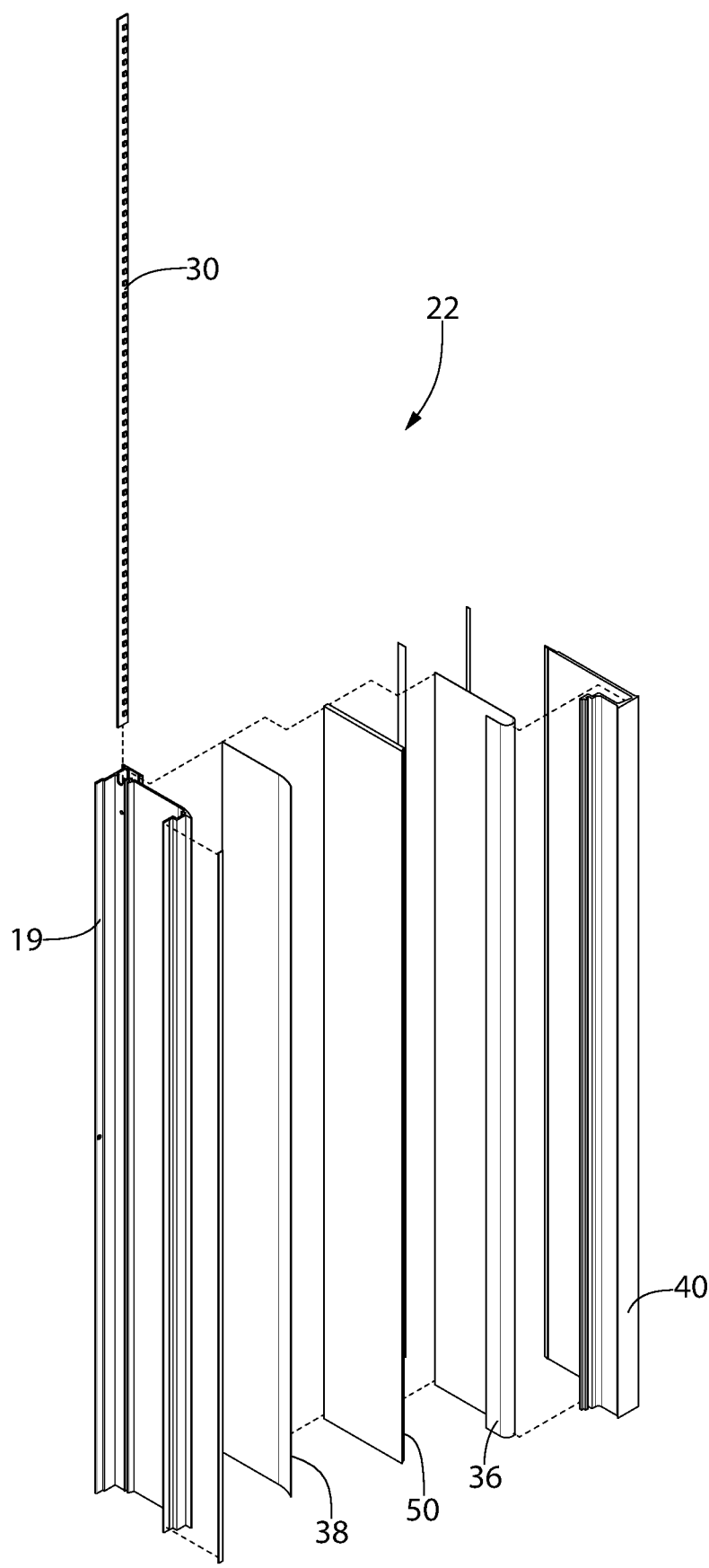
FIG. 6 shows exploded views of components of the light assembly.

Reference is now made to FIGS. 3B-5 showing the apparatus 10 in the viewing state, where FIG. 3B is an isometric cross section view of the second light assembly 22 taken along line A-A of FIG. 3A, FIG. 4 is a cross section of the apparatus 10 taken along line A-A of FIG. 3A, and FIG. 5 is a close up view of area B of FIG. 4. Further, FIG. 6 provides exploded view of the components of the exemplified second light assembly 22 discussed herein.

The mirror's 12 front surface 14 defines a mirror plane 16 and the centerline 18. Center plane 24 is orthogonal to and intersects the mirror plane 16 along the centerline 18. Each of the first and second light assemblies 20, 22 are configured to generate light and transmit the light to the center plane 14 along a primary light path. The exemplified light assemblies 20, 22 include a light source 30 configured to generate light 26. In the exemplified embodiment, the light source 30 is an light emitting diode (LED) array extending all or most of the length of the light assembly 20, 22. In one embodiment, the LED is the Edison PLCC 2835 SE LED. The invention is not limited to LEDs, however. The light assembly may use other light sources, such as fluorescent, incandescent, or halogen light sources, and may be present at only a portion of the length of the light assembly.

The exemplified light assemblies 20, 22 each further include a light guide member 50 having a light output surface 51. The exemplified light guide member is made from a clear PMMA (Poly (methyl methacrylate)) (acrylic) with micro dots, though the invention is not limited to a particular material. The light guide member 50 is positioned in a cavity 25 formed by a light-transmissive cover member 40.

Similar to the light guide member, the exemplified cover member is made from a clear PMMA (acrylic). As shown, the exemplified second light assembly 22 attaches to a portion of the support structure 70 via the cover member 40, the cover member having lens light output surface 43. As will be discussed, the cover member 40 may be designed to direct light to the user and spread light evenly across the cover member. The components of the light assembly may also be supported by an internal frame 19.

The light guide member 50 directs light from the light source 30 to the lens light output surface 43. In the exemplified embodiment, the light guide member 50 has a light input surface 51A, the light source 30 comprising a row of light emitting diodes positioned adjacent to the light input surface 51A. The light input surface 51A has a planar surface that is substantially parallel to and rearwardly offset from the mirror surface 14.

The exemplified lens light output surface 43 and the mirror front surface 14 each form part of a front surface 13 of the apparatus 10. In the exemplified embodiment, the lens light output surface 43 extends the height of the mirror, though in other embodiments it may only extend for a portion of the height of the mirror. Further, the exemplified lens light output surface 43 of the cover member 40 is a planar surface that is oriented substantially parallel to the mirror surface 14, and the lens light output surface 43 of the cover member 40 is substantially coplanar with the mirror surface 14. The invention, however, is not so limited. For example, the output surface 43 may be offset from the mirror surface 14.

Each of the exemplified light assemblies 20, 22 further include a light diffuser sheet 36 having an arcuate portion positioned between the light output surface 51 of the light guide member 50 and the lens light input surface 42 of the lens portion of the cover member 40. In certain embodiment, the light output surface 51 of the light guide member 50 has a smooth surface (e.g., beveled polished edge), and/or the light input surface 51A has a smooth surface (e.g., polished edge). Smooth edges allow maximum light energy to enter and exit the light guide member 50.

The exemplified diffuser sheet 36 has a U-bend to offer diffused light out the side of the light assembly while also diffusing light out the light output surface 51 of the light guide member 50. The diffuser sheet 36 is fit into internal cavity 25 to extend along cover member inner side wall 47 and bend in at the cover member front wall 46. This combination allows for the light output to be smoothed and visually aesthetic. It may also provide a unique aesthetic to the cover member lens portion 41 where a user can see through the clear lens and see the milky white diffuser 36 and its curve. The exemplified diffuser sheet 36 is made from a polycarbonate (PC) diffusion film. As discussed herein, a diffuser sheet is a sheet made from optically clear material with engineered thin microstructure on the surface, or the surfaces, to improve lighting performance in angle control, efficiency, source hiding, and/or aesthetics. In other embodiments, the diffuser sheet may be shaped or positioned differently or omitted.

As shown in FIG. 5, the exemplified cover member 40 includes an outer sidewall 44 having an outer surface that forms an exposed side surface 45 of the lighted mirror apparatus 10, and a front wall 46 that comprises the lens portion 41. The cover member 40 also includes a front wall 46 that comprises the lens portion 41. The lens light output surface 43 is a front surface of the front wall 46 that forms an exposed front surface 13 of the lighted mirror apparatus 10.

The exemplified cover member 40 further comprises an inner sidewall 47. Further, the front wall 46 comprises a first lip portion 48 that protrudes outwardly beyond the outer sidewall 44 and a second lip portion 49 that protrudes inwardly beyond the inner sidewall 47. The exemplified light assembly 22 further includes an internal cavity 25 formed at least in part by the cover member 40. The light source 30 and the light guide member 50 are positioned within the internal cavity 25, the light guide member being optically coupled to the light source 30.

The exemplified light guide member 50 is a light guide plate having a major inner surface 56, a major outer surface 57 opposing the outer sidewall 44 of the cover member 40, and a beveled front edge surface 51 that extends between the major inner and major outer surfaces 56, 57 and is configured to refract light exiting the front edge surface 51 of the light guide plate toward 50 the light input surface 42 of the lens portion 41 along the primary light path 28. The light output surface 51 of the light guide plate 50 is a front edge surface that extends between the major inner and major outer surfaces 56, 57.

The exemplified internal frame 19 is made from aluminum and has a curve at its end to slowly move a reflector member 38 from along the light guide member 50 into open space. This bend causes aesthetically pleasing light by reducing the harsh line that would otherwise be created from the area with the reflector member 38 and the area without. The exemplified reflector member 38 has a reflective surface film 39 made from a highly reflective white PET (95% reflective) adhered to the frame 19, though another suitable material may be used.

The exemplified reflective surface 39 is adjacent to and opposing the major inner surface 56 of the light guide plate 50. A gap 37 exists between the reflective surface 39 and the major inner surface 56 of the light guide plate 50. The gap 37 has a width w measured parallel to the mirror surface 14. For a front portion 35B of the reflective surface 39, the width w of the gap 37 increases in size with decreasing distance from a front edge 35 of the reflective surface 39. Further, the width w of the gap 37 is a substantially constant for a rear portion 35A of the reflective surface 39. The front portion 35B of the exemplified reflective surface 39 is a convex surface that curves away from the light guide plate 50. Further, the light guide plate 50 extends beyond the front edge 35 of the reflective surface 39. In the exemplified embodiment, both the major inner surface 56 and the major outer surface 57 are substantially planar surfaces that are substantially parallel to the center plane (see also FIG. 4 showing center plane 24.

The exemplified light guide plate 50 is configured to emit: (1) a first percentage of the light entering the light guide plate 50 from the light guide plate 50 via the major outer surface 57; and (2) a second percentage of the light entering the light guide plate 50 from the light guide plate 50 via the light output surface 51, the second percentage being greater than the first percentage. In other embodiments, the second percentage may be equal to or less than the first percentage.

Returning to FIG. 4, a top view of the apparatus 10 is provided for showing how light 26 exits the first and second light assemblies 20, 22 and is directed towards a user 11. First and second light assemblies 20, 22 are mounted to the support structure 70 on opposite sides of the mirror 12 and on opposite sides of the center plane 24, each of the first and second light assemblies 20, 22 configured to generate light 26 and emit the light from the first and second light assemblies 20, 22 along a final portion 58 of a primary light path 28. As used herein, the term "primary light path" means the path upon which the primary optic output of the light source travels at 0°, where 0° is the direction where the luminous intensity from the source is at its peak. In the exemplified embodiment, since the light source comprises a single column of LEDs positioned in a vertical line (see light source 30 in FIG. 6), the primary light path is a vertical plane extending from the light source in the direction where the luminous intensity from the source is at its peak.

For each of the first and second light assemblies 20, 22, the final portion 58 of the primary light path 28 exits the light assembly at a first distance (D1) from the center plane. The final portion 58 of the primary light path 28 forms an emission angle $\theta_M$ with the mirror plane 16. The apparatus is configured to ensure that the emission angle $\theta_M$ provides light in a direction ideal for illuminating the user's 11 face and/or body. The values of $\theta_M$ and D1 are selected such that $\tan(\theta_M) \times D1$ (which is D2) is in the range of 15 to 30 inches. Conforming to this range of $\tan(\theta_M) \times D1$ (which is D2) being 15 to 30 inches maximizes the amount of light generated by the first and second light assemblies 20, 22 that actually illuminates a user's face (i.e., "useful light"), as this is the typical distance that a user stands from a bathroom mirror due to typical bathroom vanity depths. In another embodiment, the $\tan(\theta_M) \times D1$ (which is D2) is 20 to 28 inches. In an even further embodiment, the $\tan(\theta_M) \times D1$ (which is D2) is 22 inches to 26 inches. In another embodiment, the $\tan(\theta_M) \times D1$ (which is D2) is 24 inches. The invention is not so limited in other embodiments, such as when useful light is not required and/or desired.

Figure 7:
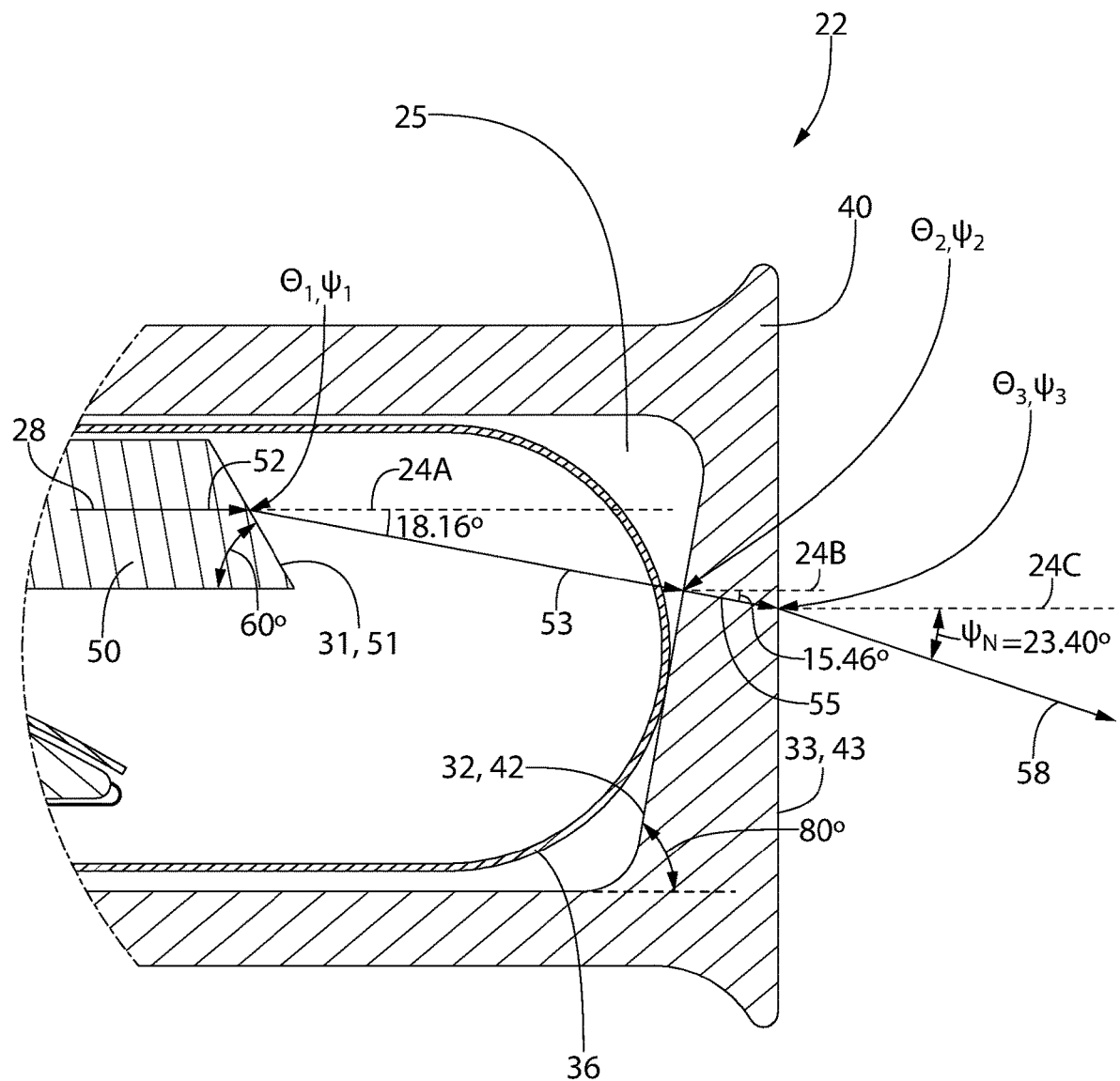
FIG. 7 is a cross section of the front portion of the second light assembly showing the primary light path according to one embodiment.

FIGS. 7-11 provide sections of the front portion of the second light assembly 22 showing the primary light path 28 according to one embodiment. The light assembly is configured to refract the primary light path 28 toward the center plane 24 multiple times. FIG. 7 provides an overview of the primary light path 28. A first portion 52 of the primary light path 28 travel along the light guide member to a first multimedia interface 31, which is the light guide member's light output surface 51.

As will be discussed in more detail below, the light will refract at the different multimedia interfaces 31, 32, 33 according to Snell's Law of Refraction. Snell's Law provides that when a light ray enters a different medium, its speed and wavelength change. As a result, the ray (1) bends towards the normal of the media interface when the ray's speed decreases in the new medium, or (2) bends away from the normal of the media interface when the ray's speed increases in the new medium. The angle of refraction depends on the indices of refraction of both media:

$$n_1 \sin(\Phi) = n_2 \sin(\Psi)$$

where $n_1$ is the refractive index of the first medium (from which the ray travels), $n_2$ is the refractive index of the second medium (into which the ray travels), $\Phi$ is the angle of incidence (the angle between the normal line to the interface boundary between the two media and the ray traveling through the first medium), and $\Psi$ is the angle of refraction (the angle between the normal line to the interface boundary and the ray traveling through the second medium). It is noted that the angles used herein presume that the light guide member 50 and cover member 40 are made from PMMA having a refractive index of 1.49.

As will be discussed in more detail below, according to Snell's Law and the changing refractive indices of the different mediums of travel, the primary light path 28 will bend inward at the first multimedia interface 31, outward at the second multimedia interface 32, and inward at the third multimedia interface 33. The angles of incidence $\Phi$ and refraction $\Psi$ are shown at each interface 31, 32, 33, as well as the angles of the primary light path 24 with respect to lines 24A, 24B, 24C, which are parallel to the center plane 24. The refraction of primary light path will cause four portions 52, 53, 55, 58 of the primary light path 58. FIG. 7 shows a net refraction angle $\Psi_N$ of greater than 20° (23.4°), where the first portion 52 of the primary light path is parallel to the center plane 24.

Figure 8:
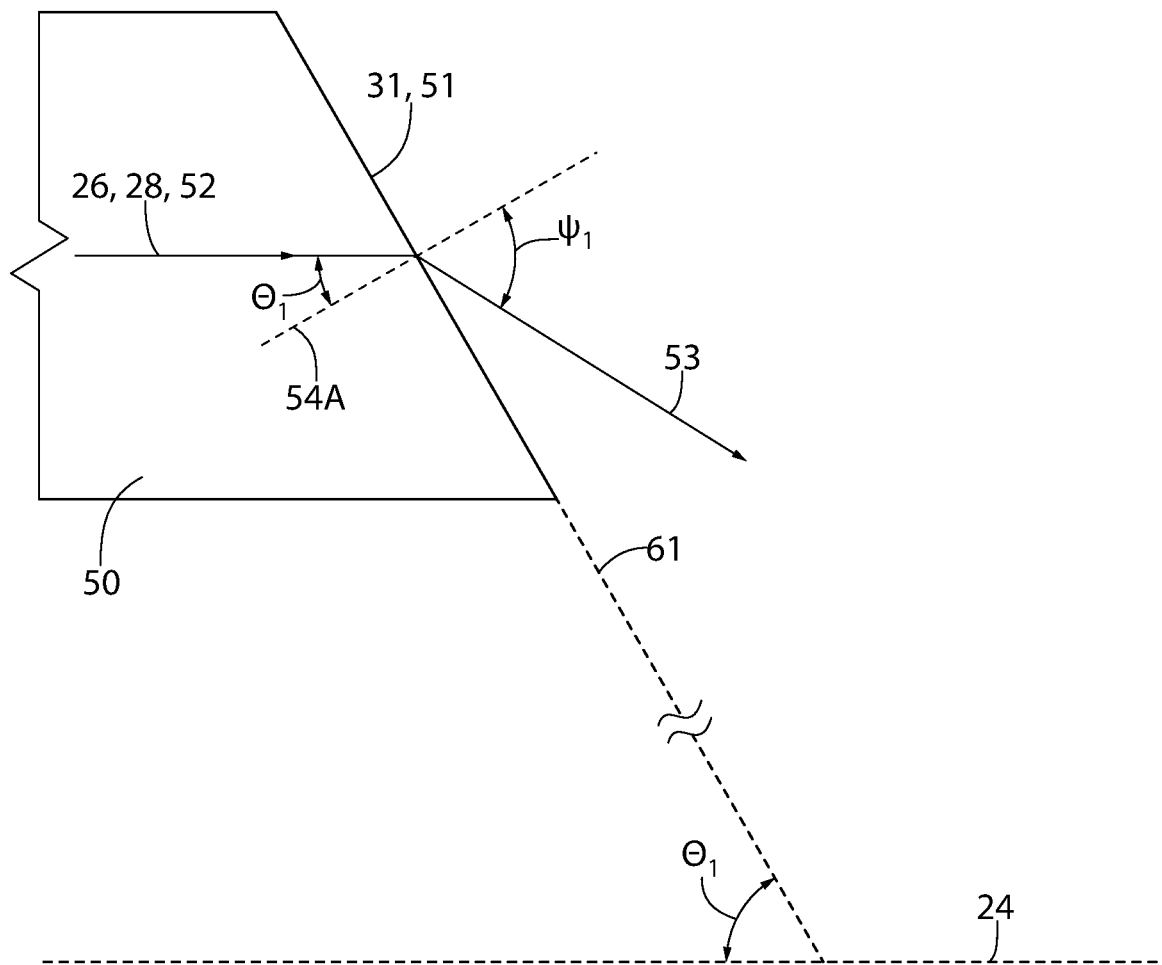
FIG. 8 shows the primary light path at the first multimedia interface.

FIG. 8 shows the primary light path 28 at the first multimedia interface 31. The light guide member 50 has a light output surface 51. The light output surface 51 defines a first interface reference plane 61 that intersects the center plane 24 at an outwardly and rearwardly facing first acute angle $\theta_1$ (60°). As used herein, the term "outwardly" means increasing in distance orthogonally from the center plane 24, and "rearwardly" means from the front surface 14 of the mirror 12 to the rear of the apparatus 10.

Light from the light source 30 (FIG. 5) is guided through the light guide member 50 to the light output surface 51 along a first portion 52 of the primary light path 28. The first portion 52 of the primary light path forms a first angle of incidence $\Phi_1$ (30°) with the light output surface 51. The light output surface 51 is part of the first multimedia interface 31 that is configured to refract the light exiting the light output surface 51 of the light guide member at a first angle of refraction $\Psi_1$ (48.16°) along a second portion 53 of the primary light path 28. According to Snell's Law, since the new medium (the air in cavity 25) allows for faster light travel than the prior medium (the light guide member), the second portion 53 of the primary light path bends away from normal 54A, causing the light to refract inward towards the center plane 24. Accordingly, the first angle of refraction $\Psi_1$ (48.16°) is greater than the first angle of incidence $\Phi_1$ (30°).

Figure 9:
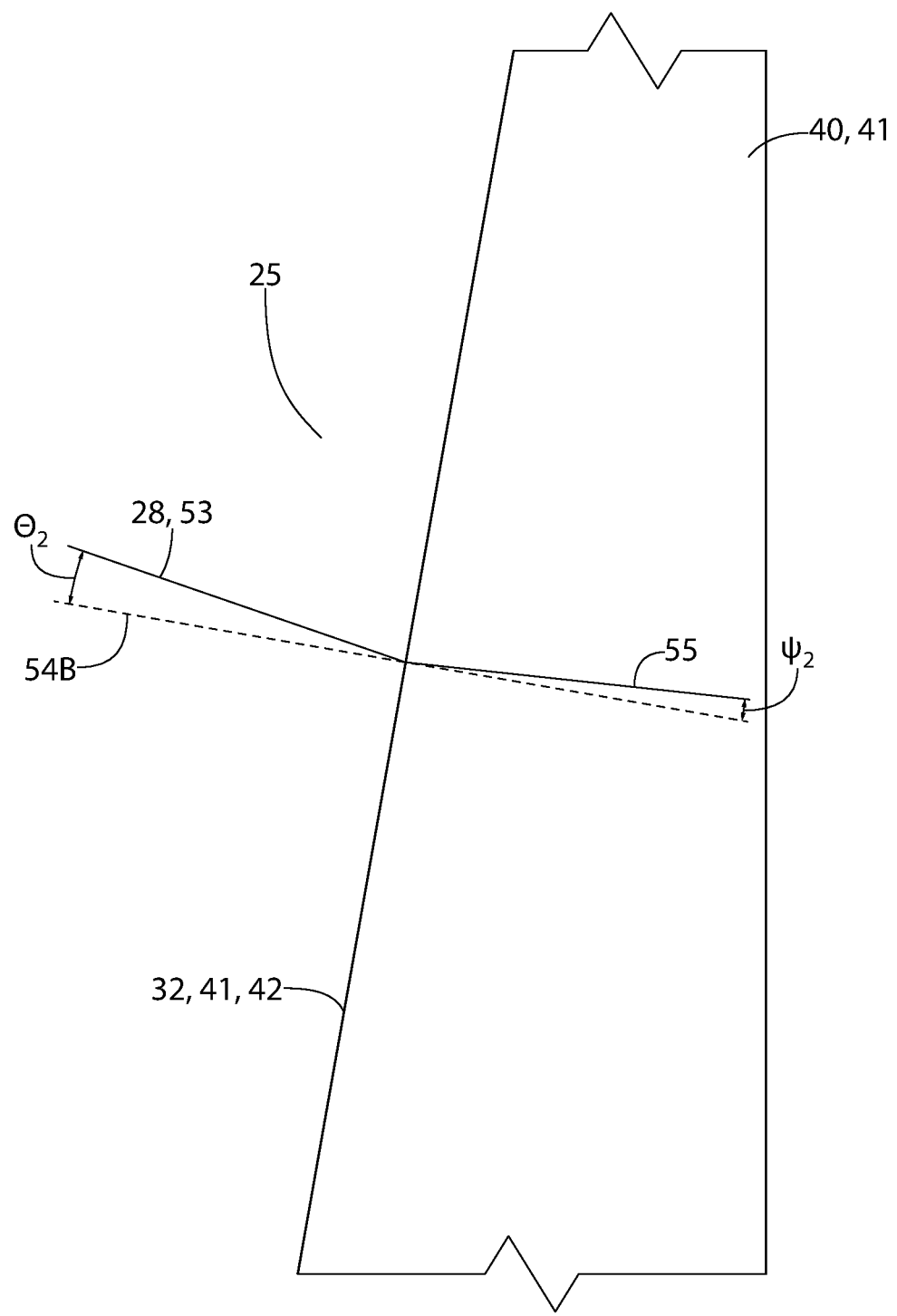
FIG. 9 shows the primary light path at the second multimedia interface.

FIG. 9 shows the primary light path 28 at the second multimedia interface 32. The cover member 40 has a lens portion 41 having a lens light input surface 42 being part of a second multimedia interface 32. The second multimedia interface 32 receives the light traveling along second portion 53 of the primary light path 28 at a second angle of incidence $\Phi_2$ (8.16°). In preferred embodiments, the second angle of incidence $\Phi_2$ is 10° or less. The second multimedia interface 32 refracts the light passing through the second multimedia interface 32 at a second angle of refraction $\Psi_2$ (5.46°) so that the light travels through the lens portion 41 along a third portion 55 of the primary light path 28. Since the new medium (the lens portion 41 of the cover member 40) allows for slower light travel than the prior medium (the air in cavity 25), the third portion 55 of the primary light path bends towards normal 54B, causing the light to refract slightly away from the center plane 24.

Figure 10:
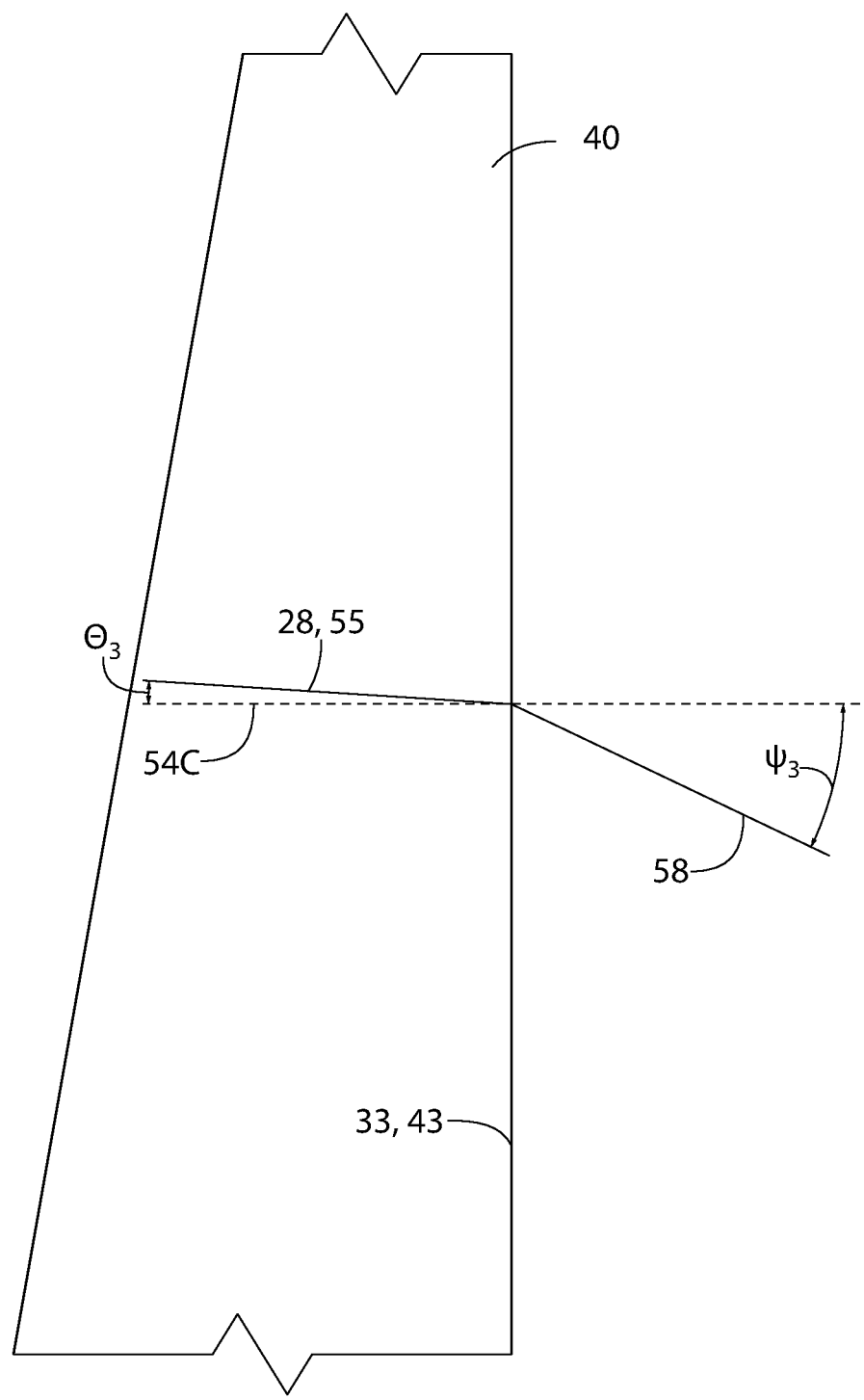
FIG. 10 shows the primary light path at the third multimedia interface.

FIG. 10 shows the primary light path at the third multimedia interface 33. The lens light output surface 43 is part of a third multimedia interface 33. The third multimedia interface 33 is configured to receive the light traveling along the third portion 55 of the primary light path 28 at a third angle of incidence $\Phi_3$ (15.46°). Further, the third multimedia interface 33 refracts the light exiting the lens light output surface 43 at a third angle of refraction $\Psi_3$ (23.40°) along a fourth portion 58 of the primary light path 28. Since the new medium (the air in front of the cover member 40) allows for faster light travel than the prior medium (the lens portion 41 of the cover member 40), the fourth portion 58 of the primary light path bends away from normal 54C, causing the light to refract towards the central plane. In the exemplified embodiment, the following equation is satisfied: $\Phi_2 - \Psi_2 < \Psi_3 - \Phi_3$. As a result, the refraction of light at the second interface (the lens input 42) away from the center plane 24 is less than the refraction of light at the third interface (the lens output) toward the center plane 24. Thus, the cover member 40 provides a net refraction towards the center plane 24. Further, at both the third interface 33 and the first interface 31 (where light travels faster in the new medium than in the prior medium), the angle of refraction $\Psi$ is greater than the angle of incidence $\Phi$. Further, while at the second interface $\Phi_2 > \Psi_2$ (see FIG. 9), at the third interface $\Psi_3 < \Phi_3$ (FIG. 10).

Figure 11:
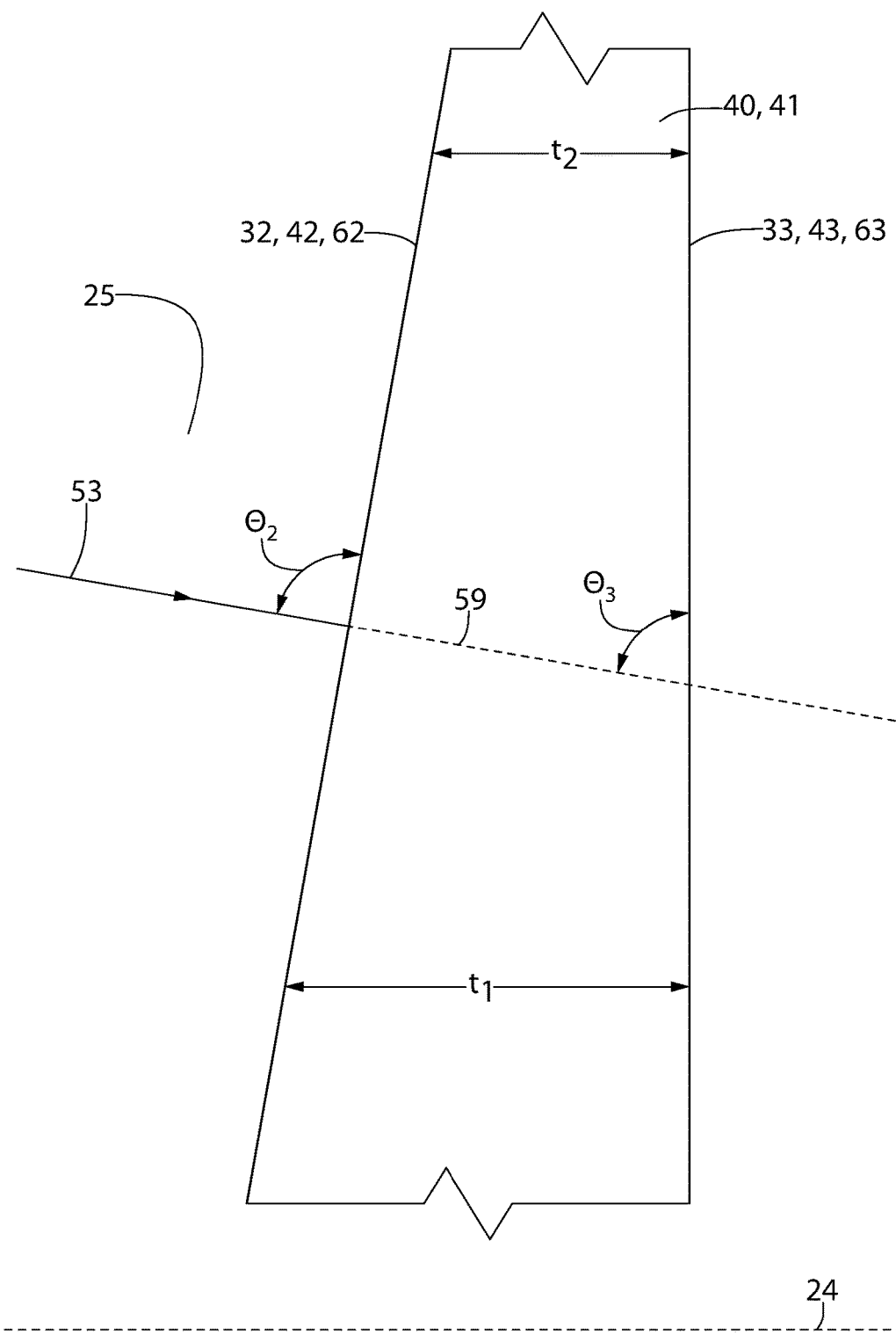
FIG. 11 shows another view of the primary light path of the second light assembly.

FIG. 11 shows another view of the primary light path of the second light assembly. The second portion 53 of the primary light path lies along a first refracted light reference plane 59. The lens portion 41 of the cover member 40 has a lens light input surface 42 being part of a second multimedia interface 32 that defines a second interface reference plane 62. The lens portion 41 further comprises a lens light output surface 43 being part of a third multimedia interface that defines a third interface reference plane 63. The first refracted light reference plane 59 intersects the second interface reference plane 62 to form an outwardly-rearwardly facing second angle $\theta_2$. Further, the first refracted light reference plane 59 intersects the third interface reference plane 63 to form an outwardly-rearwardly facing third angle $\theta_3$. The second and third angles are corresponding angles where $\theta_3 < \theta_2$. Further, the lens portion 41 of the cover member 40 has a thickness $t_1$, $t_2$ measured from the lens light input surface 42 to the lens light output surface 43 in a direction parallel to the center plane. The thickness of the lens portion 41 decreases with increasing distance from the center plane 24. Accordingly, thickness $t_2$ is less than thickness $t_1$. It is noted that the specific angles, distances, and other values noted herein are exemplary and do not limit the invention.

Figure 12:
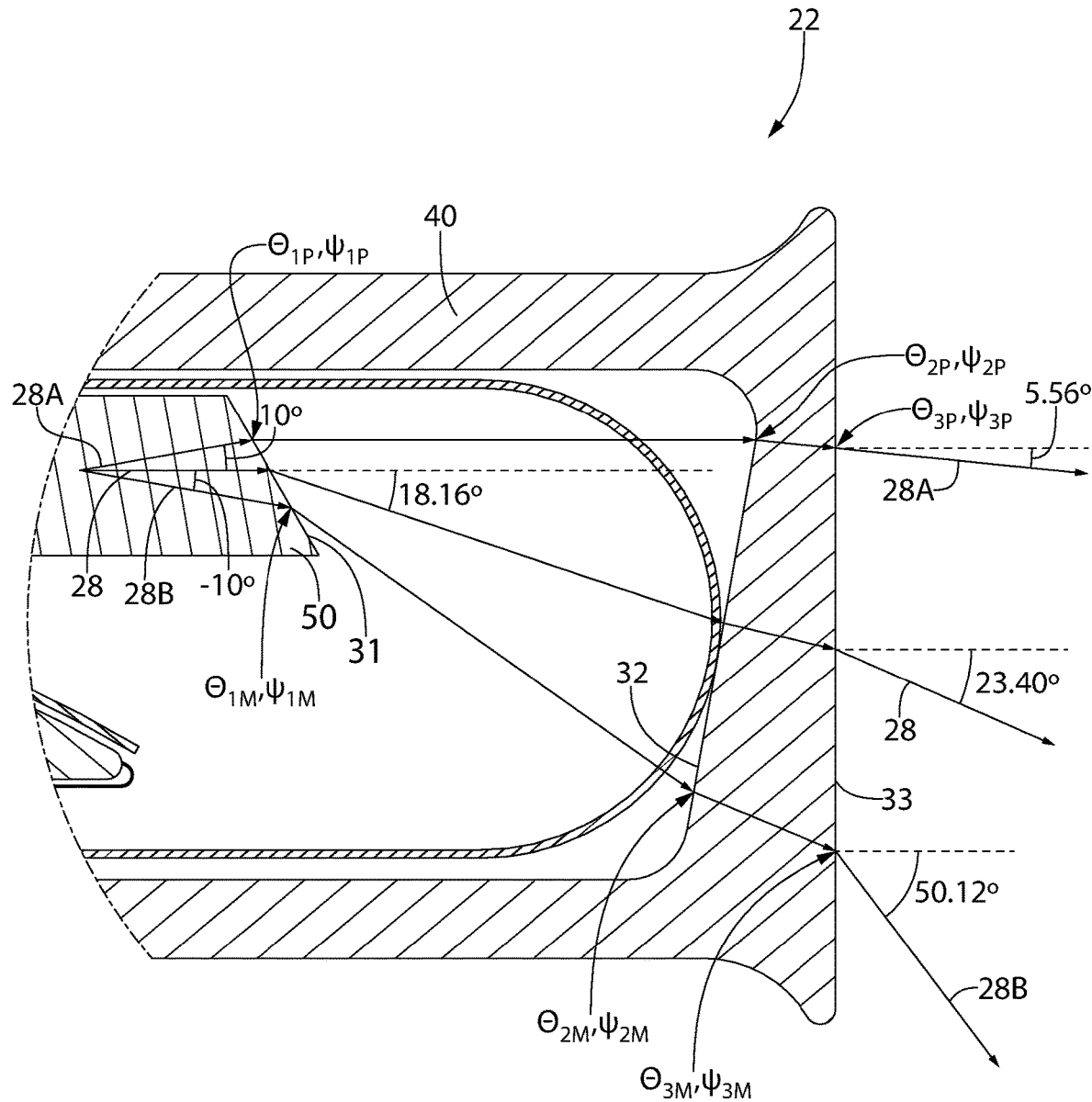
FIG. 12 shows the optic output of the second light assembly ±10°.

Finally, FIG. 12 shows the primary light path 28 along with both the −10° light path 28A and the +10° light path 28B. This view of the optic output ±10° shows how the different light rays traveling through the light guide member 50 and the cover member 40 will be refracted at different angles causing an optic output that surrounds the primary light path 28 and is directed generally inward toward the center plane 24. In the exemplified embodiment, the respective angles of incidence Φ and refraction Ψ for the three interfaces 31, 32, 33 are as follows: $\Phi_{1P}=20°$, $\Psi_{1P}=30.64°$, $\Phi_{2P}=-9.36°$, $\Psi_{2P}=-6.27°$, $\Phi_{3P}=3.73°$, $\Psi_{3P}=5.56°$, $\Phi_{1M}=40°$, $\Psi_{1M}=72.28°$, $\Phi_{2M}=32.28°$, $\Psi_{2M}=21°$, $\Phi_{3M}=31°$, $\Psi_{3M}=50.12°$.

The light apparatus discussed herein offers several advantages. For example, the light guide member with beveled edge direct light toward the user of the mirror. The light cover member has an angled optic for further directing light to the user. It also spreads light evenly across the cover member. The light diffuser sheet offers disused light out of the side of the light fixture while also diffusing light out the end of the light guide member. These features enable the mirror to light a user's face well, even when the user is close to the mirror. It also provides an even illumination without hotspots or visible LEDs.

Lighted Mirror Apparatus Edge Mounted Light Assemblies

Figure 13:
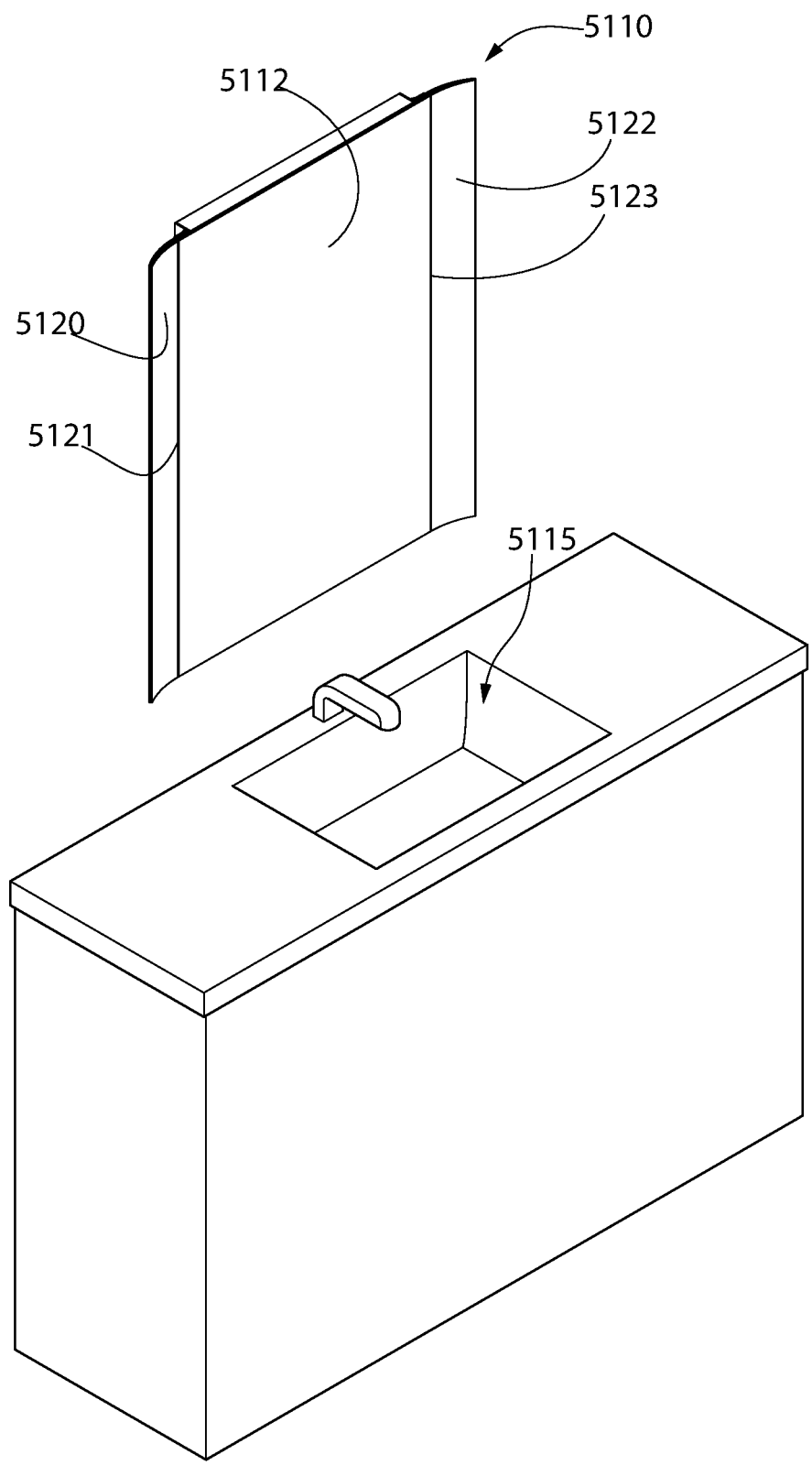
FIG. 13 is an isometric view of a lighted mirror apparatus according to one embodiment.

Referring now to the figures, FIG. 13 is an isometric view of a lighted mirror apparatus 5110 according to one embodiment. The apparatus 5110 includes a mirror 5112 in a view state. As will be discussed in more detail below, the apparatus 5110 also includes a first light assembly 5120 along a first edge 5121 of the mirror 5112, and a second light assembly 5122 along a second edge 5123 of the mirror 5112, the light assemblies 5120, 5122 directing light toward a user of the mirror 5112.

In the exemplified embodiment, a sink area 5115 forming part of a bathroom vanity is positioned below the lighted mirror apparatus 5110. The invention is not so limited, however, as any other item (e.g., a bathroom cabinet) or no item may be positioned below or near the mirror apparatus 5110.

Figure 14:
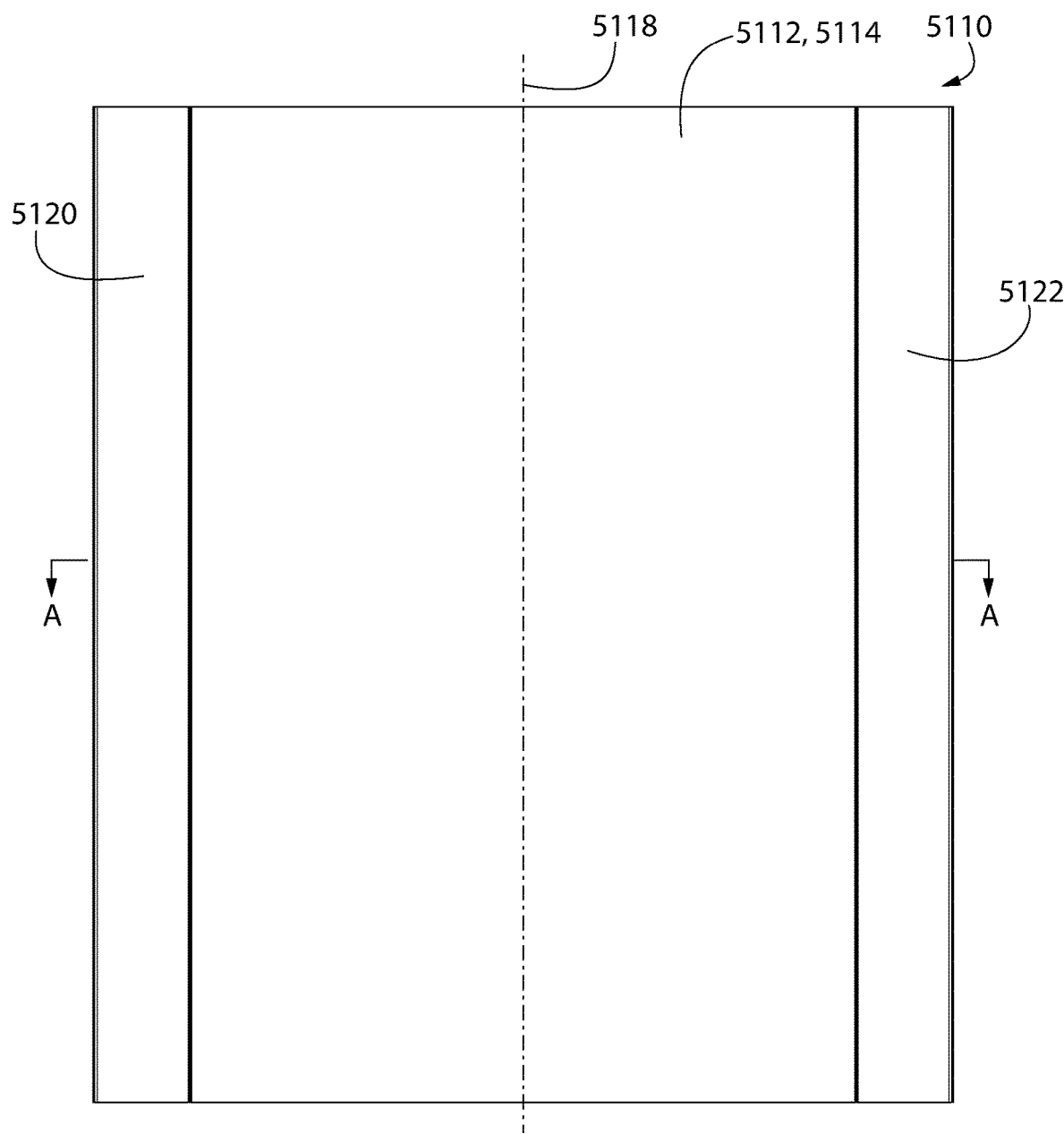
FIG. 14 is a front view of the lighted mirror apparatus.

FIG. 14 is a front view of the lighted mirror apparatus 5110. The first and second light assemblies 5120, 5122 are positioned on opposite sides of mirror 5112. The mirror 5112 has a front surface 5114 that defines a centerline 5118.

In the exemplified embodiment, the mirror 5112 includes first side mirror edge 5121 and second side mirror edge 5123 that is opposite the first side mirror edge 5121. A first light assembly 5120 is mounted to the mirror 5112 along the first side mirror edge 5121. A second light assembly 5122 is mounted to the mirror 5112 along the second side mirror edge 5123. The first light assembly 5120 extends along an entire length of the first side mirror edge 5121 and the second light assembly 5122 extends along an entire length of the second side mirror edge 5123. In other embodiments, the light assemblies may extend along only a portion of a side of the mirror.

Figure 15:
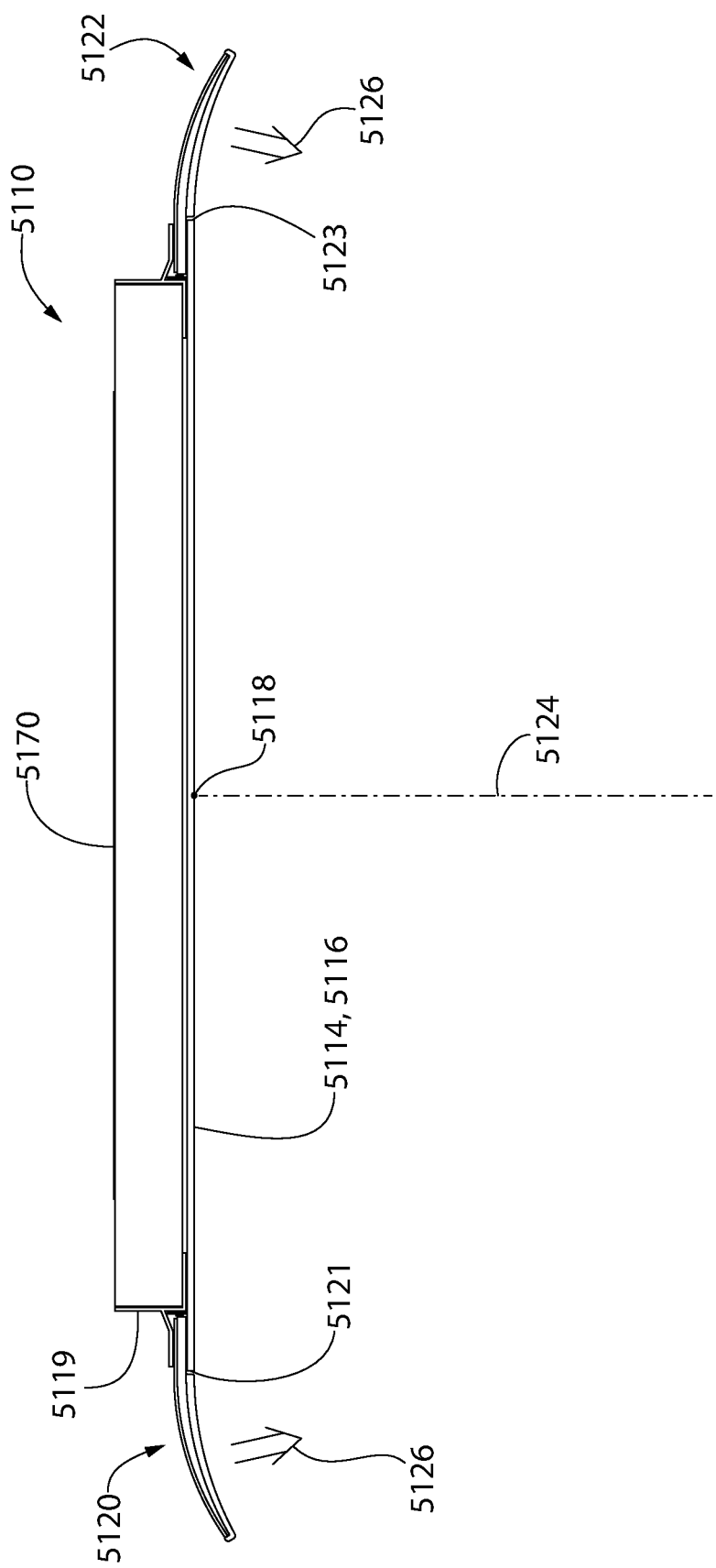
FIG. 15 is a top view of the lighted mirror apparatus.
Figure 16:
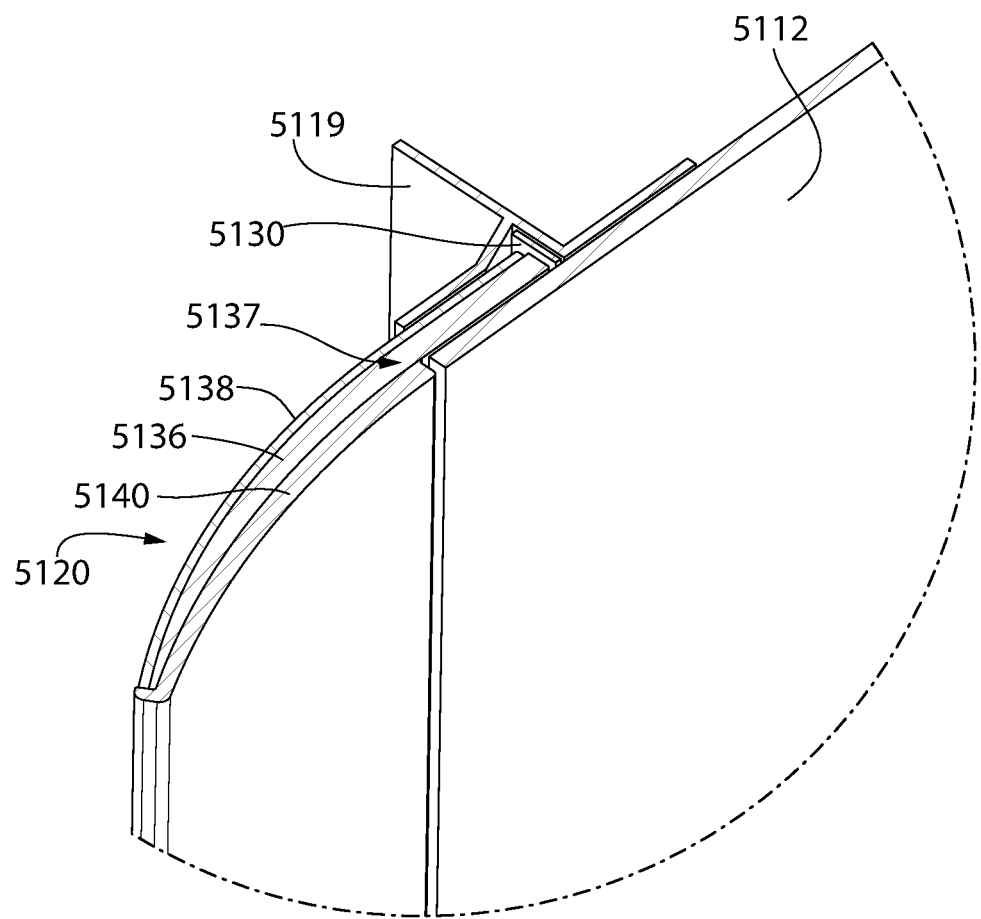
FIG. 16 is an isometric cross section view of the first light assembly taken along line A-A of FIG. 14.
Figure 17:
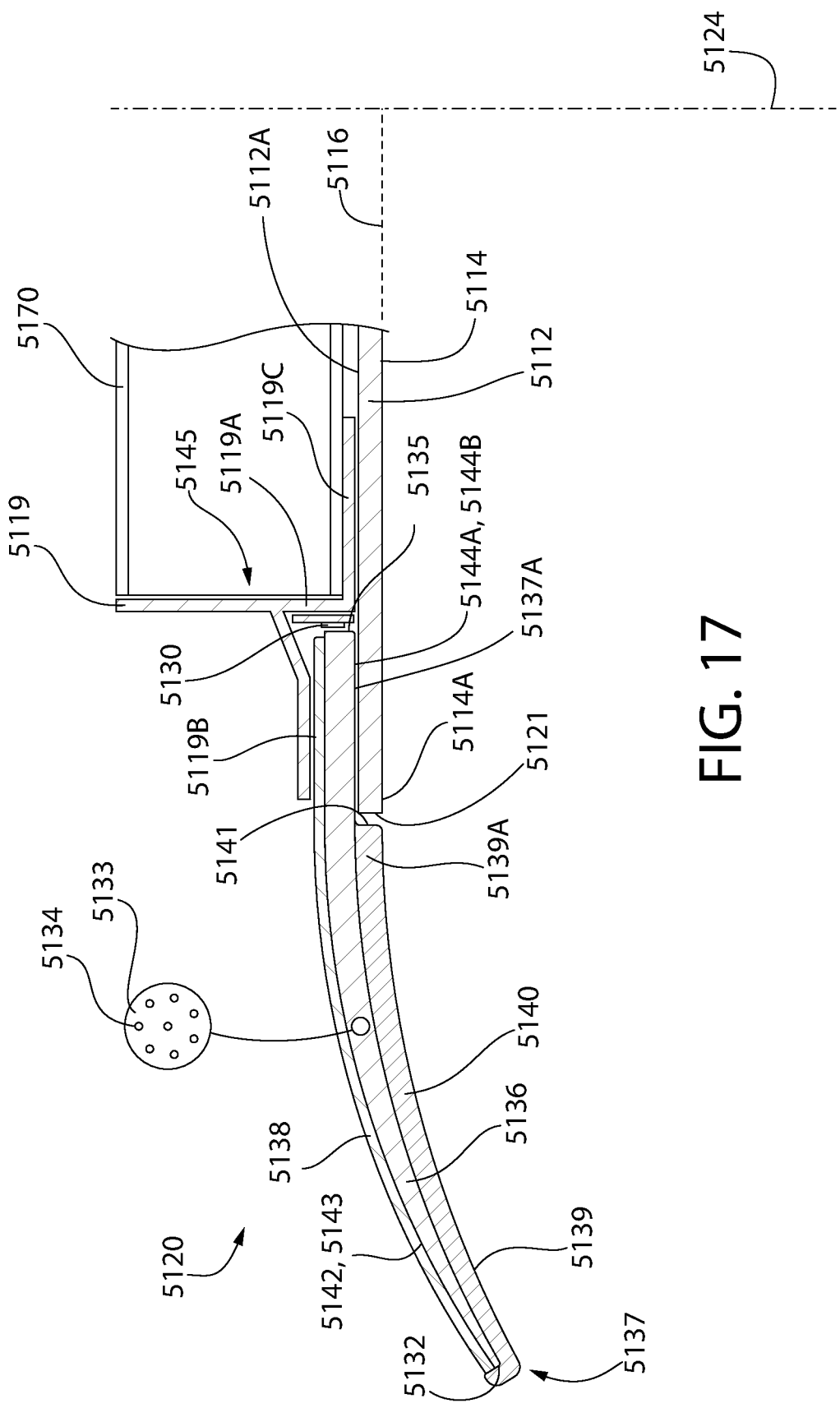
FIG. 17 is a cross section view of the first light assembly taken along line A-A of FIG. 14.
Figure 18:
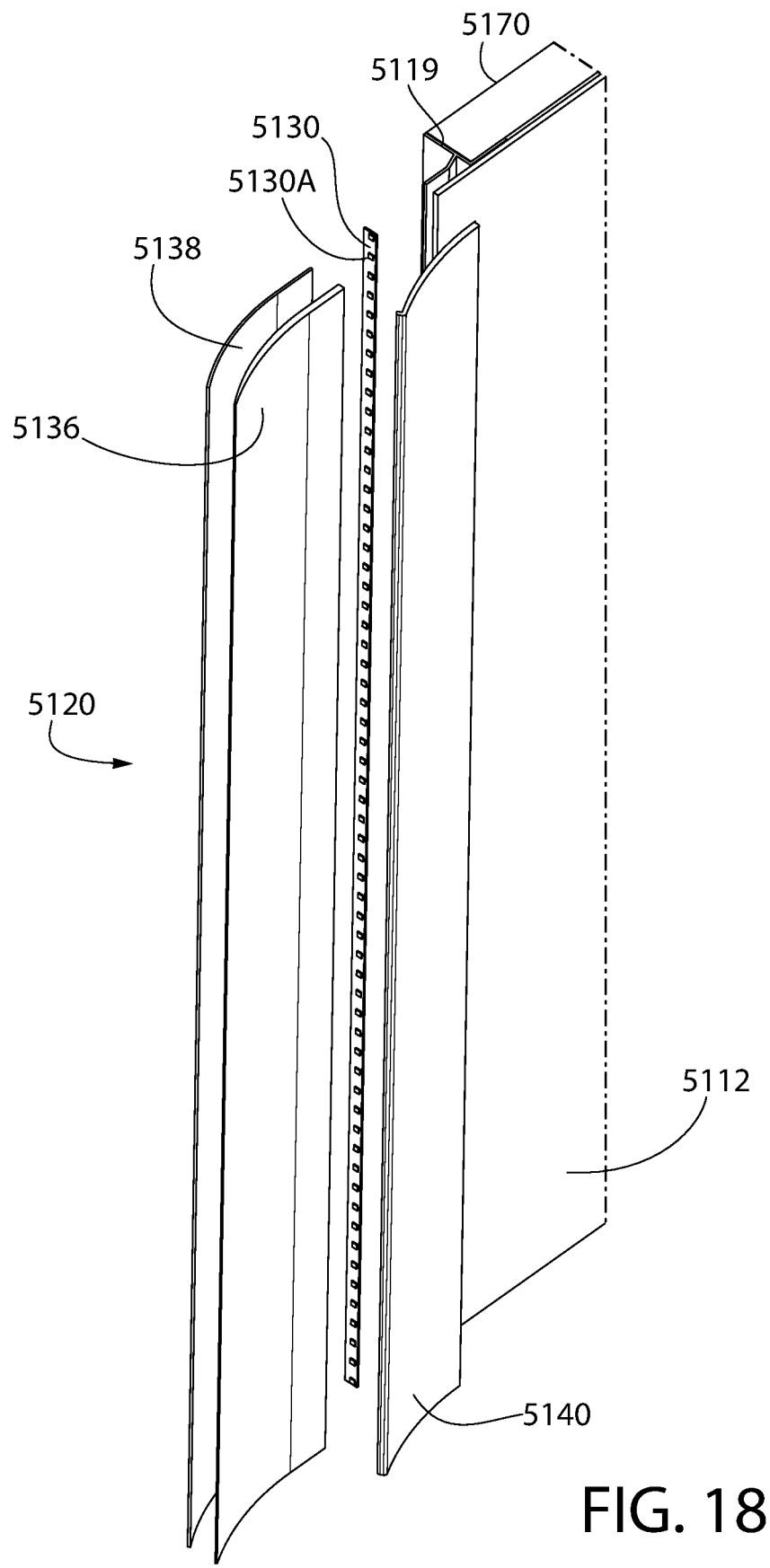
FIG. 18 is an exploded view of the first light assembly.

Reference is now made to FIGS. 15-18 showing the apparatus 5110 from various perspectives, where FIG. 15 is a top view of the lighted mirror apparatus 5110, FIG. 16 is an isometric cross section view of the first light assembly 5120 taken along line A-A of FIG. 14, FIG. 17 is a cross section view of the first light assembly 5120 taken along line A-A of FIG. 14, and FIG. 18 is an exploded view of the first light assembly 5120.

The mirror's 5112 front surface 5114 defines a mirror plane 5116 and the centerline 5118 (see FIG. 14). Center plane 5124 is orthogonal to and intersects the mirror plane 5116 along the centerline 5118. Each of the first and second light assemblies 5120, 5122 are configured to generate light and transmit the light toward the center plane 5124. The exemplified light assemblies 5120, 5122 include a light source 5130 configured to generate light. In the exemplified embodiment, the light source 5130 is a light emitting diode (LED) array 5130 extending all or most of the length of the light assembly 5120, 5122, and comprising a plurality of LEDs 5130A (see FIG. 18). The invention is not limited to LEDs, however. The light assembly may use other light sources, such as fluorescent, incandescent, or halogen light sources, and may be present at only a portion of the length of the light assembly.

The lighted mirror apparatus 5110 includes a chassis 5119 mounted to the mirror 5112. The light assemblies 5120, 5122 are mounted to the chassis 5119. In other embodiments, other means of mounting the light assembly may be utilized.

The exemplified apparatus 5110 includes a support structure 5170 for supporting the mirror. In the exemplified embodiment, the support structure does not form part of a medicine cabinet. In other embodiments, however, the apparatus may form part of a medicine cabinet. Co-owned U.S. Pat. No. 10,687,618 is incorporated herein by reference in its entirety. The disclosed light assemblies may be used with any type of medicine cabinet, including those cabinet features discussed therein. For example, when used with a medicine cabinet having a door upon which the mirror is mounted, the door can extend behind the respective light assemblies.

Returning to FIGS. 15-18, especially FIG. 17, the exemplified light assembly 5120 includes an illumination element 5137 comprising a front light emitting surface 5139. The illumination element 5137 is optically coupled to the light source 5130 and configured to transmit the light and emit at least a portion of the light 5126 (FIG. 15) from the front light emitting surface 5139.

The exemplified illumination element 5137 is positioned so that: (1) the front light emitting surface 5139 is adjacent to and extends along the at least one mirror edge 5121; (2) the front light emitting surface 5139 protrudes outward from the at least one mirror edge 5121 in a direction away from the center plane 5124; and (3) the front light emitting surface 5139 protrudes outward from the mirror plane in a forward direction. As used herein, the term "outward" means increasing in distance orthogonally from the center plane 5124, and "forward" means increasing in distance orthogonally from the mirror plane 5116 in the direction away from the rear surface 5112A of the mirror 5112.

The exemplified illumination element 5137 comprises a multi-layer panel comprising a diffusive light guide layer 5136, an optically clear cover layer 5140 that comprises the front light emitting surface 5139, and a reflective layer 5138. The diffusive light guide layer 5136 is located between the reflective layer 5138 and the optically clear cover layer 5140. The multi-layer panel 5137 may be a coextruded multi-layer panel, as will be discussed in more detail below. The invention is not limited to the above layers, as the illumination element may omit the reflective layer and/or the cover layer 5140.

While the exemplified multi-layer panel 5137 has an arcuate transverse cross-sectional profile (and each individual layer 5136, 5138, 5140 of the multi-layer panel 5137 has an arcuate transverse cross-sectional profile), in other embodiments the panel 5137 and its layers may have alternative profiles.

Figure 19:
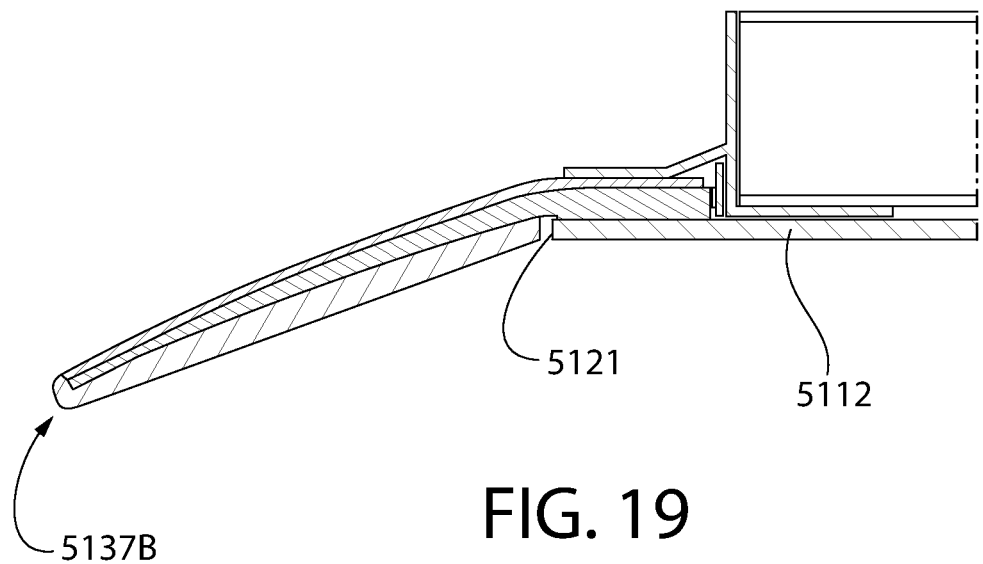
FIGS. 19-22 are cross sectional views of first light assemblies according to alternative embodiments.
Figure 20:
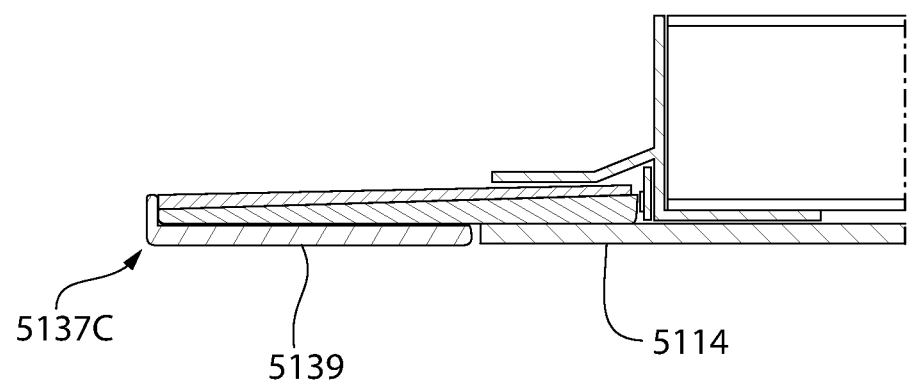
Figure 21:
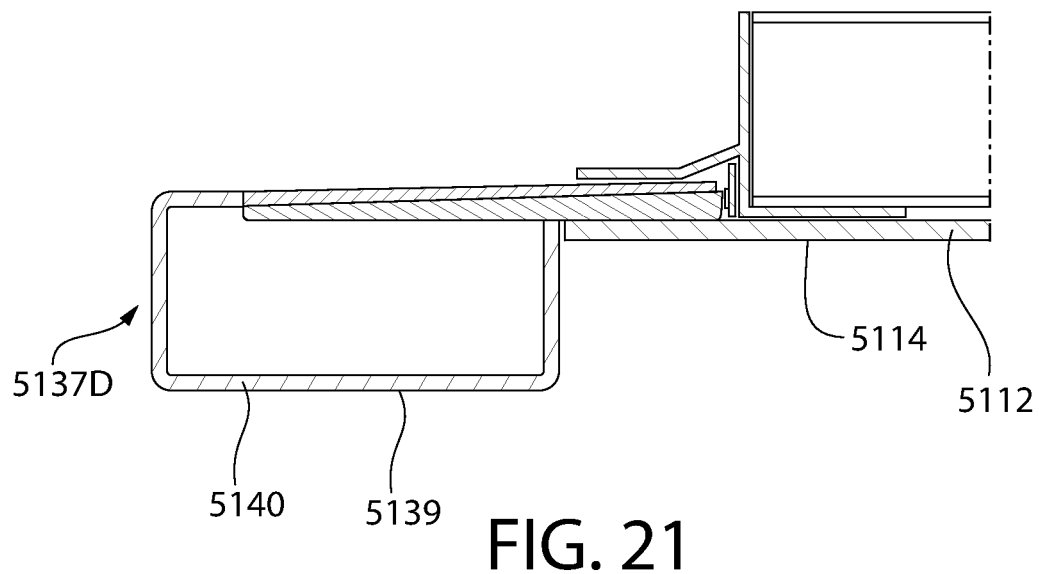
Figure 22:
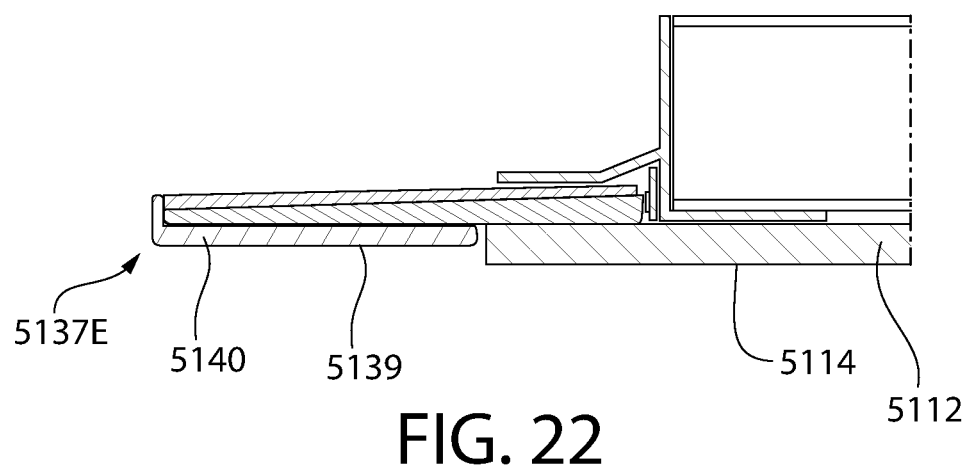

FIGS. 19-22 are cross sectional views of first light assemblies according to alternative embodiments. While the components are the same as light assembly 5120, the profiles or positioning of the components are different. FIG. 19 shows the bend in the illumination element 5137B being present at the edge 5121 of the mirror 5112. FIG. 20 shows no bend or arc in the illumination element 5137C, and the mirror front surface 5114 is flush with the front light emitting surface 5139. FIG. 21 shows an illumination element 5137D in which the optically clear cover layer 5140 is shaped to create a hollow clear lens that extends in front of (i.e. outward from or proud) the mirror front surface 5114 of the mirror 5112. By contrast FIG. 22 is a cross sectional view of an illumination element 5137E that is recessed from the front surface 5114 of the mirror 5112. Thus, in the embodiment of FIG. 22, the front light emitting surface 5139 is behind the mirror front surface and its mirror plane, and the front light emitting surface does not protrude outward from the mirror plane in a forward direction.

The exemplified diffusive light guide layer 5136 comprises an optically clear body 5133 and light diffusive elements 5134 embedded in the optically clear body 5133. The light diffusive elements 5134 may be, for example, internal bubbles, reflectant, and/or white material to diffuse light. These elements are a low-cost alternative to etching, which is an alternative method for causing diffusion and scattering.

The exemplified reflective layer 5138 comprises a reflective surface 5142 adjacent a rear surface 5143 of the diffusive light guide layer. The reflective surface 5142 is a curved surface in a direction orthogonal to the center plane 5124, and has a radius of curvature that increases with distance from the center plane 5124. The exemplified reflective layer 5138 comprises a reflective white material, though other colors may be used. The reflective layer helps ensure light is directed in a preferred direction forward and towards the user.

The exemplified optically clear cover layer 5140 terminates in a proximal edge 5141 adjacent to mirror edge 5121. Further, the optically clear cover layer 5140 wraps around a distal edge 5132 of the diffusive light guide layer 5136. The exemplified optically clear cover layer 5140 may provide visual depth and prevent scratching of the diffusive light guide layer. It may be made of plastic or one or more other materials.

As shown in FIG. 17, the exemplified light source 5130 is positioned behind the mirror 5112 and inward from mirror edge 5121. Further, a portion of the diffusive light guide layer 5136 extends behind the mirror 5112 and terminates in a light input edge 5135 adjacent to the light source 5130. The exemplified light source 5130 is positioned behind the mirror 5112 and inward from the at least one mirror edge 5121. An inner portion 5139A of the exemplified front light emitting surface 5139 is substantially flush with an edge portion 5114A of the front surface 5114 of the mirror. The light source 5130 is configured to output the light in a direction outward from the center plane 5124. The illumination element 5137 is configured to redirect at least a portion of the light 5126 being emitted from the front light emitting surface 5139 in a direction toward the center plane 5124 through reflection, refraction, diffusion, or combinations thereof.

The exemplified front light emitting surface 5139 is a curved surface in a direction orthogonal to the center plane 5124. Further, the front light emitting surface 5139 has a radius of curvature that increases with distance from the center plane 5124.

Figure 23:
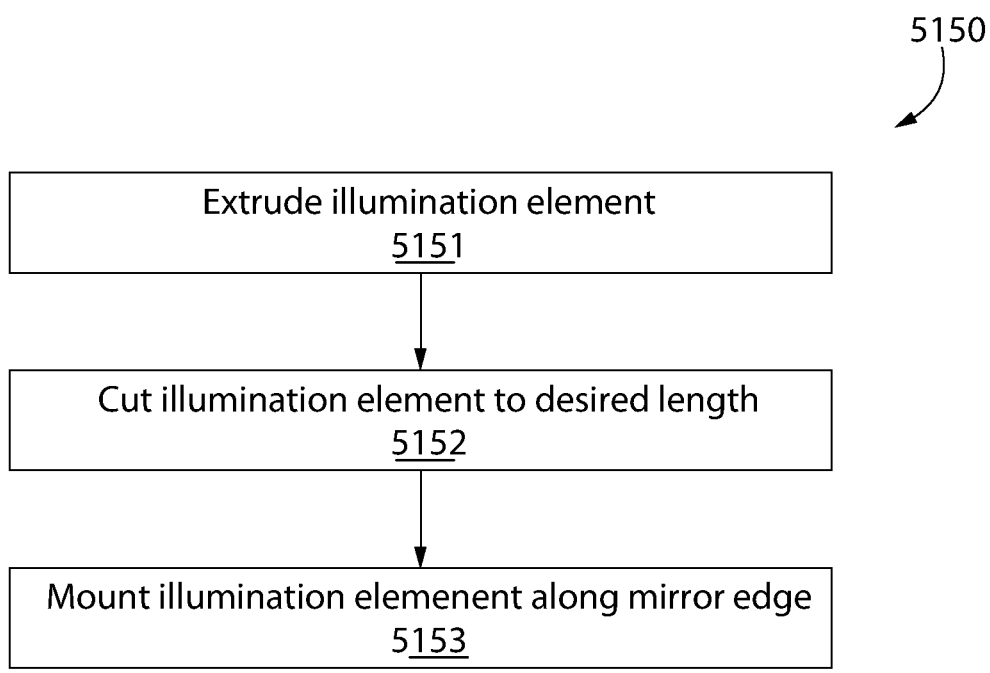
FIG. 23 is a flow chart for a method of forming a lighted mirror apparatus according to one embodiment.

FIG. 23 is a flow chart for a method 5150 of forming a lighted mirror apparatus (such as the apparatus 5110 described in FIG. 13-18 above) according to one embodiment. In operation 5151, the illumination element 5137 is extruded, the illumination element 5137 comprising the front light emitting surface 5139 and the light receiving edge 5135. In a preferred embodiment, the optically clear cover layer 5140, the diffusive light guide layer 5136, and the reflective layer 5138 are coextruded to form the illumination element 5137, though the invention is not so limited.

In the exemplified embodiment, each of the layers 5136, 5138, 5140 of the illumination element 5137 is formed of a plastic. Further, the plastics of the layers 5136, 5138, 5140 are selected so that chemical bonding occurs between adjacent ones of the layers during the coextrusion. In other embodiments, other materials may be used.

In operation 5152, the illumination element 5137 is cut to a desired axial length that corresponds to a length of the mirror edge 5121. In operation 5153, the illumination element 5137 is mounted along a mirror edge 5121 of a mirror 5112, the light receiving edge 5135 of the illumination element 5137 being optically coupled to the light source 5130 mounted to the mirror 5112.

According to the exemplified method, the light assemblies 5120, 5122 are mounted directly to the mirror 5112. Further, the lighted mirror apparatus 5110 includes a chassis 5119 mounted to the mirror 5112. The light assemblies 5120, 5122 are mounted to the chassis 5119. In other embodiments, other mounting means may be utilized.

In one embodiment, the mounting of the illumination element (operation 5153) includes adhering the illumination element 5137 to the rear surface 5112A of the mirror 5112. The mounting further includes (a) applying an adhesive material (not shown) to at least one of a portion 5144A of the rear surface 5112A of the mirror 5112 and/or to a portion 5144B of a front surface 5137A of the illumination element 5137; and (b) pressing the portion 5144A of the rear surface 5112A of the mirror 5112 and the portion 5144B of the front surface 5137A of the illumination element 5137 together. The adhesives discussed herein may be any type of adhering material, including two-sided adhesive tape and/or a fluidic adhesive composition. The mounting of the illumination element (operation 5153) may further include (a) mounting the light source 5130 to a portion 5119A of the chassis 5119; and (b) mounting a portion 5119C of the chassis 5119 to the rear surface 5112A of the mirror 5112.

In certain embodiments, the mounting of the illumination element (operation 5153) includes (a) mounting the light source 5130 to a first portion 5119A of the chassis 5119; (b) mounting the illumination element 5137 to a second portion 5119B of the chassis 5119, thereby forming a light unit 5145; and (c) mounting the light unit 5145 to the rear surface 5112A of the mirror 5112 so that the illumination element 5137 extends along and protrudes outward from the mirror edge 5121 of the mirror 5112 and the light source 5130 is behind the mirror 5112.

Cabinet Apparatus Having Increased Degrees of Freedom of Movement

Referring to FIGS. 24-26B, a cabinet 1000 will be described in accordance with an embodiment of the present invention. The cabinet 1000 generally comprises a housing 100 and a door 200 which is mounted to the housing 100. The housing 100 extends along a longitudinal axis B-B. The housing 100 comprises a rear wall 101, a floor 102, a ceiling 103, a first sidewall 105, and a second sidewall 104. The rear wall 101 is configured to be mounted to a support structure for hanging the cabinet from the support structure. The support structure may be a wall of a building structure, but is not limited to this and can be any support structure or support surface to which the cabinet is desired to be mounted. The rear wall 101, the floor 102, the ceiling 103, and the first and second sidewalls 104, 105 are coupled together to form the housing 100 which defines a storage compartment 106 having a front opening 107. The floor 102, the ceiling 103, and the first and second sidewalls 104, 105 all extend from an inner surface of the rear wall 101 to define the storage compartment 106. The rear wall 101, the floor 102, the ceiling 103, and the first and second sidewalls 104, 105 may be coupled together using fasteners such as screws, mechanical structures or features which fit together, adhesive, bolts, or the like.

In the exemplified embodiment, the rear wall 101 is a flat panel sheet having a planar front and rear surface. The rear wall 101 is not to be limited to this shape and structure and could take on other forms, including having non-planar surfaces or the like. The first and second sidewalls 105, 104 each have planar inner surfaces which face the storage compartment 106 to give the storage compartment 106 a standard box-like shape. However, the first and second sidewalls 105, 104 are not structurally identical to one another in the exemplified embodiment. This is because a counterweight assembly 400 is configured to be mounted to the first sidewall 105 and there is no counterweight assembly coupled to the second sidewall 104 in the exemplified embodiment. In other embodiments, a supplemental counterweight assembly may be coupled to the second sidewall 104. Moreover, even without a supplemental counterweight assembly, the second sidewall 104 could be made to be structurally identical to the first sidewall 105 in alternative embodiments. The counterweight assembly 400 and the first sidewall 105 will be described in greater detail below.

The floor 102 comprises a floor surface portion 108 and an upright wall portion 109 extending downwardly from a front edge of the floor surface portion 108. The floor surface portion 108 forms a lowermost shelf within the storage compartment 106 upon which objects may be stored within the cabinet 1000. As will be described below, the door 200 is configured to be raised vertically (i.e., axially translated in a direction of the longitudinal axis B-B of the housing 100) when the door is in a closed angular orientation to expose a lower portion of the storage compartment which includes the floor surface portion 108 so that objects stored on the floor surface portion 108 may be exposed to a user without the user having to pivot the door 200 to an open angular orientation. The door 200 is moved between fully-lowered and full-raised states (compare FIG. 35A with FIG. 35B), the door 200 is maintained in and slides along a substantially vertical plane.

In the exemplified embodiment there is a ledge 130 coupled to an inner surface 203 of the door 200. The ledge 130 comprises a vertical wall portion 131 which is coupled to the inner surface 203 of the door 200, a horizontal support portion 132 which protrudes horizontally from the vertical wall portion 131 and protrudes from the front surface 201 of the door 200, and a retention element 133. The vertical wall portion 131 of the ledge 130 may be coupled to the inner surface 203 of the door 200 using adhesives in some embodiments, although the invention is not to be so limited in all embodiments and other features such as brackets, fasteners, mounting elements, or the like may be used to couple the ledge 130 to the door 200. In the exemplified embodiment, the retention element 133 is an angled portion or lip which protrudes obliquely upwardly from a terminal end of the horizontal support portion 132. However, the retention element 133 could take on other forms in other embodiments. For example, in one embodiment the retention element 133 may be a groove (see FIG. 35D) formed into the horizontal support portion 132 of the ledge 130. In still other embodiments, the retention element 133 may be a lip, a ridge, an adhesive, or a roughened surface on the horizontal support portion 132 of the ledge 130. In such alternative embodiments, the angled portion may be omitted or maintained.

Figure 24:
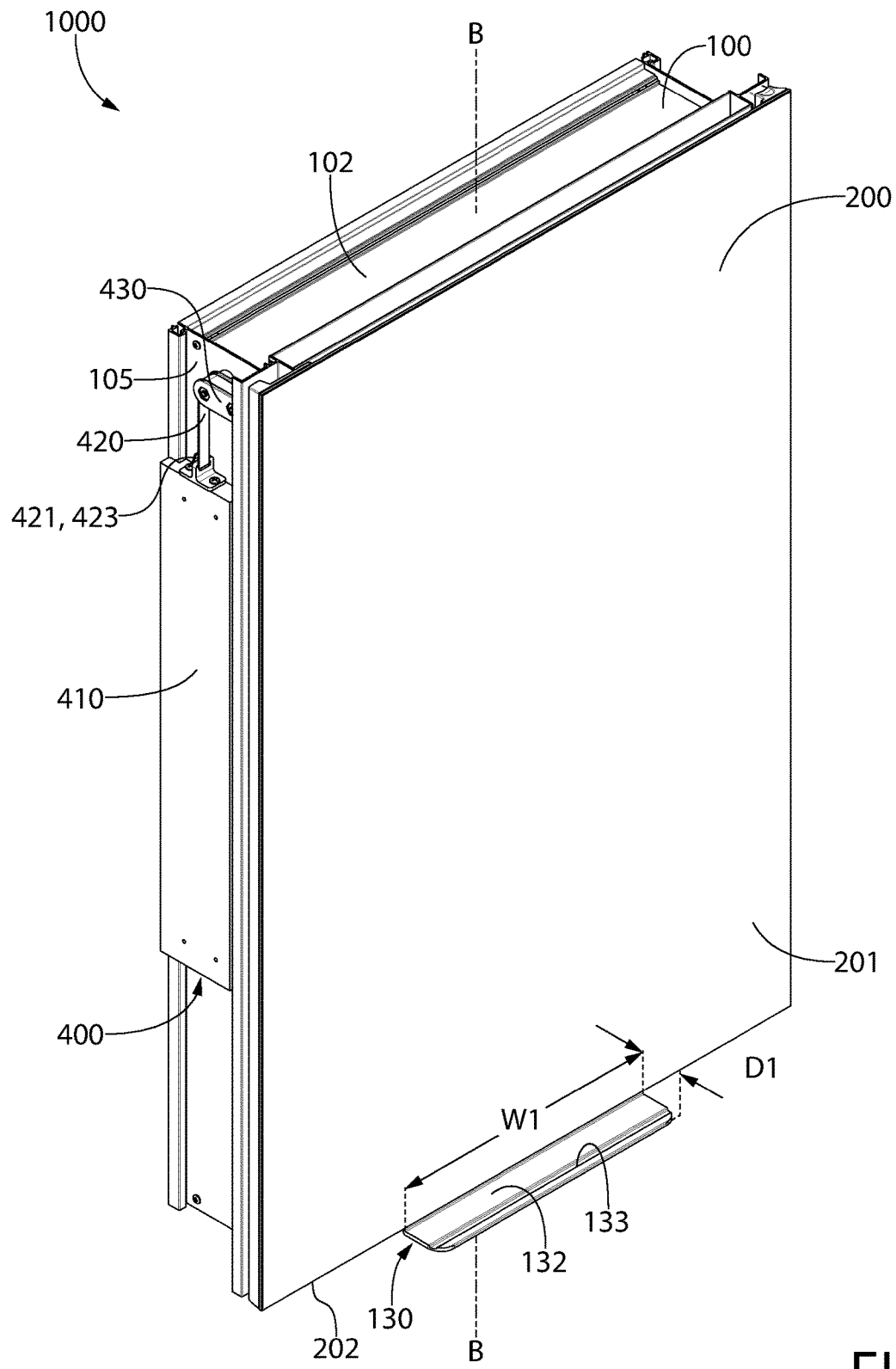
FIG. 24 is a front perspective view of a cabinet in a fully-lowered state and in a closed angular orientation in accordance with an embodiment of the present invention.

The horizontal support portion 132 of the ledge 130 provides a surface upon which a user can rest an article, such an a mobile phone, a tablet, or the like. Moreover, the horizontal support portion 132 is located below a bottom edge 202 of the door 200. Because the ledge 130 is coupled to the door 200, the ledge 130 moves up and down with the door 200 as the door moves between its fully-lowered state (FIG. 24) and its fully raised state (FIG. 31). even when the door is in its fully-lowered position and in the closed angular orientation, as depicted in FIG. 24. In the exemplified embodiment the ledge 130 has a width that is less than a width of the door 200. Thus, when the door 200 is in the closed angular orientation and the fully-lowered position as shown in FIG. 24, a portion of the bottom edge 202 of the door 200 remains exposed. That is, a portion of the bottom edge 202 of the door 200 is not covered by the ledge 200 or the ledge does not span across a portion of the bottom edge 202 of the door 200.

The horizontal support portion 132 of the ledge 130 protrudes beyond the front surface 201 of the door 200. In the exemplified embodiment, the horizontal support portion 132 of the ledge 130 protrudes from the front surface 201 of the door 200 by a depth D1. The depth D1 may be at least one inch in some embodiments, and more specifically at least 1.25 inches in some embodiments. Moreover, the ledge 130 has a width W1 that is less than a width of the door 200. The width W1 of the ledge 130 may be in a range of 7 inches to 11 inches, and more specifically 8 inches to 10 inches, and more specifically approximately 9 inches. In some embodiments, the width W1 of the ledge 130 may be less than one-half of the width of the door 200. A user can store or rest an article on the horizontal support portion 132 of the ledge 130 regardless of the positioning of the door 200. In the exemplified embodiment, the retention element 133 is a lip or end wall portion that extends upwardly at an angle from the terminal end of the horizontal support portion 132 to facilitate holding the article in place on the ledge 130. In other embodiments the horizontal support portion 132 may comprise a groove, channel, or notch therein within which a bottom edge of the article (e.g., phone) may nest to maintain the article on the ledge 130.

While the ledge 130 is illustrated as being coupled to the door 200 in the exemplified embodiment, the invention is not to be so limited in all embodiments. In some embodiments, the ledge 130 may be coupled to the floor 102 of the housing 100. That is, an adhesive, fasteners, or the like may be used to secure the vertical wall portion 131 of the ledge 130 to the upright wall portion 109 of the floor 102.

The cabinet 1000 comprises a plurality of shelves 110, 111, 112 that are located within the storage compartment 106 and coupled to the first and second sidewalls 105, 104 and/or to the rear wall 101. The shelves 110, 111, 112 may be coupled to the housing 100 via pins, tabs, adhesive, fasteners, or using any other technique commonly used to secure shelves to a cabinet. In the exemplified embodiment, the shelves 110, 112 extend only part of the way across the storage compartment 106 whereas the shelf 111 extends the full length of the storage compartment 106. It should be appreciated that the exact length of the shelves 110, 111, 112 may be modified from that which is depicted in the drawings in other embodiments. Moreover, while there are three shelves 110, 111, 112 in the exemplified embodiment, there could be more than three shelves or less than three shelves in other embodiments. In still other embodiments, all of the shelves 110, 111, 112 may be omitted and the storage compartment 106 may be a continuous open cavity space.

The cabinet 1000 comprises a power supply unit 120 that is located within the storage compartment 106. The power supply unit 120 may be coupled to any of one or more of the rear wall 101, the floor 102, the ceiling 103, or the first and second sidewalls 105, 104. The power supply unit 120 comprises one or more electrical outlets configured to receive a power plug for purposes of charging one or more electronic components. The electrical outlets on the power supply unit 120 may be standard plug sockets, USB sockets, or a combination of both. Although not shown in the drawings, the power supply unit 120 is operably coupled to a mains power supply when the cabinet 1000 is assembled and mounted on a support surface such as a wall. In the exemplified embodiment, the power supply unit 120 is located within the storage compartment 106 between the lowermost two shelves 111, 112. However, the invention is not to be so limited in all embodiments and the power supply unit 120 may be positioned at other axial locations within the storage compartment 106 in other embodiments. In one particular embodiment, the power supply unit 120 may be located between the floor 109 and the lowermost shelf 112 (FIG. 35C).

Figure 25:
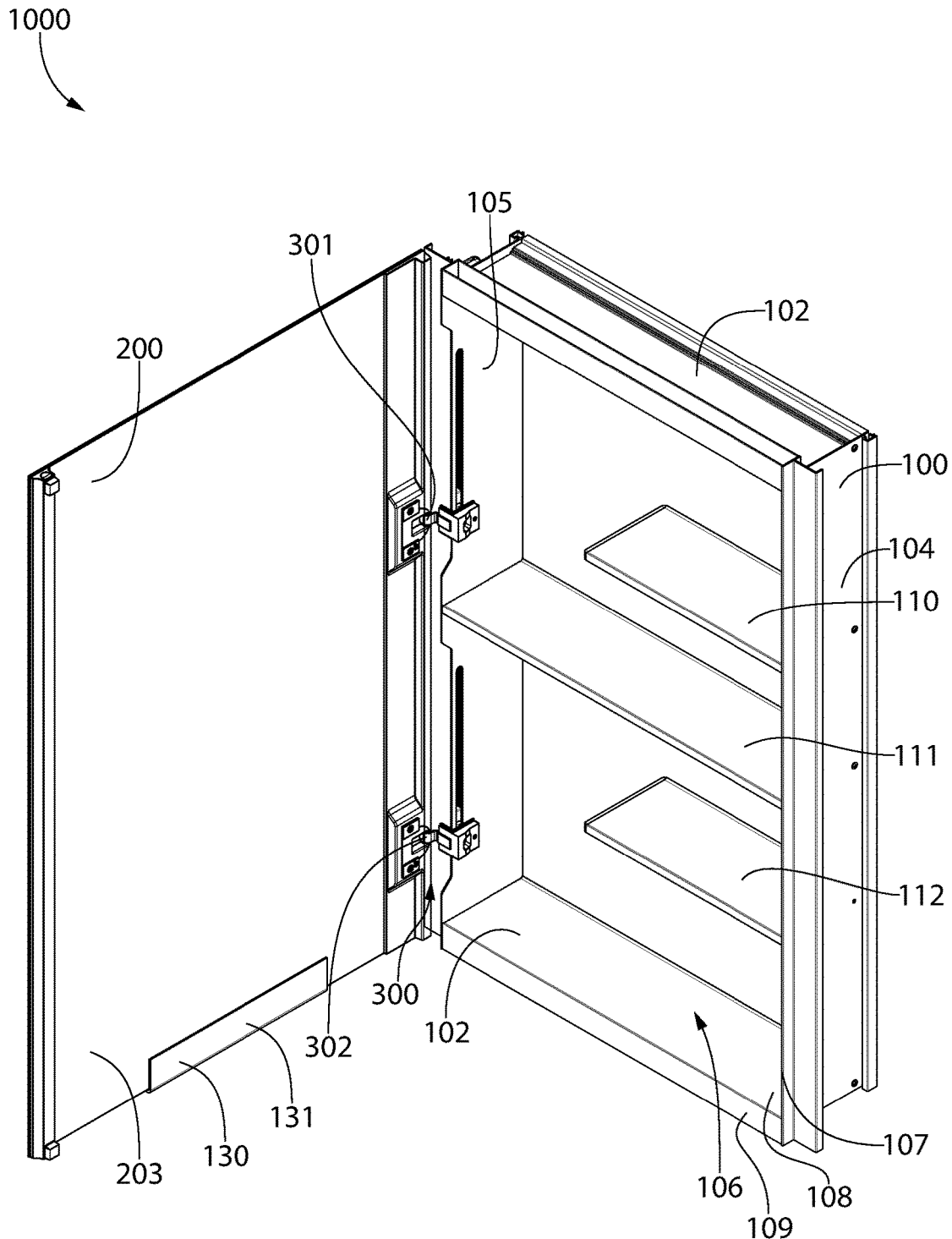
FIG. 25 is a front perspective view of the cabinet of FIG. 24 in the fully-lowered state and in an open angular orientation.
Figure 26A:
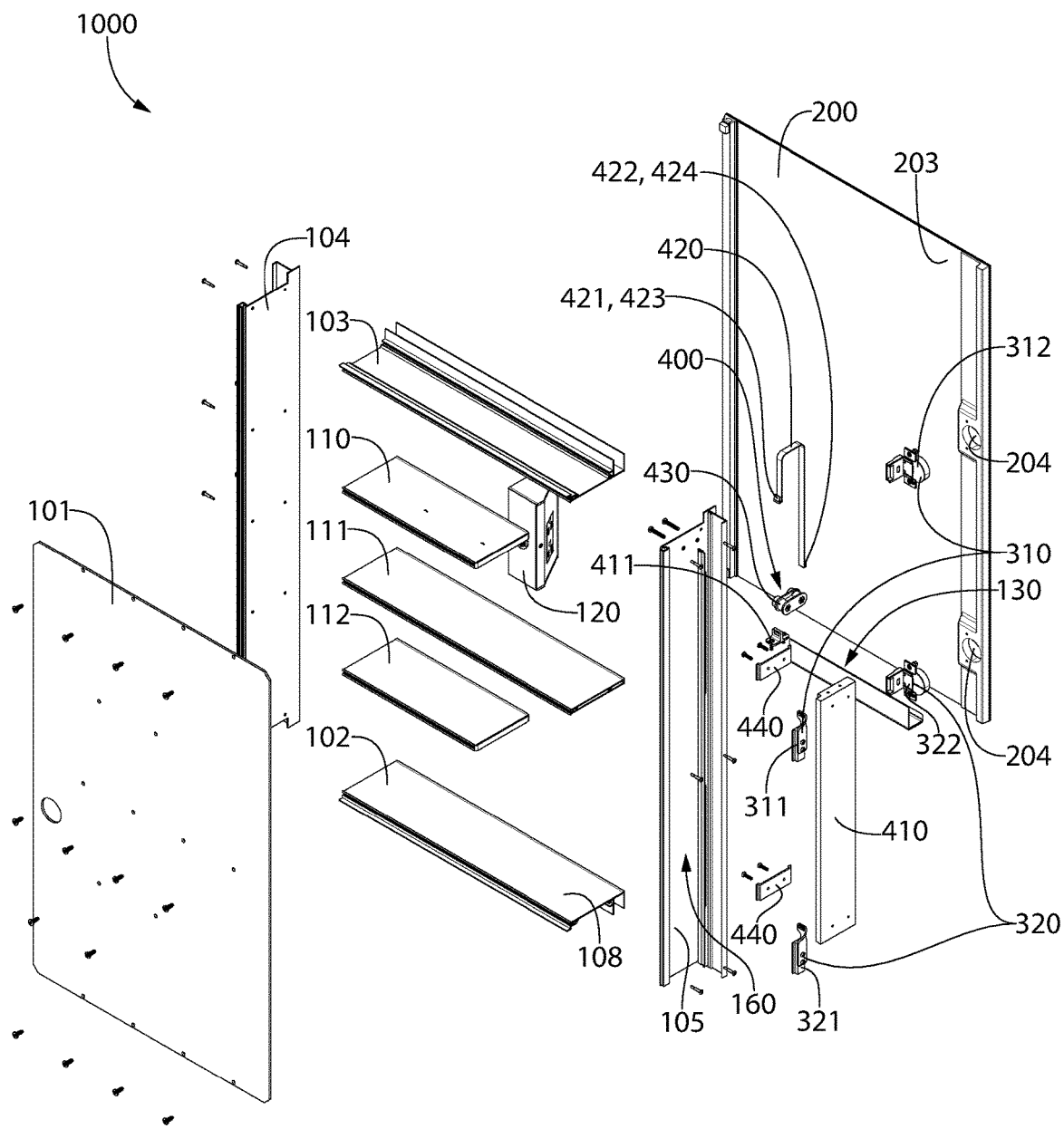
FIG. 26A is a rear perspective exploded view of the cabinet of FIG. 24.
Figure 26B:
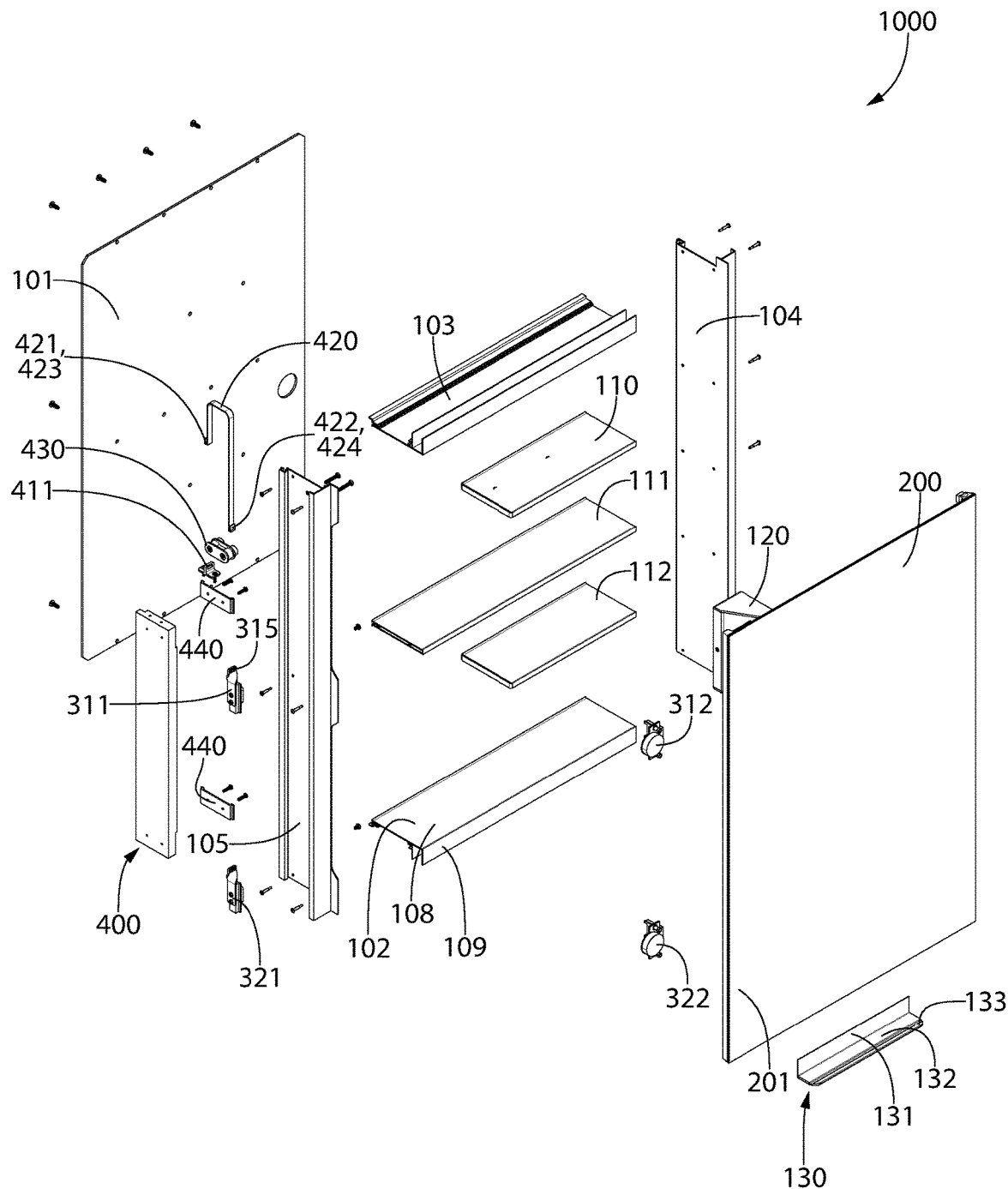
FIG. 26B is a front perspective exploded view of the cabinet of FIG. 24.

The door 200 is coupled to the housing 100 and can be pivoted between a closed angular orientation (FIG. 24) and an open angular orientation (FIG. 25). In the closed angular orientation, the door 200 closes the front opening 107 of the storage compartment 106. When the door 200 is in the open angular orientation, the front opening 107 is exposed to permit a user to gain access into the storage compartment 106. The door 200 comprises the front surface 201 which is exposed when the door 200 is in both of the open and closed angular orientations. The front surface 201 of the door 200 may be a mirrored surface in some embodiments. Thus, the door 200 may comprise a mirror. In the exemplified embodiment, the door 200 may be coupled to the housing 100 by a mounting unit 300. In the exemplified embodiment, the mounting unit 300 comprises a first hinge 310 and a second hinge 320. In other embodiments, just a single hinge or more than two hinges may be used. In still other embodiments, the mounting unit 300 may take on other forms, some examples of which will be described below with reference to FIGS. 39-42.

As mentioned above, the door 200 is coupled to the housing 100 by the mounting unit 300, which in the exemplified embodiment comprises the first hinge 310 and the second hinge 320. The first hinge 310 comprises a first hinge portion 311 that is coupled to the housing 100 and a second hinge portion 312 that is coupled to the door 200. Similarly, the second hinge 320 comprises a first hinge portion 321 that is coupled to the housing 100 and a second hinge portion 322 that is coupled to the door 200. In the exemplified embodiment, the first hinge portions 311, 321 of each of the first and second hinges 310, 320 is coupled to the first sidewall 105 of the housing 100. As mentioned above, the mounting unit 300 may comprise just one hinge or more than two hinges in other embodiments.

In the exemplified embodiment, the second hinge portions 312, 322 of each of the first and second hinges 310, 320 is fixedly coupled to the door 200. That is, the second hinge portions 312, 322 are coupled to the door 200 using screws. The second hinge portions 312, 322 comprise disc-shaped elements and brackets extending from the top and bottom of the disc-shaped elements. The door 200 comprises pockets or recesses 204 along its inner surface 203 within which the disc-shaped elements nest when the second hinge portions 312, 322 are coupled to the door 200. The brackets have holes therein for inserting a screw or other fastener to fixedly coupled the second hinge portions 312, 322 to the door 200. The second hinge portions 312, 322 are pivotably coupled to the first hinge portions 311, 321 to permit pivoting of the door between the closed and open angular orientations.

In the exemplified embodiment, the first hinge portions 311, 321 of each of the first and second hinges 310, 320 is slidably coupled to the housing 100. Thus, the hinges 310, 320 are configured to slide relative to the housing 100 as the door 200 moves between fully-lowered and fully-raised states (compare FIG. 24 to FIG. 31), and the hinges 310, 320 are fixed and do not move or slide relative to the door 200 as the door 200 moves between the fully-lowered and fully-raised states. However, the invention is not to be so limited in all embodiments and the hinges 310, 320 may be slidably coupled to the door 200 and fixedly coupled to the housing 100 in other embodiments, one example of which will be described below with reference to FIGS. 37 and 38. Additional details about the first and second hinges 310, 320 will be provided below with reference to FIGS. 29A and 29B.

Figure 31:
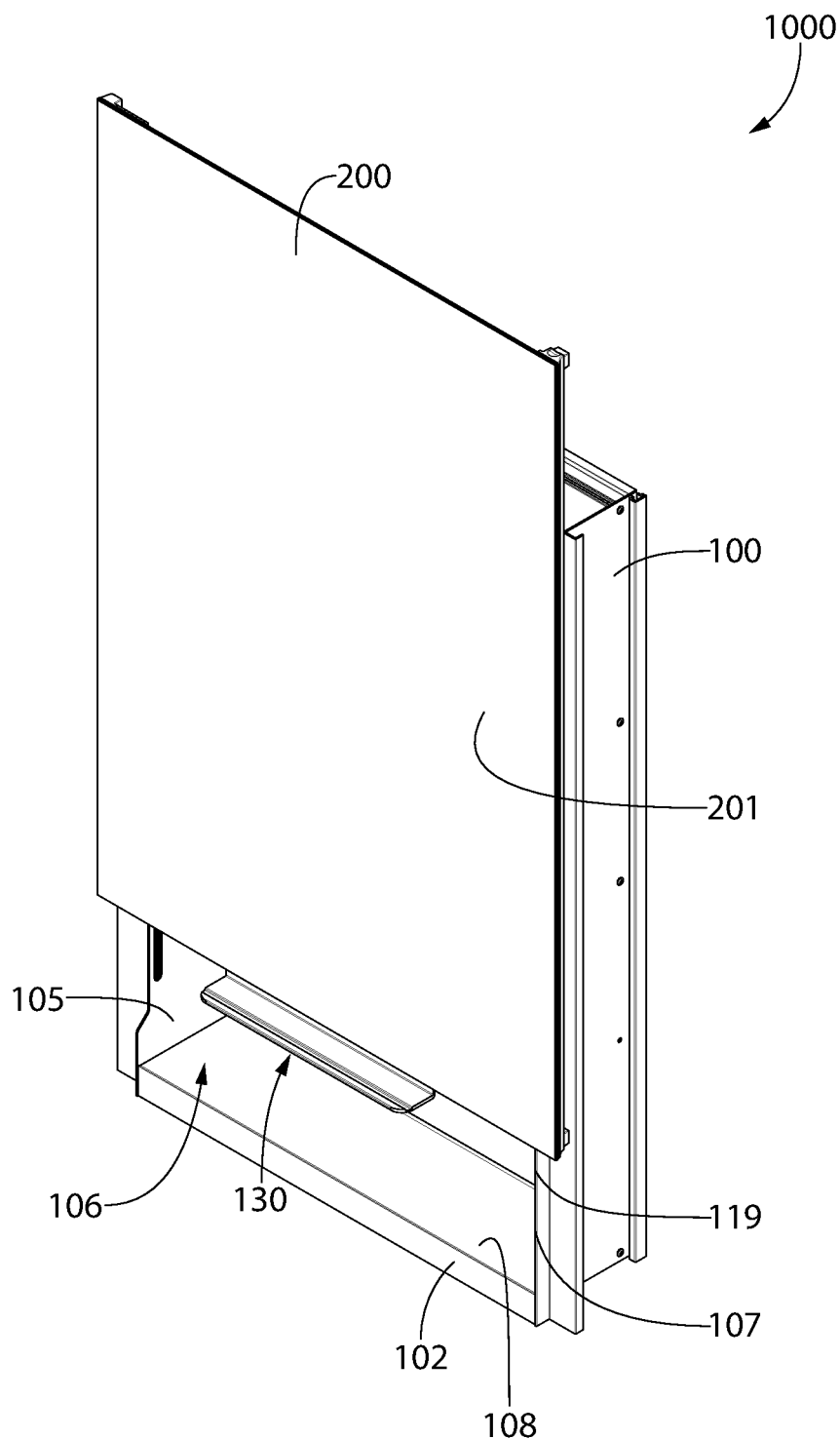
FIG. 31 is a front perspective view of the cabinet of FIG. 24 in a fully-raised state and in the closed angular orientation.

Referring to FIGS. 24-28, the counterweight assembly 400 of the cabinet 100 will be further described. As noted above, the door 200 is configured to be altered between a fully-lowered state as shown in FIG. 24 and a fully-raised state as shown in FIG. 31. As used herein, the term "raised" indicates movement in a direction generally opposite the gravitational force vector, while the term "lowered" indicates movement in a direction generally parallel with the gravitational force vector.

The counterweight assembly 400 is configured to balance the door 200 at any vertical position between and including the fully-lowered and fully-raised states or positions. The counterweight assembly 400 generally comprises a counterweight 410, a counterweight cord 420, and a fixed pulley 430. The fixed pulley 430 is mounted to the first sidewall 105 of the housing 100 and is used to guide the counterweight cord 420 during movement of the door 200 between the raised and fully-lowered states or positions. The counterweight cord 420 comprises a first end 421 and a second end 422. Furthermore, the counterweight cord 420 comprises a first connection feature 423 located at the first end 421 and a second connection feature 424 located at the second end 422. In the exemplified embodiment, the first connection feature 423 is a first hook located at the first end 421 of the counterweight cord 420 and the second connection feature 424 is a second hook located at the second end 422 of the counterweight cord 420.

The counterweight 410 has a weight or mass that is configured to apply a force which opposes the weight or mass of the door 200 to maintain the door 200 in a balanced position regardless of the vertical height at which the door 200 is positioned relative to the housing 100. Thus, the counterweight 410 may have a weight or mass which is equal to the weight or mass of the door 200. In some embodiments the counterweight 410 may have a weight or mass between 3 kg and 4 kg, more specifically between 3.5 kg and 3.7 kg. However, the weight or mass of the door 200 may dictate the weight or mass of the counterweight 410 such that the weigh or the mass of the counterweight 410 may be adjusted depending on the weight or mass of the door 200. In the exemplified embodiment, the counterweight 410 is coupled to the first hinge 310 by the counterweight cord 420. Because the first hinge 310 is coupled to the door 200, this results in the counterweight 410 being indirectly coupled to the door 200. In other embodiments, the counterweight 410 may be coupled to both of the first and second hinges 310, 320, to only the second hinge 320, or directly to the door 200, as long as the counterweight 410 is properly coupled to the door 200 so that the weight/mass of the counterweight 410 and door 200 offset one another.

The counterweight 410 comprises a connection feature 411. In the exemplified embodiment, the connection feature 411 is located along a top edge of the counterweight 410. Furthermore, in the exemplified embodiment the connection feature 411 of the counterweight 410 comprises a hole. In particular, the connection feature 411 may be an eyelet. Thus, the first connection feature 423 (i.e., the first hook) located at the first end 421 of the counterweigh cord 420 extends into and through the hole of the connection feature 411 of the counterweight 410 to couple the counterweight cord 420 to the counterweight 410. Similarly, the first hinge 310 comprises a connection feature 315. In the exemplified embodiment, the connection feature 315 of the first hinge 310 comprises a hole. In particular, the connection feature 315 of the first hinge 310 may be an eyelet. In the exemplified embodiment, the connection feature 315 is an upwardly extending tab to which an end of the counterweight cord 420 is coupled. The second connection feature 424 (i.e., the second hook) located at the second end 422 of the counterweight cord 420 extends into and through the hole of the connection feature 315 of the first hinge 310 to couple the counterweight cord 420 to the first hinge 315.

Thus, the first hinge 310 is coupled to the counterweight 410 via the counterweight cord 420. Furthermore, because the first hinge 310 is coupled to the door 200, the counterweight 410 is indirectly coupled to the door 200 so that the weight or mass of the counterweight 410 balances or offsets the weight or mass of the door 200. The counterweight cord 420 wraps over and around the top of the fixed pulley 430. As the door 200 is transitioned between fully-lowered (FIG. 27) and fully-raised (FIG. 32) states, the counterweight 410 moves an equal distance in an opposite axial direction relative to the door 200 and the counterweight cord 420 moves relative to the fixed pulley 430.

The counterweight assembly 400 also comprises a pair of follower members 440, although there could be just one follower member or more than two follower members in other embodiments. In the exemplified embodiment, each of the follower members 440 is coupled to the counterweight 410 via fasteners such as screws. However, in other embodiments the counterweight 410 may have the follower members 440 integrally formed therewith by modifying the shape of the counterweight 410. The follower members 440 are configured to retain the counterweight 410 within a counterweight track 180 that is built into the first sidewall 105 of the housing 100. Thus, the follower members 400 have a shape that engages with the counterweight track 180 so that the counterweight 410 can axially translate along the counterweight track 180 while being transversely retained by the counterweight track 180.

Figure 29A:
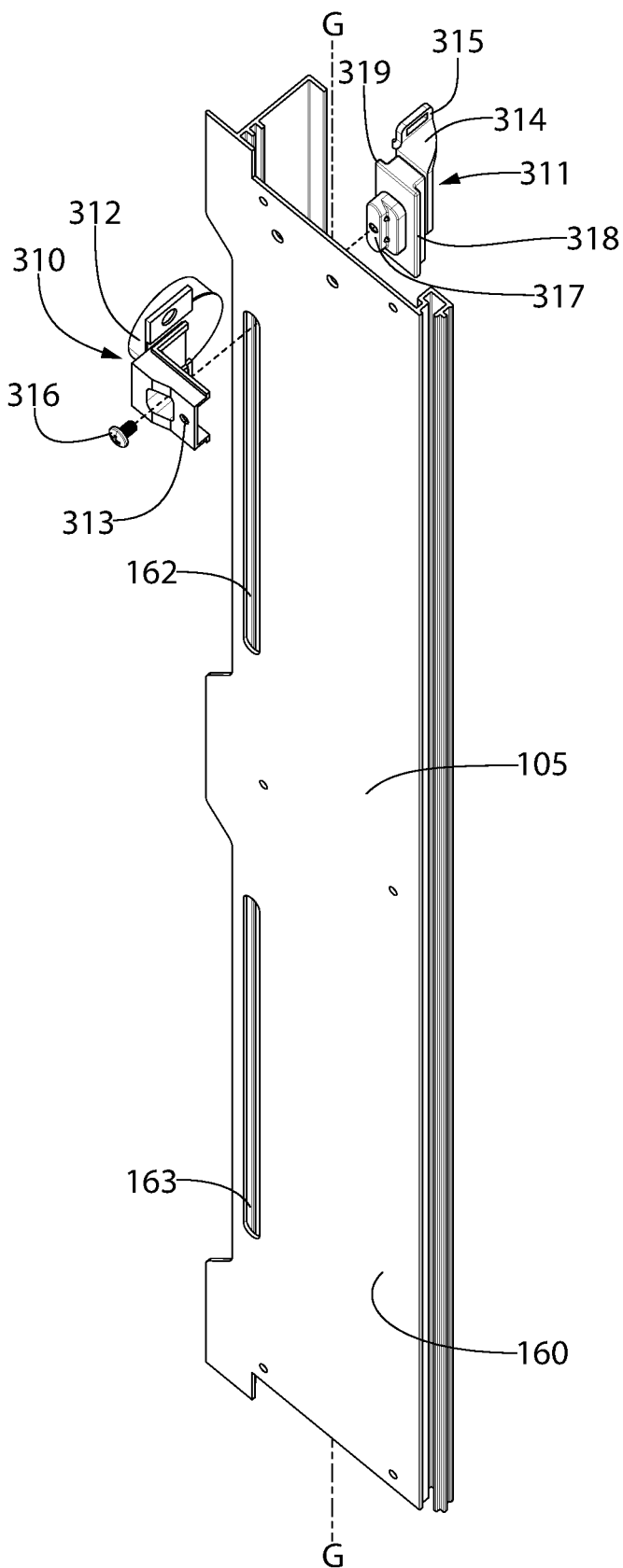
FIG. 29A is a front perspective view of a sidewall and hinge of the cabinet of FIG. 24.
Figure 29B:
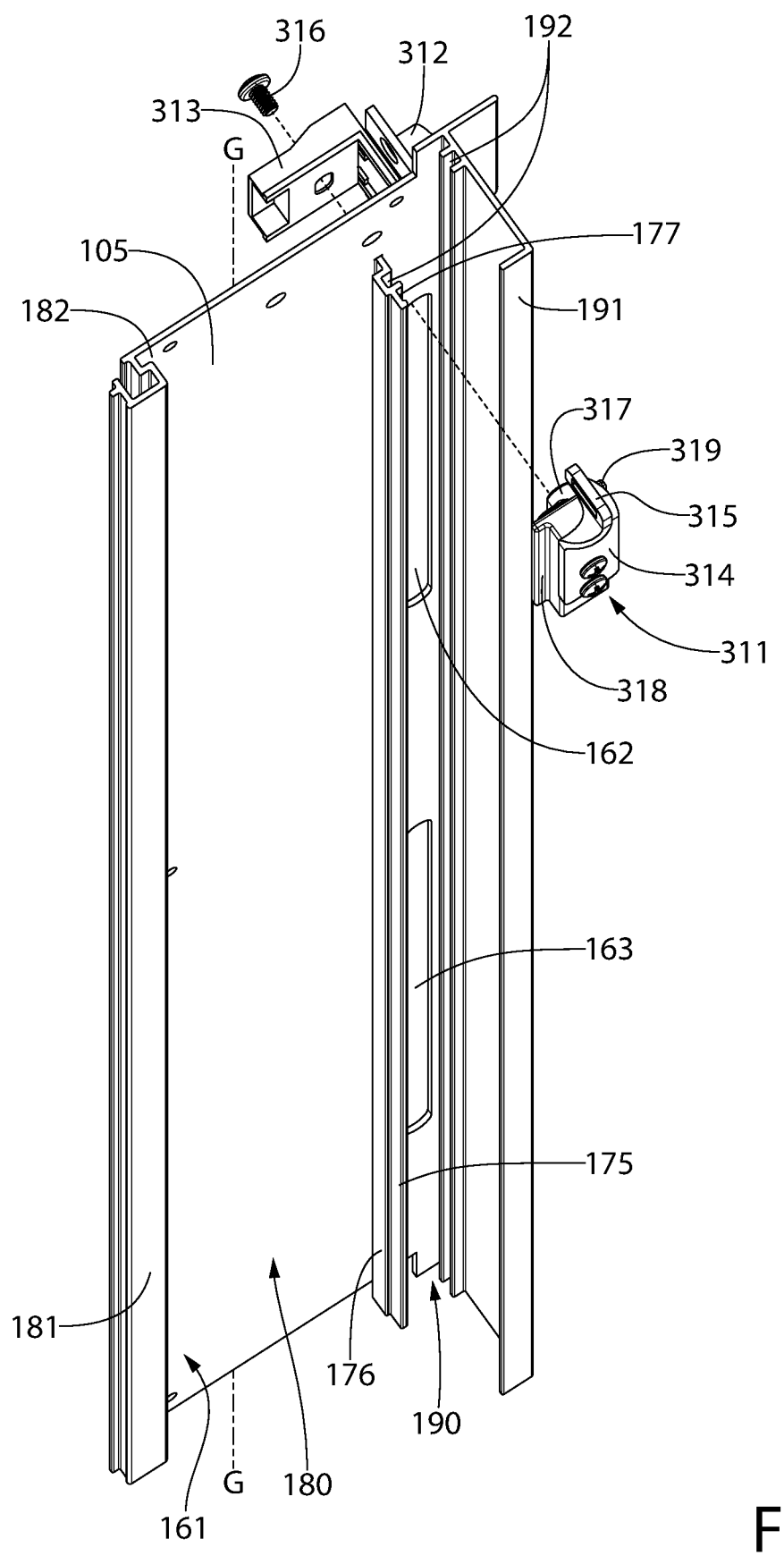
FIG. 29B is a rear perspective view of the sidewall and hinge of FIG. 29A.
Figure 30:
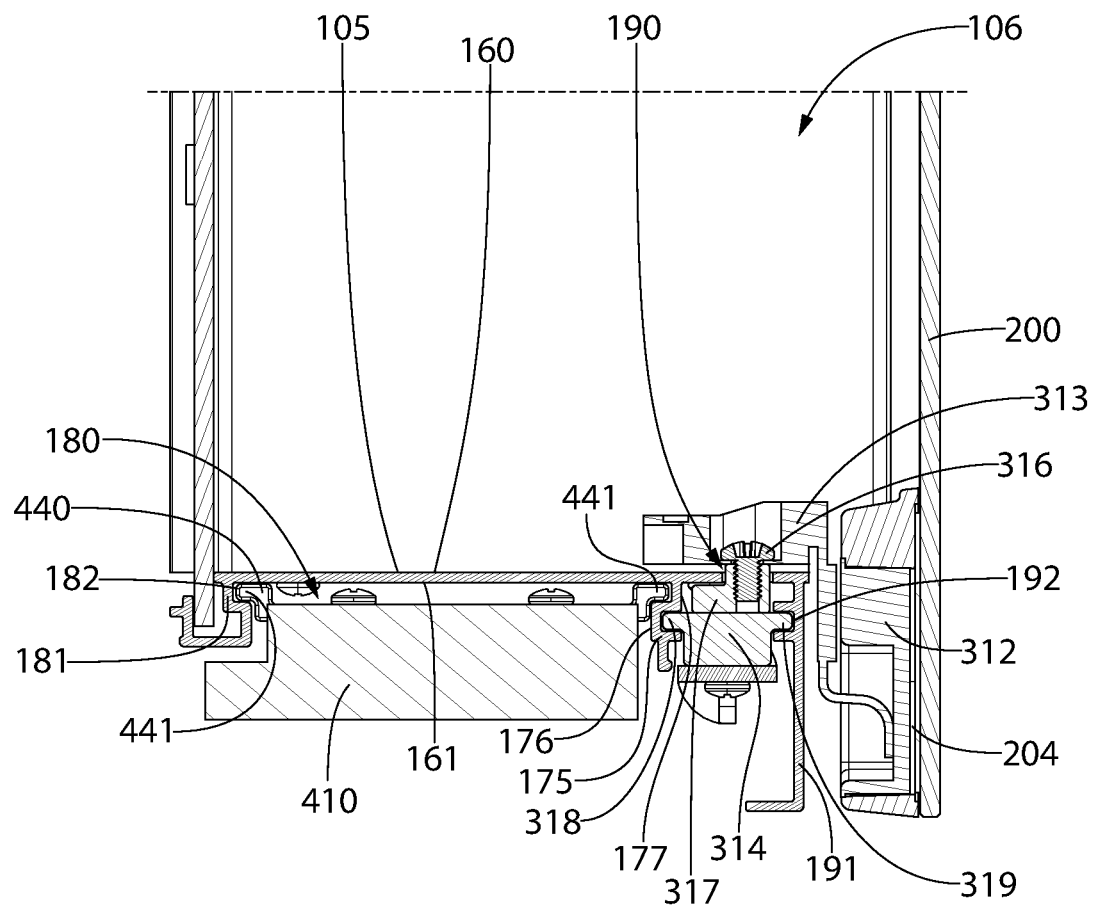
FIG. 30 is a cross-sectional view taken along line VII-VII of FIG. 27.

Referring to FIGS. 29A, 29B, and 30 concurrently, the first sidewall 105 and its relationship with the first hinge 310 will be described. The first sidewall 105 comprises an inner surface 160 that faces the storage compartment 106 of the housing 100 when the housing 100 is assembled and an outer surface 161 opposite the inner surface 160. The first sidewall 105 extends along a longitudinal axis G-G, which is parallel to a longitudinal axis B-B of the housing 100. In the exemplified embodiment, the first sidewall 105 comprises a first through-slot 162 and a second through slot 163. The first and second through-slots 162, 163 are axially aligned with one another and spaced apart from one another in the direction of the longitudinal axis G-G. In an alternative embodiment, the first and second through-slots 162, 163 may be connected to form a single slot. Each of the first and second through-slots 162, 163 is elongated in a direction of the longitudinal axis G-G of the first sidewall 105.

Furthermore, the first sidewall 105 comprises the counterweight track 180 and a hinge track 190. The counterweight track 180 and the hinge track 190 are both formed into the outer surface 161 of the first sidewall 105 and are elongated in a direction of the longitudinal axis G-G. The counterweight track 180 and the hinge track 190 are positioned side-by-side along the outer surface 161 of the first sidewall 105. The counterweight track 180 and the hinge track 190 are separated from one another by a track divider wall 175 which protrudes from the outer surface 161 of the first sidewall 105. Moreover, the hinge track 190 is aligned with the first and second through-slots 162, 163, which allows the first and second hinges 310, 320 to axially translate along the first and second through-slots 162, 163 within the hinge track 190 during vertical upward/downward movement of the door 200 relative to the housing 100.

The counterweight track 180 is defined between a first surface 176 of the track divider wall 175 and a counterweight track wall 181 which protrudes from the outer surface 161 of the first sidewall 105. The counterweight track wall 181 and the track divider wall 175 are both elongated in a direction of the longitudinal axis G-G. The first surface 176 of the track divider wall 175 and the counterweight track wall 181 comprise elongated counterweight track channels 182 within which features of the follower members 440 which are attached to the counterweight 410 nest as the counterweight 410 moves axially along the counterweight track 180. More specifically, the follower members 440 comprise tabs 441 on opposing sides thereof which nest within the counterweight track channels 182 of the track divider wall 175 and the counterweight track wall 181 respectively to transversely retain the counterweight 410 within the counterweight track 180 while allowing the counterweight 410 to translate axially along the counterweight track 180. The elongated counterweight track channels 182 are immediately adjacent to and bounded by the outer surface 161 of the first sidewall 105.

The hinge track 190 is defined between a second surface 177 of the track divider wall 175 and a hinge track wall 191 which protrudes from the outer surface 161 of the first sidewall 105. The hinge track wall 191 is also elongated along the longitudinal axis G-G. The hinge track wall 191 protrudes a greater distance from the outer surface 161 of the first sidewall 105 than both of the counterweight track wall 181 and the track divider wall 175. The second surface 177 of the track divider wall 175 and the hinge track wall 191 comprise elongated hinge track channels 192 within which features of the hinges 310, 320 (and more specifically the first portions 311, 321 of the hinges 310, 320) nest as the hinges 310, 320 move axially along the hinge track 190. The features of the hinges 310, 320 are tabs 318, 319 which protrude from opposing sides of the hinges 310, 320 and which nest within the elongated hinge track channels 192. The elongated hinge track channels 192 are defined entirely by the second surface 177 of the track divider wall 175 and the hinge track wall 191. That is, the elongated hinge track channels 192 are spaced from and not bounded directly by the outer surface 161 of the first sidewall 105.

The counterweight assembly 400 and an outer hinge portion 314 of the first portion 311 of the first hinge 310 are located adjacent to the outer surface 160 of the first sidewall 105. Thus, the entirety of the counterweight assembly 400 and the first and second hinges 310, 320 are located on the same side of the longitudinal axis B-B of the housing 100. The counterweight 410 may be located within the first sidewall 105 or along the first sidewall 105. The counterweight assembly 400 and the outer hinge portion 314 are hidden from view by a user looking directly at the cabinet 1000 by the hinge track wall 191. That is, the hinge track wall 191 protrudes a sufficient distance from the outer surface 161 of the first sidewall 105 to ensure that the counterweight assembly 400 is not readily visible to a user looking straight on at the cabinet 1000. Furthermore, there is an advantage in locating the counterweight assembly 400 along the first sidewall 105 rather than along the rear wall 101. Specifically, by having the counterweight assembly 400 along the first sidewall 105, it is much easier to mount the cabinet 1000 to a wall or other support surface and there is no need to significantly increase the overall depth of the cabinet 1000 to accommodate the counterweight assembly 400. It is worth repeating that the counterweight assembly 400 may be located along the second sidewall 104 instead of the first sidewall 105 in some embodiments as the selection of which particular sidewall to locate the counterweight assembly 400 along is not limiting of the invention described herein. The first and second sidewalls 105, 104 may be interchangeable.

As noted above, the first hinge 310 is illustrated in FIGS. 29A and 29B. While the second hinge 320 is not depicted in these figures, it should be appreciated that the details of the second hinge 320 are exactly the same as the details of the first hinge 310 in the exemplified embodiment. Thus, the description of the first hinge 310 is entirely applicable to the second hinge 320. In alternative embodiments, certain features of the second hinge 320 may differ from the first hinge 310. For example, only the first hinge 310 is coupled to the counterweight cord 420 and thus only the first hinge 310 is required to include the connection feature 315, although both of the first and second hinges 310, 320 include such a connection feature in the exemplified embodiment for manufacturing consistency.

As noted above, the first hinge 310 comprises the first hinge portion 311 and the second hinge portion 312. The first hinge portion 311 is slidably coupled to the first sidewall 105 of the housing 100 as noted above and the second hinge portion 312 is fixedly coupled to the inner surface 203 of the door 200. The first hinge portion 311 comprises an inner hinge portion 313, an outer hinge portion 314, and a hinge boss 317. The inner hinge portion 313 is located adjacent to the inner surface 160 of the first sidewall 105. The outer hinge portion 314 is located adjacent to the outer surface 161 of the first sidewall 105 The hinge boss 317 extends through the first through slot 162 of the first sidewall 105.

In the exemplified embodiment, the inner and outer hinge portions 313, 314 are separate components from one another, and the hinge boss 317 is formed integrally with the outer hinge portion 314. However, the invention is not to be so limited and in other embodiments the hinge boss 317 could be integrally formed with the inner hinge portion 313. Moreover, in the exemplified embodiment the inner hinge portion 313 is integral with the second hinge portion 312. Other configurations for the various portions of the first and second hinges 310, 320 may be possible in other embodiments as would be appreciated by persons skill in the art. The inner and outer hinge portions 313, 314 are coupled together along the first through-slot 162. In the exemplified embodiment, the inner and outer portions 313, 314 are coupled together by a screw 316, although other fasteners could be used in other embodiments and/or the inner and outer portions 313, 314 may have mating features which are configured to lock the components together. The fixed coupling of the inner and outer portions 313, 314 of the first hinge portion 311 of the first hinge 310 (and also of the hinge boss 317) allows the first hinge 310 to axially translate along the first through-slot 162 while remaining mounted to the first sidewall 105 of the housing 100. The second hinge 320 comprises identical components to the first hinge 310 and is coupled to the first sidewall 105 in an identical manner.

The outer hinge portion 314 nests within the hinge track 190, as best shown in FIG. 30. The outer hinge portion 314 comprises first and second tabs 318, 319 which nest within the hinge track channels 192. This allows the first hinge 310 to axially translate along the hinge track 190 during vertical movement of the door 200 while keeping the first hinge 310 transversely retained by the hinge track 190. That is, because the outer hinge portion 314 is fixedly coupled to the door 200, as the door 200 translates vertically upward and/or downward, the outer hinge portion 314 also translates vertically upward and/or downward within the hinge track 190. Furthermore, while the inner and outer hinge portions 313, 314 are coupled together via the fastener 316, the inner and outer hinge portions 313, 314 are not pressed tightly against the first sidewall 105 so as to ensure that the inner and outer hinge portions 313, 314 can move axially within the hinge track 190 as the door 200 moves axially upward and downward as described herein. In particular, the hinge boss 317 extends through the first elongated slot 162 and may protrude from the inner surface 160 of the first sidewall 105. This prevents the inner hinge portion 313 from directly contacting the first sidewall 105 which prevents the first hinge 310 from becoming fixedly coupled to the first sidewall 105 so that its upward/downward axial movement is permitted.

In the exemplified embodiment, the first sidewall 104 is an integrally formed singular panel component that includes a main panel body, the counterweight track 180, the track divider wall 175, and the hinge track 190, all formed as a single component.

As noted above, the door 200 is configured to be not only pivoted between the closed and open angular orientations, but also axially translated relative to the housing 100 between a fully-lowered state and a fully-raised state. FIG. 24 illustrates the door 200 in the closed angular orientation and in the fully-lowered state. When the door 200 is in the closed angular orientation and in the fully-lowered state, the door 200 covers the entirety of the front opening 107 of the storage compartment 106. Furthermore, from the fully-lowered state, the door 200 can only be moved vertically upwardly to expose and allow access to a lower axial portion of the storage compartment 106. The door 200 is unable to move downwardly further from the fully-lowered state. That is, the door 200 cannot be moved to expose only an upper axial portion of the storage compartment 106. The door 200 may be configured to move vertically upward from the fully-lowered state varying degrees or amounts. However, in the exemplified embodiment the door 200 is only configured to move upwardly a certain height sufficient to expose a lower portion of the storage compartment 106 with the door 200 prevented from being opened further due to an abutment between the first hinge 310 and the fixed pulley 430. The lower portion of the storage compartment 106 may be up to a lower 10% of the length of the storage compartment 106, or up to a lower 20% of the length of the storage compartment 106, or up to a lower 30%, or a lower 40%, or a lower 50% of the length of the storage compartment 106 in various different embodiments.

Figure 32:
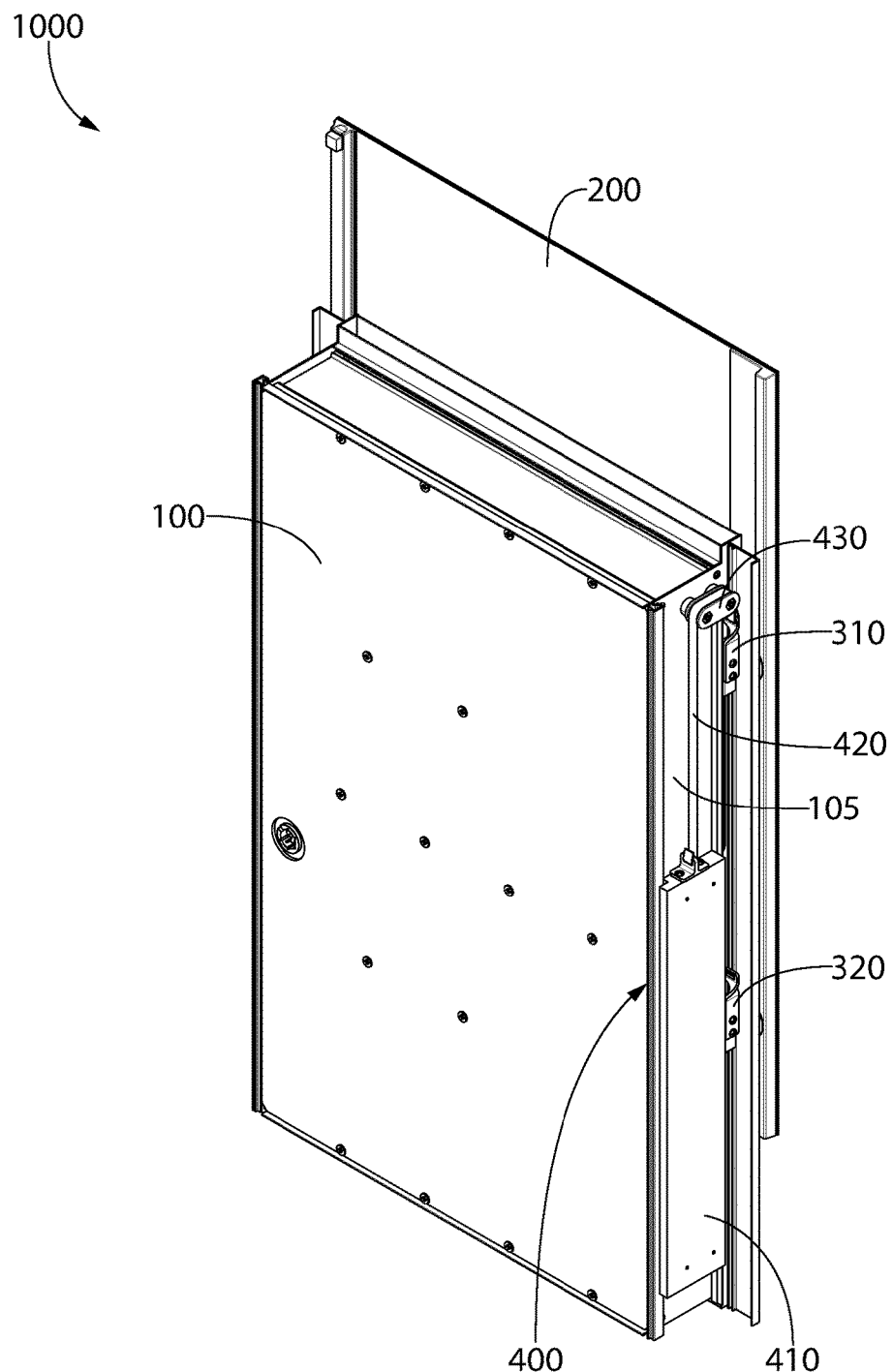
FIG. 32 is a rear perspective view of the cabinet of FIG. 24 in the fully-raised state and in the closed angular orientation.

Referring now to FIGS. 31 and 32, the cabinet 1000 is illustrated with the door 200 having been altered into the fully-raised state or raised position relative to that which was shown in FIG. 24. In FIGS. 31 and 32 the door 200 is in the closed angular configuration and in the fully-raised state. That is the door 200 has not been pivoted about its pivot axis, but has simply been raised vertically or axially translated relative to the housing 100. As seen in FIG. 31, when the door 200 is in the closed angular orientation and the fully-raised state, the door 200 covers an upper portion of the front opening 107 and leaves a lower portion 119 of the front opening 107 unobstructed by the door 200 to allow access to a lower portion of the storage compartment 106. In the exemplified embodiment, the door 200 may be configured to move between 5 and 10 inches, more specifically between 6 and 8 inches, when transitioning between the fully-lowered state and the fully-raised state. However, the invention is not to be so limited in all embodiments and different degrees of movement may be permitted in other embodiments.

When the door 200 is in the closed angular orientation and the fully-raised state, the floor surface portion 108 of the floor 102 is exposed. In the exemplified embodiment, the door 200 still obstructs and covers the lowermost shelf 112 in the storage compartment 107. Thus, in the exemplified embodiment, only items stored on the floor surface 108 of the floor 102 will be visible when the door 200 is in the closed angular orientation and the fully-raised state. One benefit of this is the combination of this somewhat small axial movement of the door 200 relative to the housing 100 in combination with the inclusion of the power unit 120 inside of the storage compartment 107. Most smart speakers and small smart displays will fit into the storage compartment 107 of the housing 100 and a user can easily raise the door 200 to expose these electronic devices. Music and viewing of any display is easy by resting these devices on the floor surface 108, and the main mirror on the front surface 201 of the door 200 remains directly in front of the user. The user may very easily alter the door from the fully-raised state to the fully-lowered state by pressing downwardly on the door 200 to hide all articles located in the storage compartment 107 and make the room within which the cabinet 1000 is mounted (e.g., a bathroom) appear clean and elegant. Allowing a restricted axial movement of the door 200 relative to the housing 100 also provides a user with easy access to the most commonly used items which can be stored in the lower part of the storage compartment 106 without requiring the user to fully open the door 200.

Figure 27:
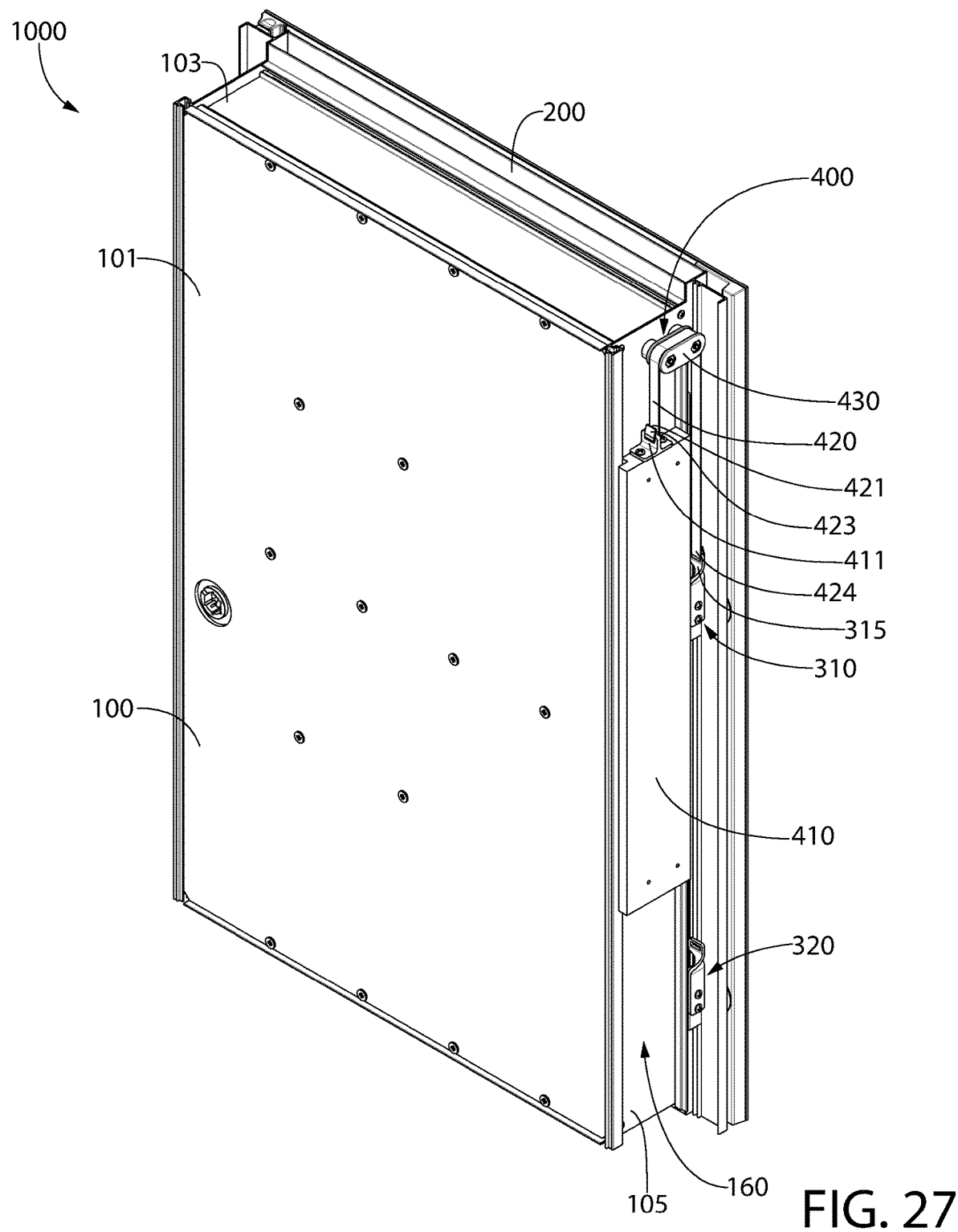
FIG. 27 is a rear perspective view of the cabinet of FIG. 24 in the fully-lowered state and in the closed angular orientation.
Figure 28:
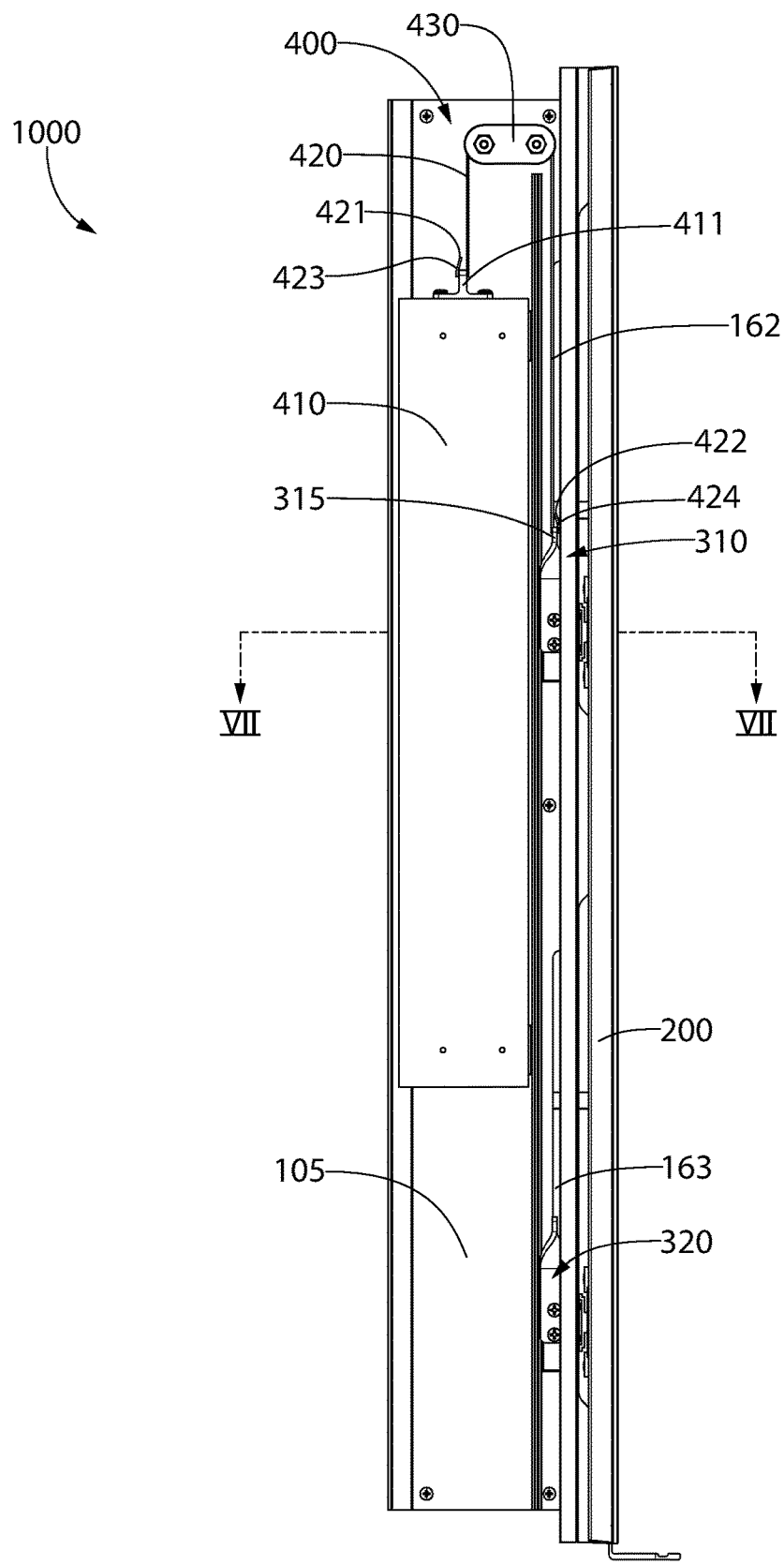
FIG. 28 is a side view of the cabinet of FIG. 24 in the fully-lowered state and in the closed angular orientation.

A comparison of FIG. 27 with FIG. 32 shows how the counterweight assembly 400 moves when the door 200 is transitioned from the fully-lowered state (FIG. 27) to the fully-raised state (FIG. 32). As the door 200 is moved axially upward, the counterweight 410 moves axially downward the same distance. Furthermore, in this embodiment the hinges 310, 320 are fixedly coupled to the door 200 so they move upwardly with the door 200. FIG. 32 illustrates the first hinge 310 in abutment with the fixed pulley 430. Thus, the fixed pulley 430 forms an upper stopper feature which prevents the door 200 from moving axially upward beyond the position shown in FIGS. 31 and 32. The positioning of the fixed pulley 430 allows for upward axial movement of the door 200 in the range of 5 to 10 inches in the exemplified embodiment as described above. Additionally, or alternatively, the abutment between the first and second hinges 310, 320 and the upper edge of the first and second elongated slots 162, 163 may form an upper stopper feature.

The ledge 130 may form a lower stopper feature, in that the bottom edge 202 of the door 200 may abut against the ledge 130 when in the fully-lowered state such that the door 200 is unable to move further downwardly due to the abutment with the ledge 130. However, in other embodiments the ledge 130 may be omitted and other mechanical features may be included to prevent downward axial movement of the door 200 beyond the fully-lowered state position of FIG. 24. For example, abutment between the counterweight 410 and the fixed pulley 430 may prevent the door 200 from being lowered any further. Moreover, the abutment between the first and second hinges 310, 320 and the lower edge of the first and second elongated slots 162, 163 may form a lower stopper feature.

Figure 33:
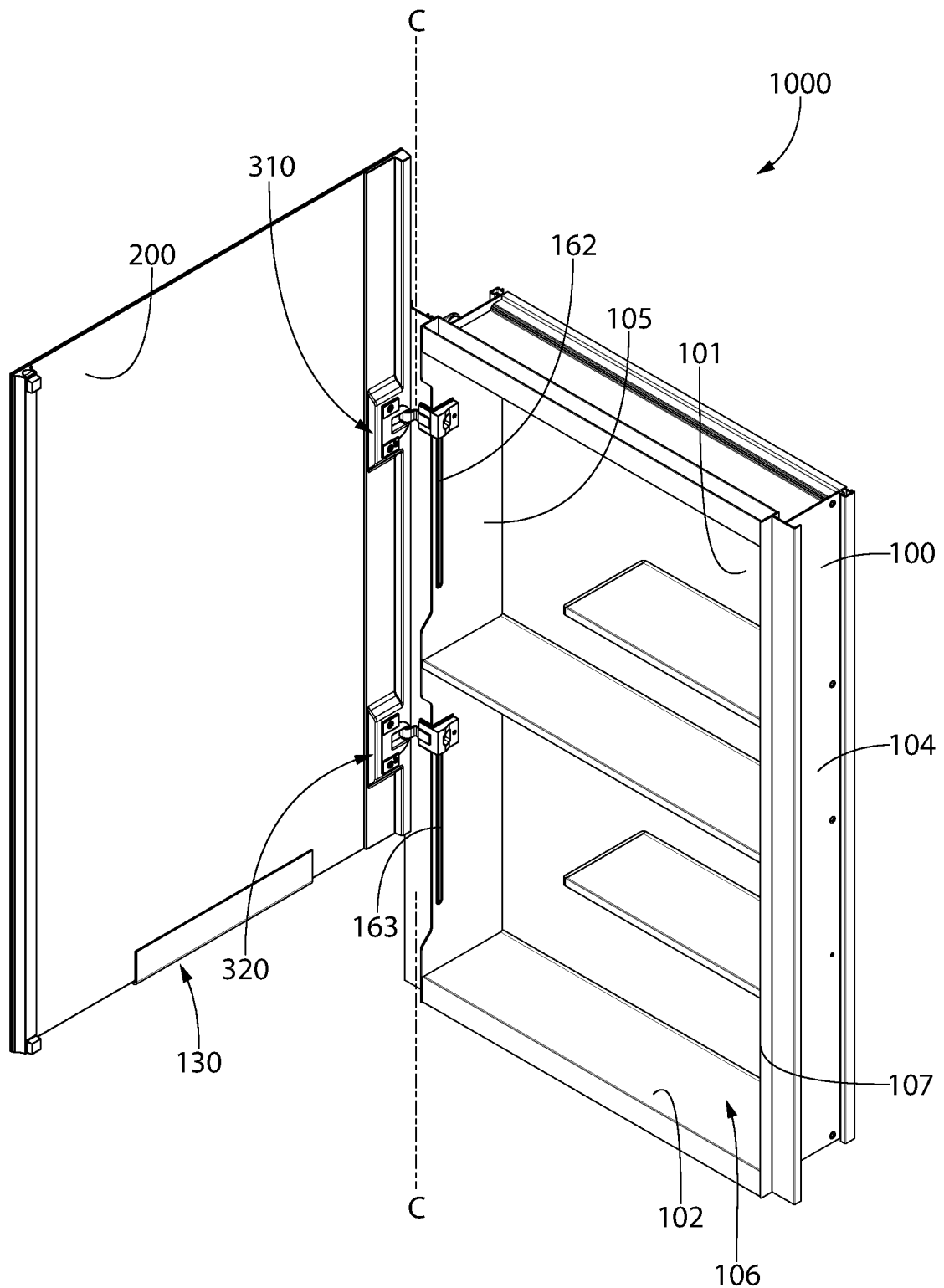
FIG. 33 is a front perspective view of the cabinet of FIG. 24 in the fully-raised state and in the open angular orientation.
Figure 34:
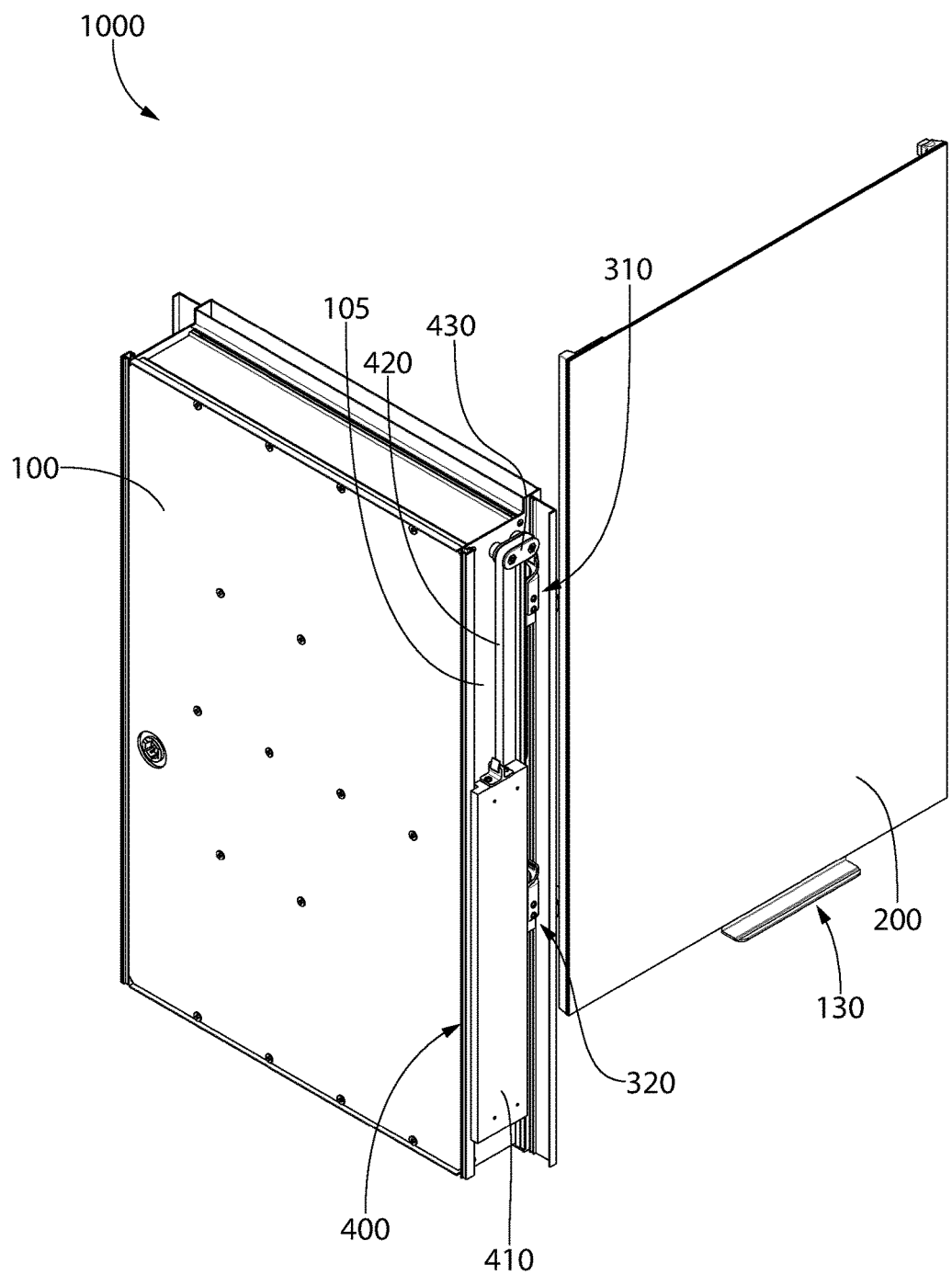
FIG. 34 is a rear perspective view of the cabinet of FIG. 24 in the fully-raised state and in the open angular orientation.

FIGS. 33 and 34 illustrate the cabinet 1000 with the door 200 in the fully-raised state like FIGS. 31 and 32, but also with the door 200 in the open angular orientation. Thus, when the door 200 is in the fully-raised state, the door 200 can be pivoted about the door pivot axis C-C via the first and second hinges 310, 320 to transition the door 200 from the closed angular orientation to the open angular orientation. When the door 200 is in the open angular orientation the entirety of the front opening 107 of the storage compartment 106 is unobstructed by the door 200. This is true regardless of whether the door 200 is in the fully-lowered state or the fully-raised state. FIG. 25 illustrates the door in the fully-lowered state and in the open angular orientation and FIG. 33 illustrates the door 200 in the fully-raised state and in the open angular orientation. It should be appreciated that the door 200 can also be maintained at any axial position between the fully-raised state and the fully-lowered state due to the counterweight 410 as described above. Furthermore, the door 200 can be in the open or closed angular orientations while the door 200 is in any of its possible axial positions (fully-raised state, fully-lowered state, or anything in between) relative to the housing 100.

Figure 35B:
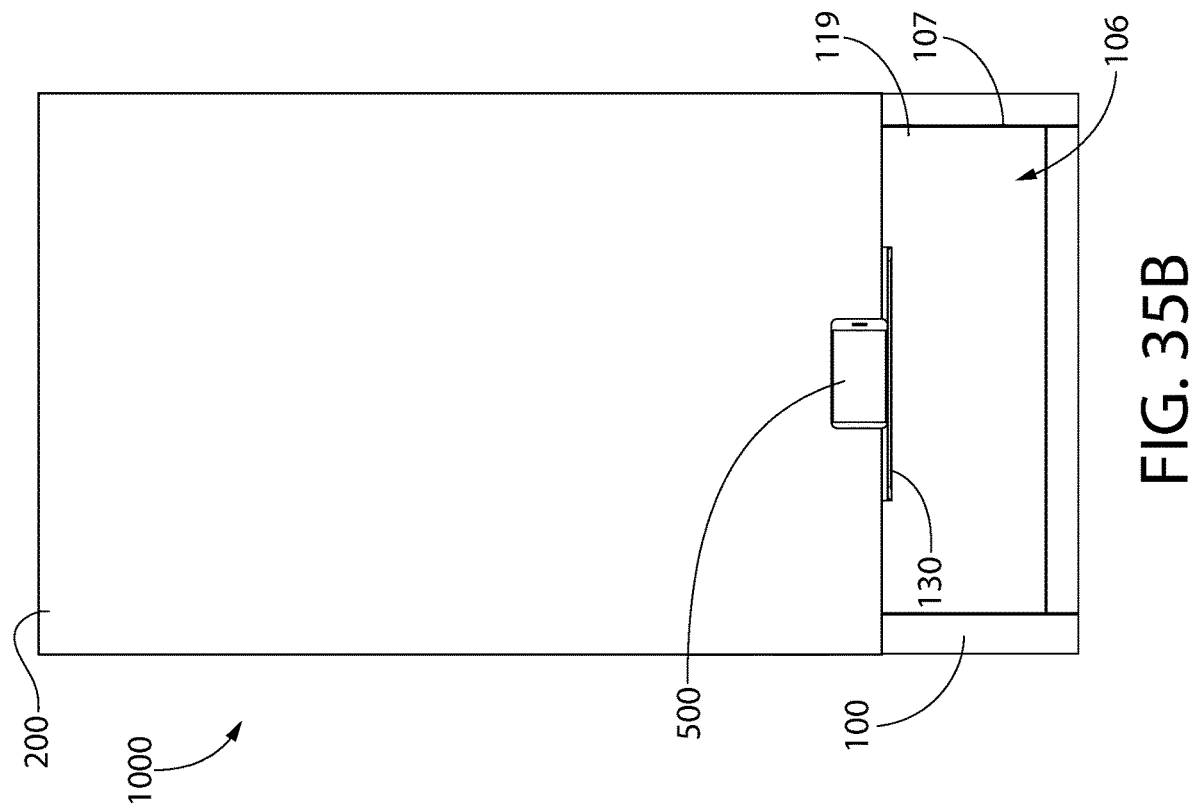
FIG. 35B is a front view of the cabinet of FIG. 24 in the fully-raised state and in the closed angular orientation.
Figure 35A:
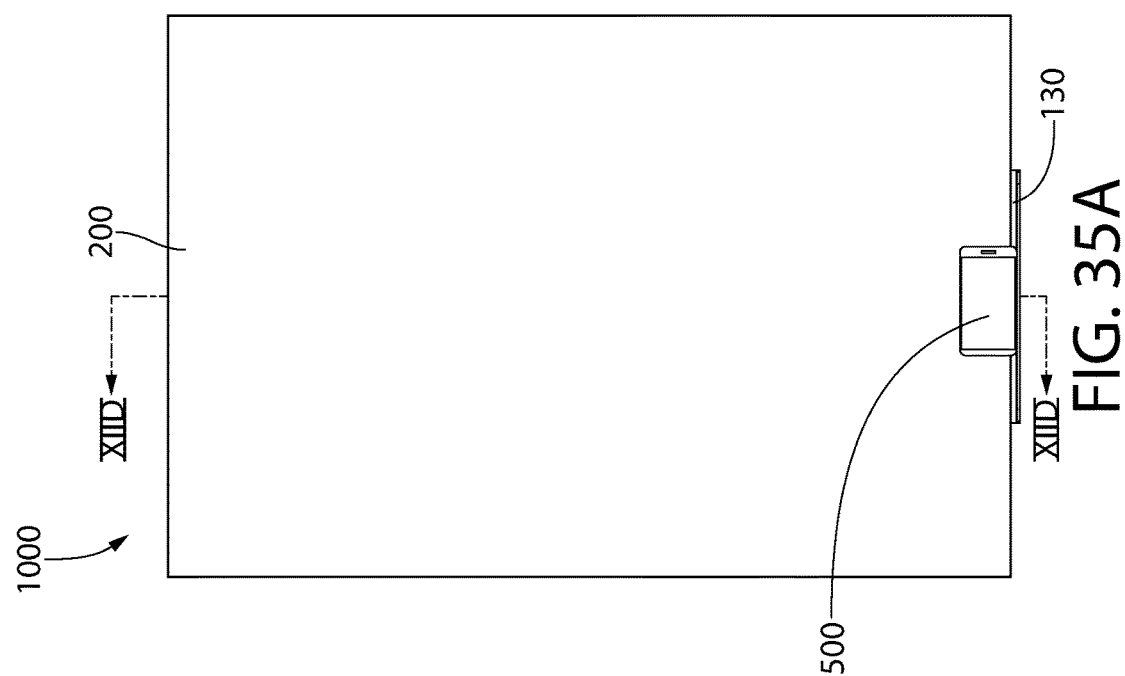
FIG. 35A is a front view of the cabinet of FIG. 24 in the fully-lowered state and in the closed angular orientation.
Figure 35C:
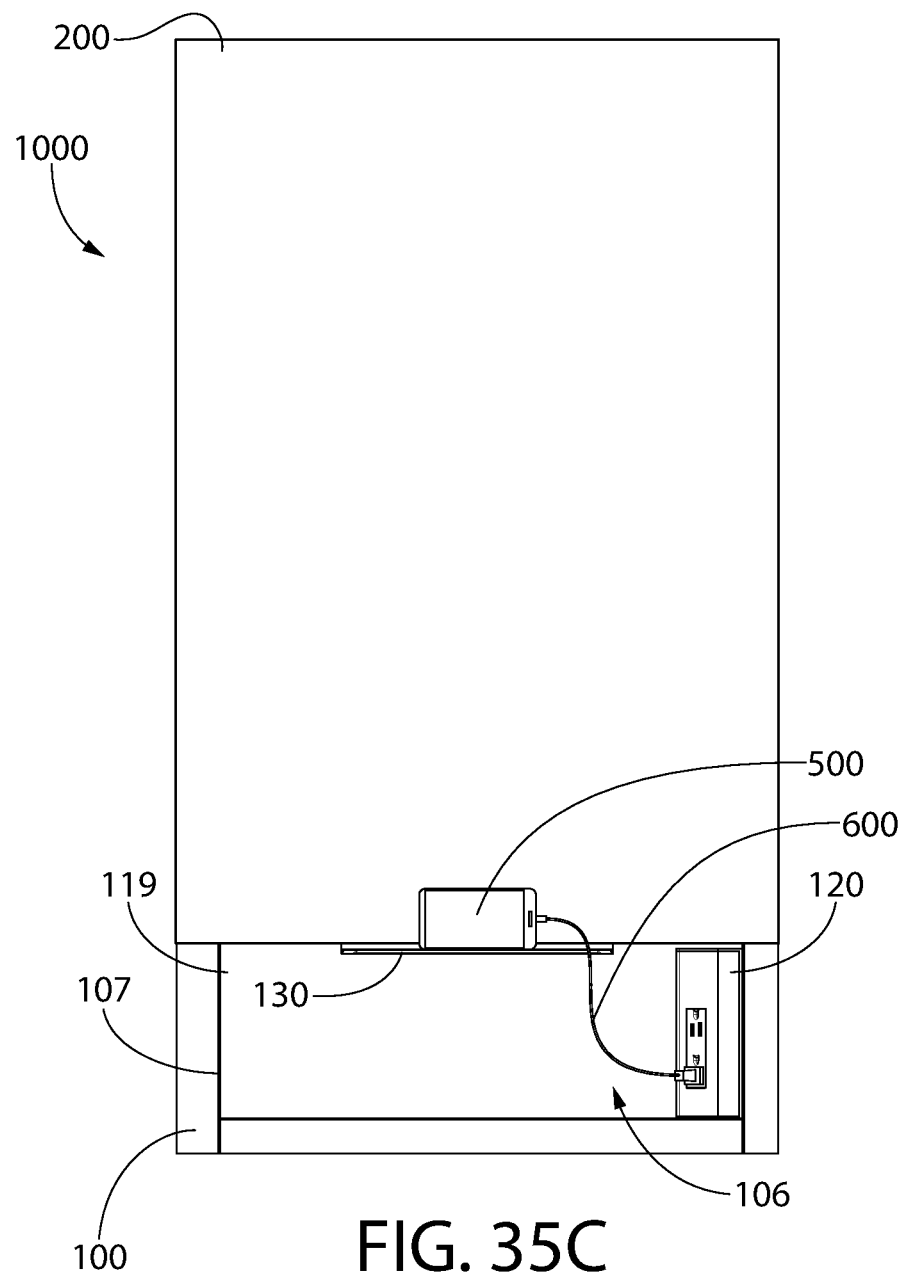
FIG. 35C is a front view of the cabinet of FIG. 24 in the fully-raised state and in the closed angular orientation in accordance with an alternative embodiment.

FIGS. 35A and 35B provide side-by-side views of the cabinet 1000 with the door 200 in the closed angular orientation and in its fully-lowered state (FIG. 35A) and fully-raised state (FIG. 35B). To reiterate, in the closed angular orientation and the fully-lowered state, the door 200 obstructs and covers the entirety of the front opening 107 of the storage compartment 106. The door 200 cannot be moved axially lower than the fully-lowered state. In the closed angular orientation and the fully-raised state, the door 200 obstructs an upper portion of the front opening 107 and leaves the lower portion 119 of the front opening 107 unobstructed to allow access to a lower portion of the storage compartment 106. In FIGS. 35A and 35B, an electronic device 500 is depicted resting on the ledge 130. The electronic device 500 is a smartphone in the exemplified embodiment, but it could be a tablet, speaker, or other type of electronic device FIG. 35C is a view identical to FIG. 35B, except the power supply unit 120 has been shifted downwardly so as to be located at a position that is aligned with the lower portion 119 of the front opening 107. As such, the power supply unit 120 is visible and accessible with the door 200 in its closed angular position and in its fully raised state. This permits a user to plug in the electronic device 500 with a power cord 600. Specifically, the user can rest the electronic device 500 on the ledge 130 and raise the door 200 to the fully-raised state and then plug the electronic device 500 into the power supply unit 120 to charge the electronic device 500 without ever having to pivot the door 200.

Figure 35D:
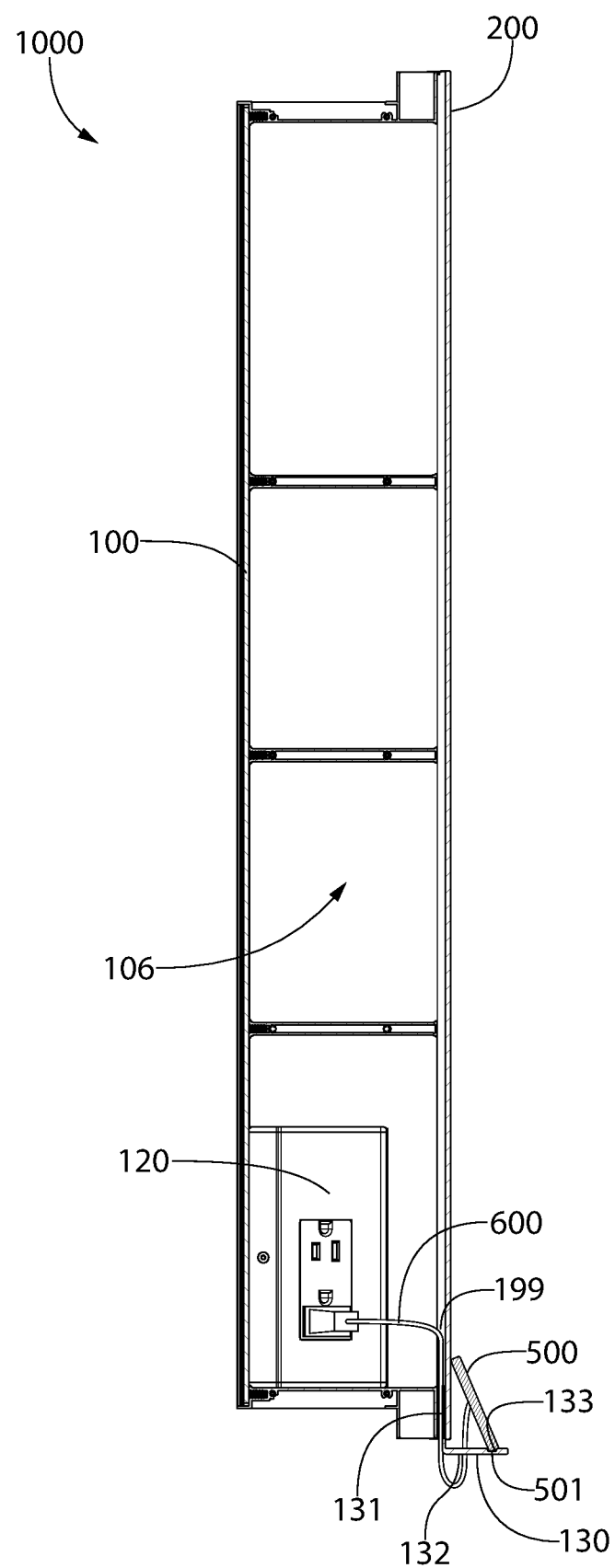
FIG. 35D is a cross-sectional view taken along line XIID-XIID of FIG. 35A.

FIG. 35D is a cross-sectional view taken along line XIID-XIID of FIG. 35A in an embodiment whereby the power supply unit 120 is located in the position shown in FIG. 35C. In FIG. 35D, the electronic device 500 rests on the ledge 130 in an upright orientation such that an edge 501 of the electronic device 500 engages the retention element 133 of the ledge 130 to prevent the edge 501 of the electronic device 500 from sliding along an upper surface of the ledge 130 away from the front surface of the door 200. In the upright orientation, the electronic device 500 rests on the ledge 130 and leans against the front surface of the door 200.

Thus, referring to FIGS. 35C and 35D, a user can position the electronic device 500, with its display screen facing outward, on the ledge 130. The user may move the door 200 between the fully lowered and fully raised states, and the ledge 130 will move along with the door 200 due to the ledge 130 being coupled to the door. With the door 200 in the fully-raised state as shown in FIG. 35C, the user can operably couple a first end of the power cord (or electric cord) 600 to the electronic device 500 and can couple a second end of the power cord 600 to an electrical port of the power supply unit 120, which is located within the lower portion of the storage compartment 106.

Next, the user may lower the door 200 from the fully-raised state of FIG. 35C to the fully-lowered state of FIG. 35D. During lowering of the door 200 from the fully-raised state to the fully-lowered state, the door 200 travels in a vertical plane and remains in a fully-closed pivotable orientation relative to the housing 100. When the door 200 is in the fully lowered state and the electronic device 500 is coupled to the power supply nit 120 via the power cord 600, a portion of the power cord 600 passes through a gap 199 between the door 200 and the housing 100. Thus, a gap 199 exists between the door 200 and the housing 100 which is sufficiently large to allow the power cord 600 to pass therethrough when the door 200 is closed. This allows the user to plus in the electronic device 500 while the electronic device 500 rests on the ledge 130 and then lower the door to the fully-closed state. In the exemplified embodiment, the gap 199 is formed as an empty space between an edge of the floor 109 of the housing 100 and the inner surface of the door 200. In other embodiments, the gap 199 may be formed by a notch in the floor of the housing 100 or a notch in the inner surface of the door 200.

Figure 36B:
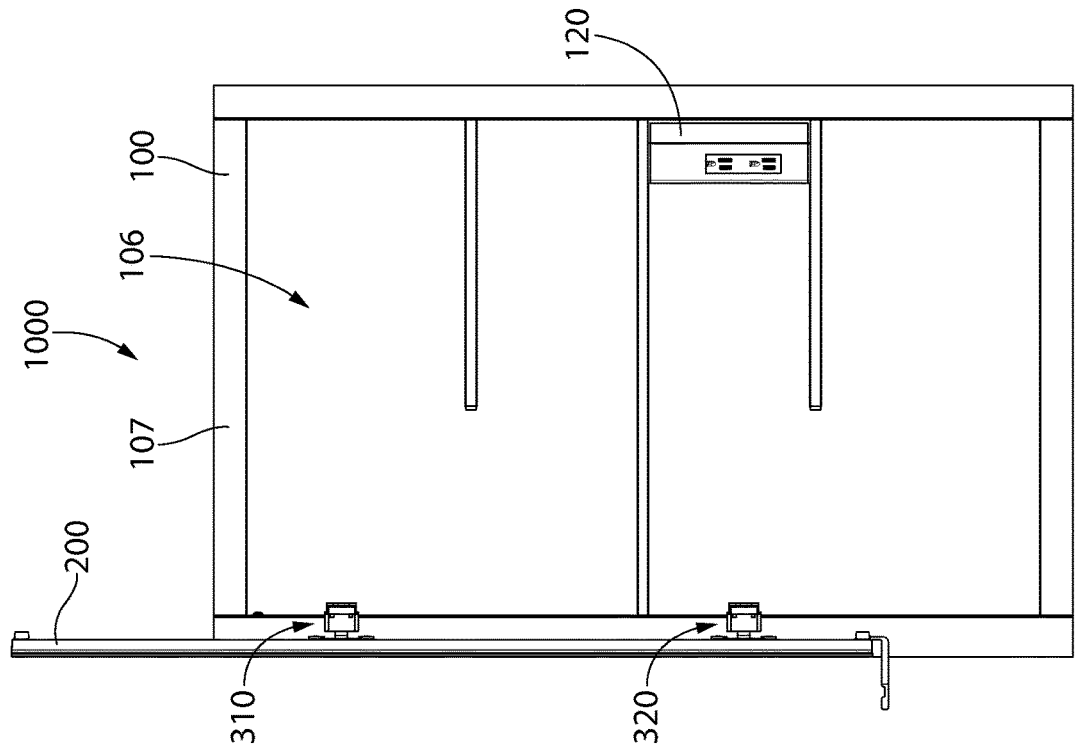
FIG. 36B is a front view of the cabinet of FIG. 24 in the fully-raised state and in the open angular orientation.
Figure 36A:
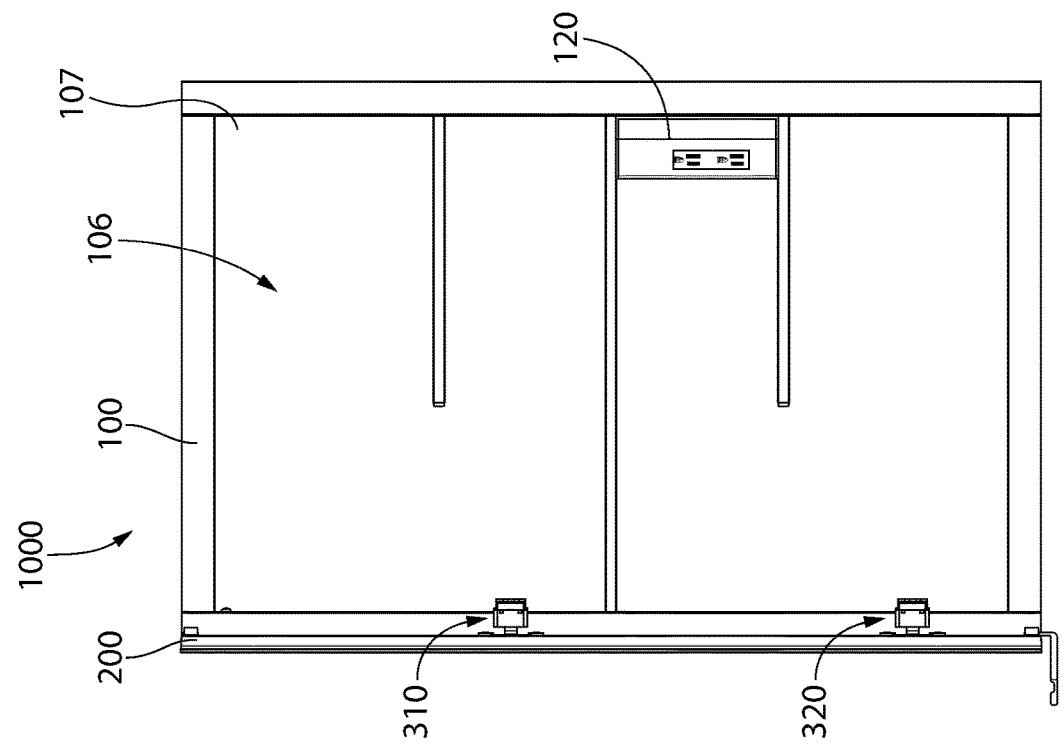
FIG. 36A is a front view of the cabinet of FIG. 24 in the fully-lowered state and in the open angular orientation.

FIGS. 36A and 36B provide side-by-side views of the cabinet 1000 with the door 200 in the open angular orientation in its fully-lowered state (FIG. 36A) and fully-raised state (FIG. 36B). In both of these positions of the door 200, the entirety of the front opening 107 of the storage compartment 106 is exposed such that the entire storage compartment 106 is accessible to the user.

Figure 37:
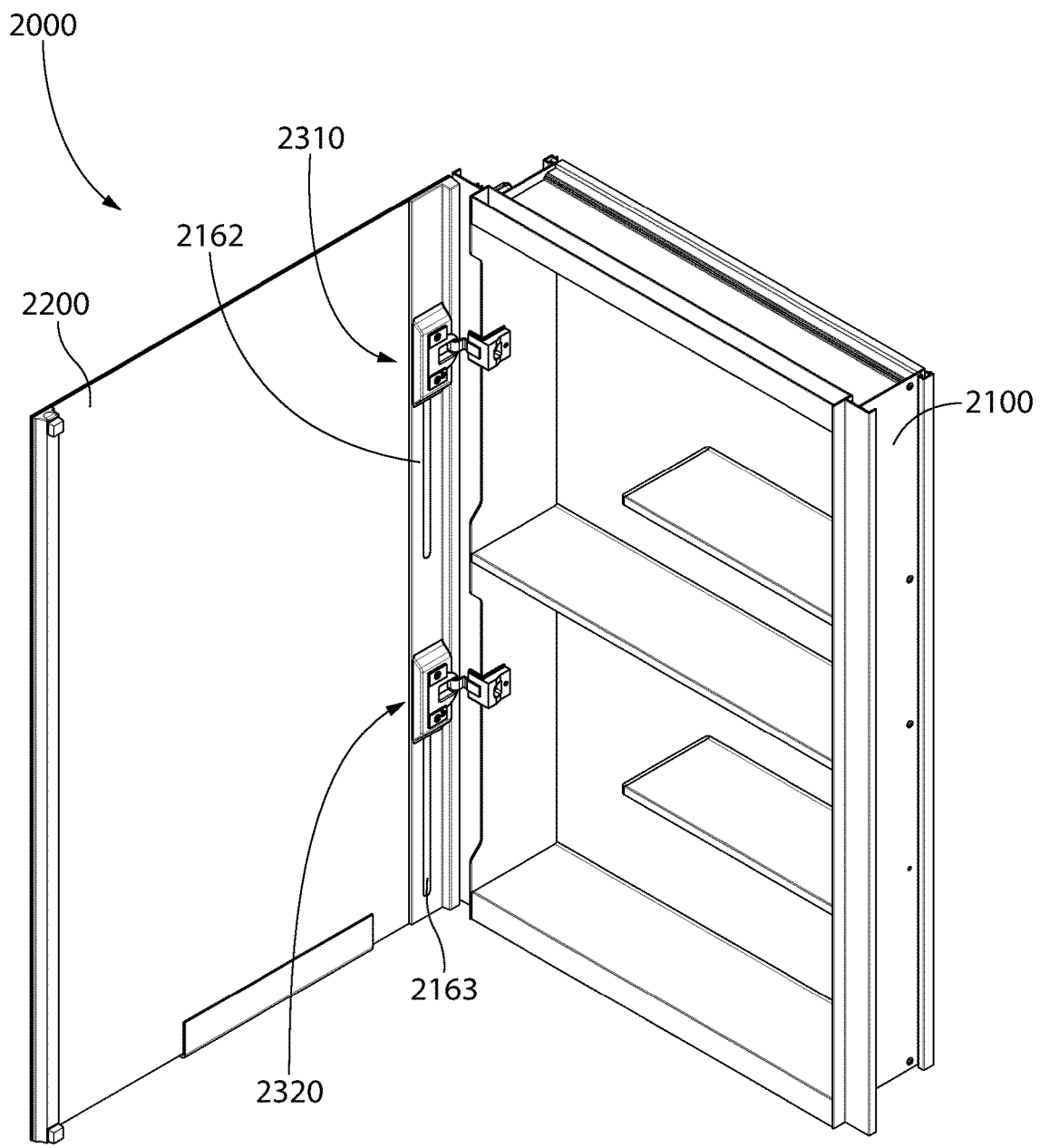
FIG. 37 is a front perspective view of a cabinet in a fully-lowered state and in an open angular orientation in accordance with another embodiment of the present invention.
Figure 38:
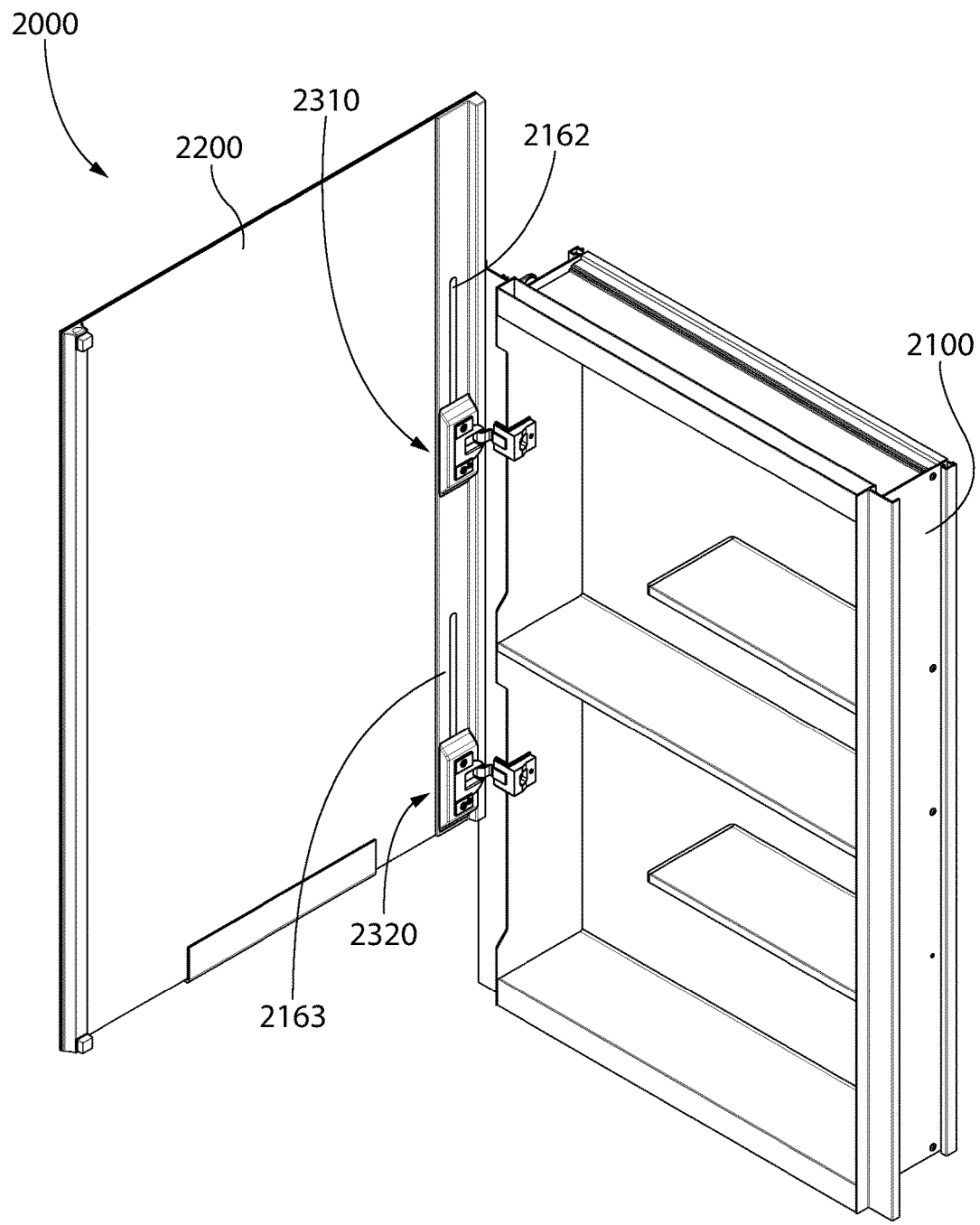
FIG. 38 is a front perspective view of the cabinet of FIG. 37 in a fully-raised state and in the open angular orientation.

Referring to FIGS. 37 and 38, a cabinet 2000 is illustrated in accordance with a first alternative embodiment of the present invention. The cabinet 2000 is identical to the cabinet 1000 in many respects, and thus only the differences between the cabinet 2000 and the cabinet 1000 will be described. It should be appreciated that for all other features, aspects, and structures, the description of the cabinet 1000 is entirely applicable for the cabinet 2000.

The cabinet 2000 comprises a housing 2100 and a door 2200 which is pivotably coupled to the housing 2100 between an open angular orientation and a closed angular orientation. The door 2200 is illustrated in the open angular orientation in FIGS. 37 and 38, but the closed angular orientation would be identical to that which is depicted in FIG. 24. the cabinet 2000 comprises a mounting unit 2300 which comprises a first hinge 2310 and a second hinge 2320. In this embodiment, the first and second hinges 2310, 2320 are both fixedly coupled to the housing 2100 and slidably coupled to the door 2200. That is, the door 2200 comprises a first elongated slot 2162 and a second elongated slot 2163 within which a portion of the first and second hinges 2310, 2320 is positioned. As the door 2200 moves vertically upwardly/downwardly relative to the housing 2100, the first and second hinges 2310, 2320 slide within the first and second elongated slots 2162, 2163 of the door 2200.

The first and second elongated slots 2161, 2162 may extend through the full thickness of the door 2200, although this is not required in all embodiments. In other embodiments, the first and second elongated slots 2161, 2162 may be grooves that terminate in a floor rather than extending fully through the door 2200. Moreover, while there are two slots illustrated in the exemplified embodiment, the first and second elongated slots 2161, 2162 could be connected to form a single elongated slot in other embodiments.

In this embodiment, the counterweight assembly (not visible in these figures) is coupled directly to the door 2200, rather than to one or both of the hinges as with the cabinet 1000. Thus, the door 2200 includes a connection feature and a counterweight cord is connected to the counterweight and to the door 2200 to couple the door to the counterweight. This is different from the cabinet 1000 described above whereby the counterweight cord 420 is coupled to the first hinge 310. The connection feature on the door 2200 may be located along a top edge of the door 2200, a side edge of the door 2200, or even along one of the front/rear surfaces of the door 2200 as may be desired by a designer taking into consideration aesthetics and functionality.

The door 2200 is alterable between the fully-lowered state shown in FIG. 37 and the fully-raised state shown in FIG. 38. The door 2200 cannot be lowered further than the position shown in FIG. 37 due to an abutment between the first and second hinges 2310, 2320 and the upper edge of the first and second elongated slots 2162, 2163. The door 2200 cannot be raised further than the position shown in FIG. 38 due to an abutment between the first and second hinges 2310, 2320 and the lower edge of the first and second elongated slots 2162, 2163. In this embodiment, the counterweight may still be positioned adjacent to, along, and/or within the second sidewall of the housing 2100 similarly to the positioning of the counterweight 400 of the cabinet 1000. Thus, the counterweight and the first and second hinges 2310, 2320 may be located on, along, or within the same sidewall of the housing 2100.

Figure 39:
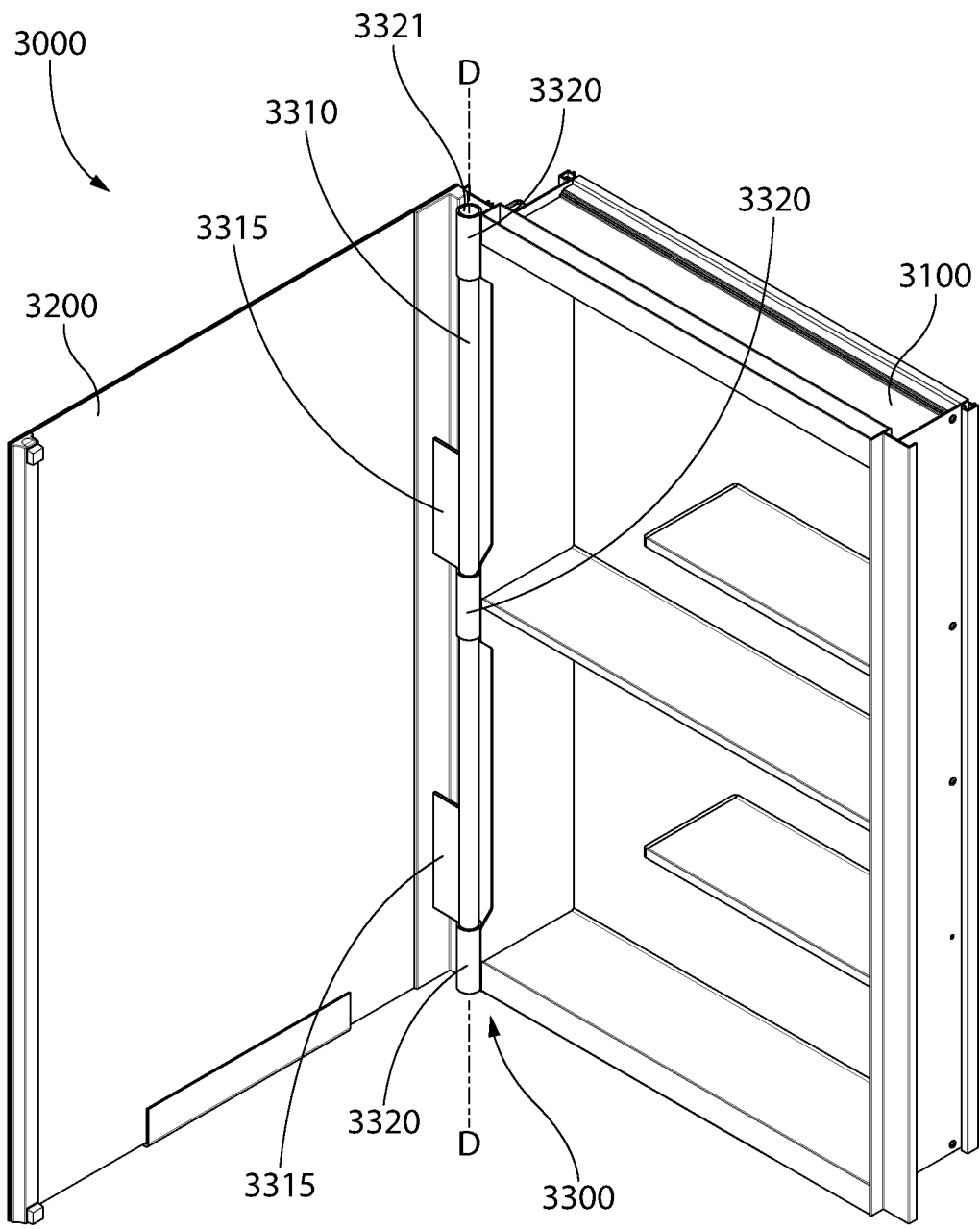
FIG. 39 is a front perspective view of a cabinet in a fully-lowered state and in an open angular orientation in accordance with yet another embodiment of the present invention.
Figure 40:
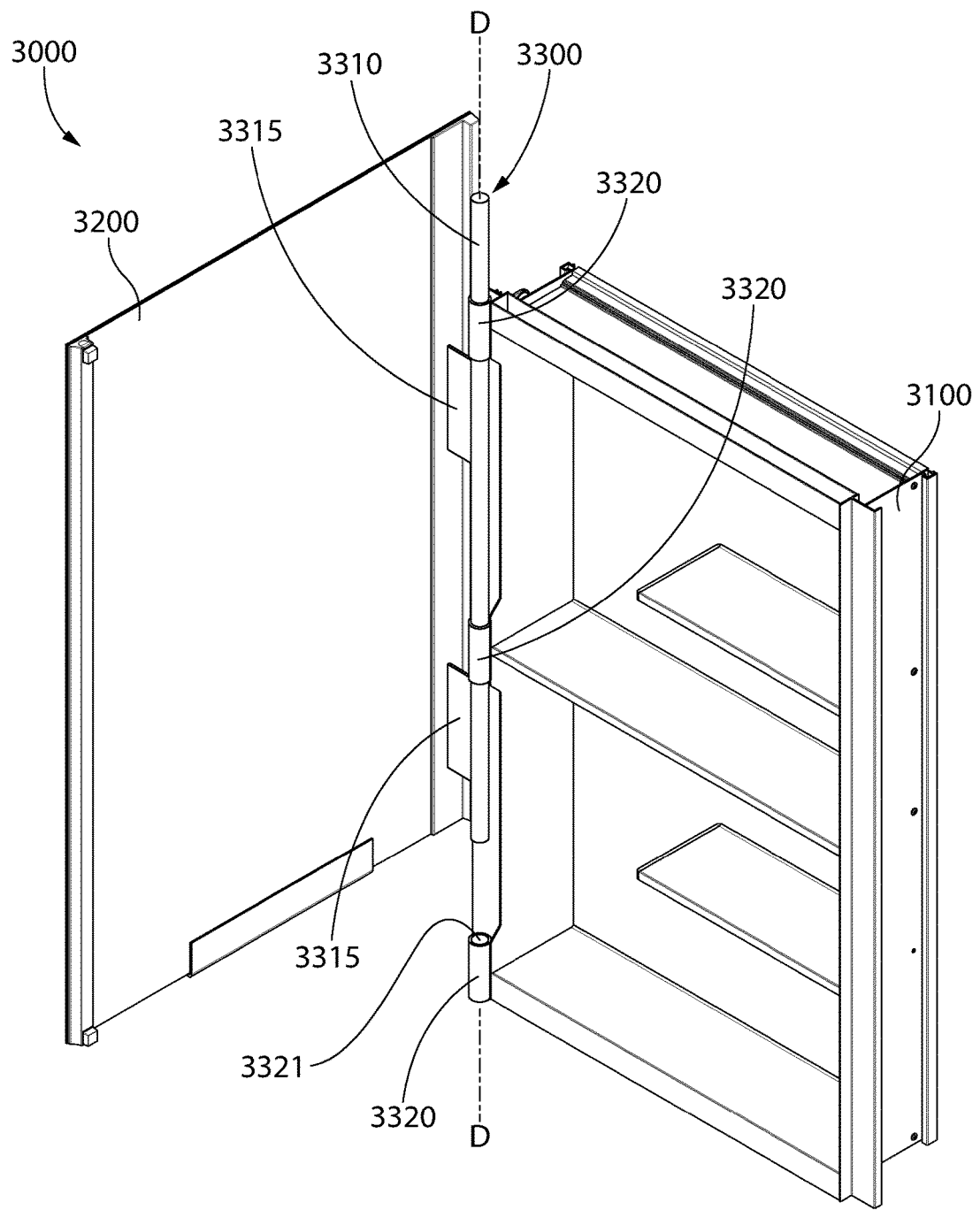
FIG. 40 is a front perspective view of the cabinet of FIG. 39 in a fully-raised state and in the open angular orientation.
Figure 41:
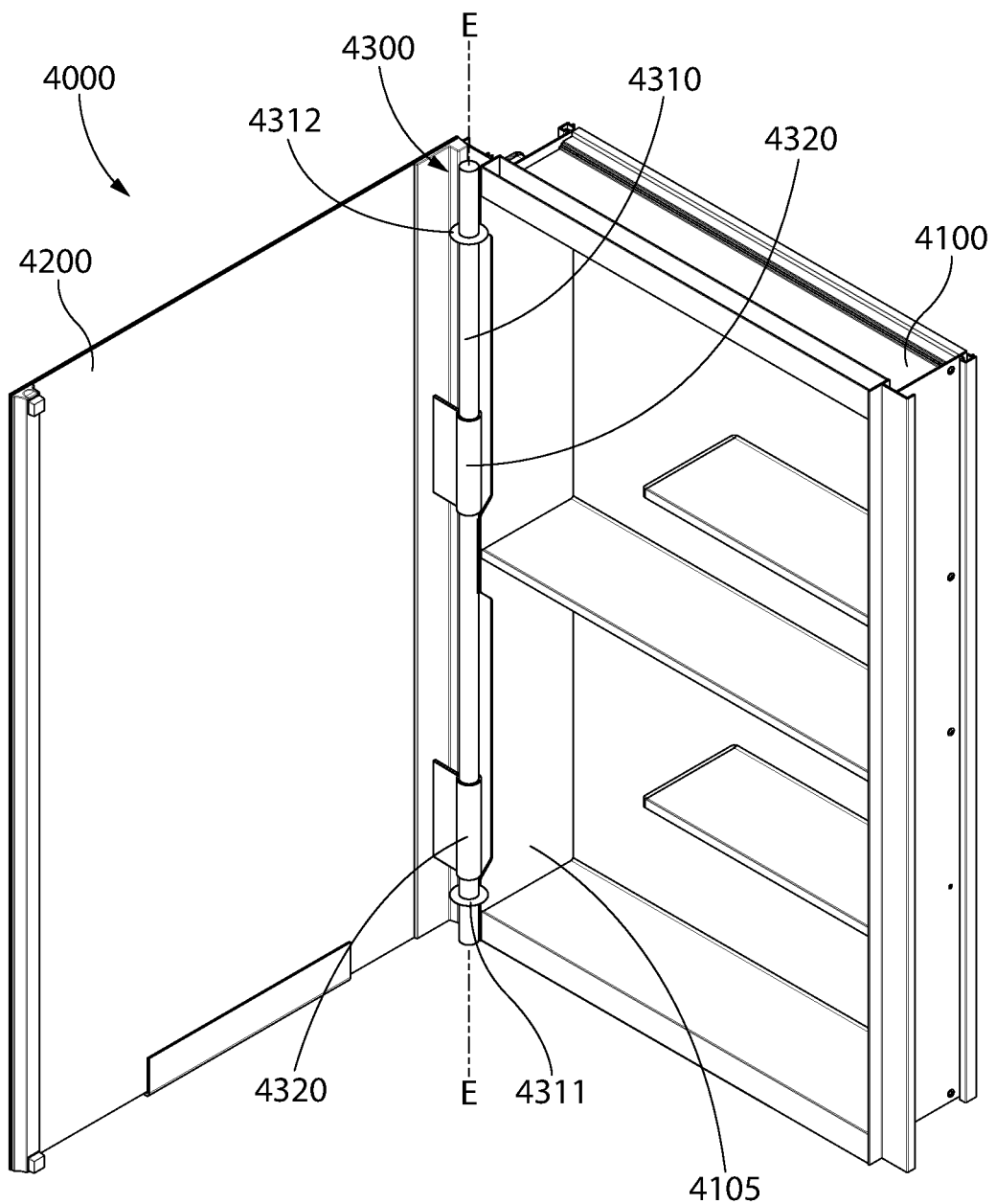
FIG. 41 is a front perspective view of a cabinet in a fully-lowered state and in an open angular orientation in accordance with still another embodiment of the present invention.
Figure 42:
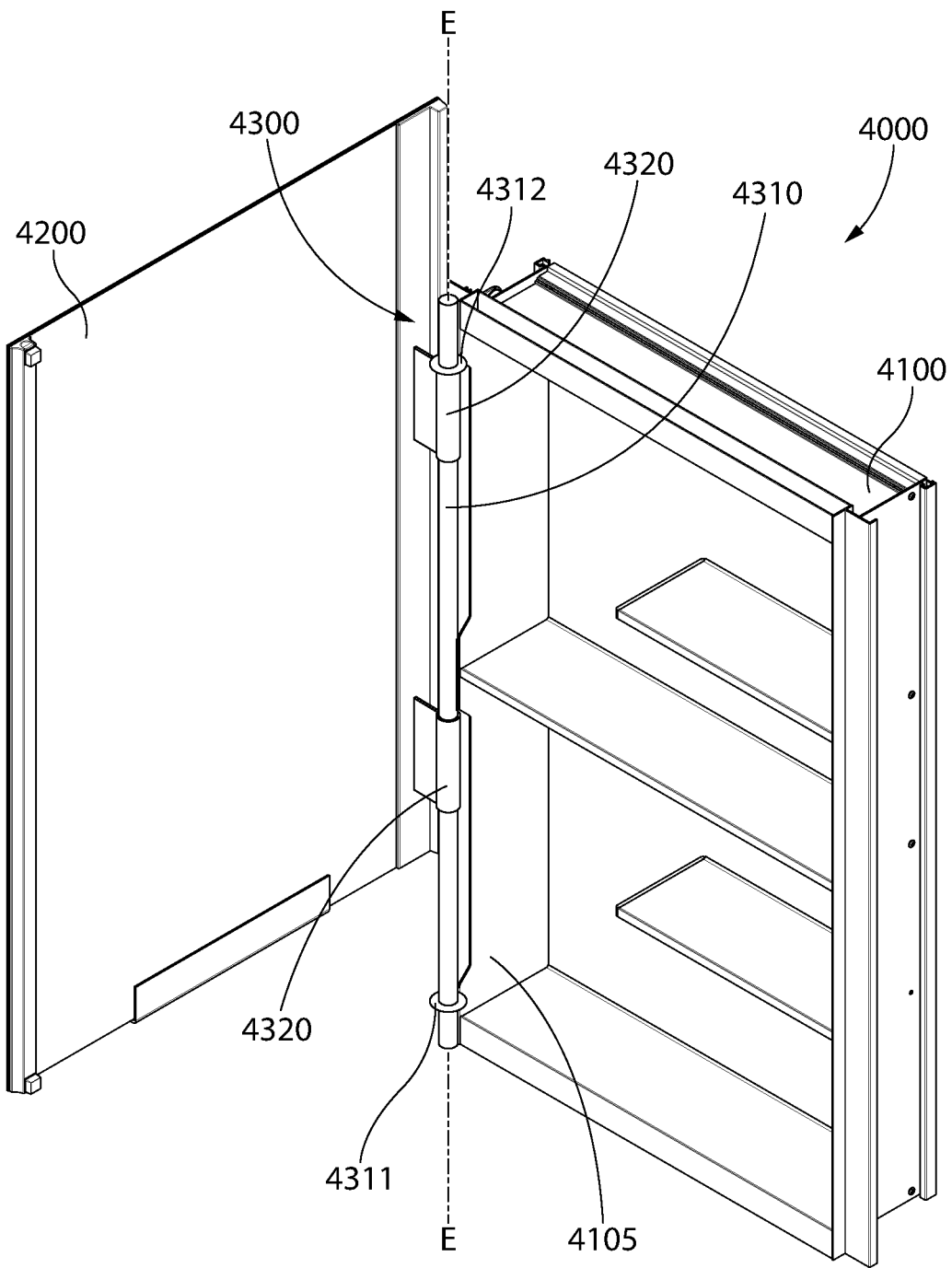
FIG. 42 is a front perspective view of the cabinet of FIG. 41 in a fully-raised state and in the open angular orientation.

Referring to FIGS. 39 and 40, a cabinet 3000 is illustrated in accordance with another embodiment of the present invention. The cabinet 3000 is identical to the cabinet 1000 in many respects, and thus only the differences between the cabinet 3000 and the cabinet 1000 will be described. It should be appreciated that for all other features, aspects, and structures, the description of the cabinet 1000 is entirely applicable for the cabinet 3000.

The cabinet 3000 comprises a housing 3100 and a door 3200. The door 3200 is alterable between a closed angular orientation and an open angular orientation by pivoting the door 3200 about a door pivot axis D-D. Only the open angular orientation is shown in FIGS. 39 and 40, but the closed angular orientation should be readily understood from the description above. In this embodiment, the door 3200 is coupled to the housing 3100 by a mounting unit 3300. The mounting unit 3300 comprises a hinge post 3310 mounted to the door 3200 and at least one body 3320 having a receiving bore 3321 mounted to or located on or forming a part of the housing 3100.

The hinge post 3310 is an elongated rod-like member which extends along an entirety of the length of the door 3200 in the exemplified embodiment. However, the hinge post 3310 need not extend the full length of the door 3200 in all embodiments. Furthermore, there could be multiple hinge posts 3310 coupled to the door 3200 in a spaced apart manner in still other embodiments. In the exemplified embodiment the at least one body 3320 comprises a plurality of the bodies 3320 coupled to the housing 3100 in a spaced apart manner. Each of the bodies 3320 is a tubular structure comprising the receiving bore 3321 which extends through the entirety of the body 3320 in the lengthwise or axial direction.

In this embodiment, the hinge post 3310 on the door 3100 slidably nests within the receiving bores 3321 of the one or more bodies 3320. The hinge post 3310 has a round cross-sectional area and the bores 3321 have a similarly round cross-sectional area. Thus the hinge post 3310 is configured to pivot while nesting within the bores 3321. This allows the door 3200 to pivot relative to the housing 3100 along the door pivot axis D-D while also allowing the door 3200 to move axially relative to the housing 3100. FIG. 39 illustrates the door 3200 in the fully-lowered state and FIG. 40 illustrates the door 3200 in the fully-raised state. The hinge post 3310 moves axially relative to the bodies 3320 along with the door 3200 as the door 3200 moves axially relative to the housing 3100.

The hinge post 3310 is coupled to the door 3200 via one or more connector plates 3315 which function as stoppers to control the amount of vertical/axial movement of the door 3200 relative to the housing 3100 that is permitted. In the fully-lowered position of FIG. 39 the connector plates 3315 abut against the upper edges of two of the bodies 3320 such that the door 3200 cannot be lowered any further. In the raised position of FIG. 40, the connector plates 3315 abut against the lower edges of two of the bodies 3320 such that the door 3200 cannot be raised any further.

In this embodiment, the counterweight (not shown) may be coupled to the door 3200 or to the hinge post 3310 via the counterweight cord (not shown). Thus the counterweight cord is coupled to the counterweight as described above with reference to the cabinet 1000. The counterweight cord is also coupled either directly to the door 3200, directly to the hinge post 3310, or directly to one or more of the connector plates 3315. As the door 3200 is raised, the counterweight is lowered and as the door 3200 is lowered the counterweight is raised, much like the cabinet 1000 described above. Furthermore, the counterweight and the counterweight cord may be located along or within the first sidewall 3105 of the cabinet 3100. The counterweight balances the weight of the door 3200 and maintains the door 3200 at any axial position at which it is positioned by the user.

Referring to FIGS. 31 and 32, a cabinet 4000 is illustrated in accordance with yet another embodiment of the present invention. The cabinet 4000 is identical to the cabinet 1000 in many respects, and thus only the differences between the cabinet 4000 and the cabinet 1000 will be described. It should be appreciated that for all other features, aspects, and structures, the description of the cabinet 1000 is entirely applicable for the cabinet 4000.

The cabinet 4000 comprises a housing 4100 and a door 4200. The door 4200 is alterable between a closed angular orientation and an open angular orientation by pivoting the door 4200 about a door pivot axis E-E. Only the open angular orientation is shown in FIGS. 31 and 32, but the closed angular orientation should be readily understood from the description above. In this embodiment, the door 4200 is coupled to the housing 4100 by a mounting unit 4300. The mounting unit 4300 comprises a hinge post 4310 mounted to the housing 4200 and at least one body 4320 having a receiving bore 4321 mounted to the door 4100.

In this embodiment, the hinge post 4310 on the housing 4200 extends through the bore(s) 4321 of the at least one body 4320. The hinge post 4310 is configured to slide within the bodies 4320 as the door is raised and lowered. There is a lower stopper 4311 and an upper stopper 4312 coupled to the hinge post 4310 to stop the upward and downward movement of the door 4200 at specific axial locations. A lower one of the bodies 4320 abuts against the lower stopper 4311 when the door 4200 is in the fully-lowered position and an upper one of the bodies 4320 abuts against the upper stopper 4312 when the door 4200 is in the fully-raised position.

In this embodiment, the counterweight (not shown) may be coupled to the door 4200 or to one or both of the bodies 4320 via the counterweight cord (not shown). Furthermore, the counterweight cord is coupled to the counterweight as described above with reference to the cabinet 1000. As the door 4200 is raised, the counterweight is lowered and as the door 4200 is lowered the counterweight is raised, much like the cabinet 1000 described above. The door 4200 can be raised and lowered as shown in FIGS. 31 and 32 whether it is in the open angular orientation or the closed angular orientation. The counterweight and the counterweight cord may be located along or within the first sidewall 4105 of the cabinet 4100. The counterweight balances the weight of the door 4200 and maintains the door 4200 at any axial position at which it is positioned by the user.

While the invention has been described with respect to specific examples including presently preferred modes of carrying out the invention, those skilled in the art will appreciate that there are numerous variations and permutations of the above-described systems and techniques. It is to be understood that other embodiments may be utilized and structural and functional modifications may be made without departing from the scope of the present invention. Furthermore, it is to be understood that the structural and functional concepts of the cabinet with a door with increased modes of freedom discussed above can incorporated into the two lighted mirrors also discussed above. Thus, the spirit and scope of the invention should be construed broadly as set forth in the appended claims and future claims presented.

Exemplary Claims

Exemplary Claim 1: A lighted mirror apparatus comprising: a mirror in a viewing state, the mirror having a front surface defining a mirror plane and a centerline, a center plane being orthogonal to and intersecting the mirror plane along the centerline; a first light assembly positioned along a first side of the mirror; and a second light assembly positioned along a second side of the mirror that is opposite the first side of the mirror; each of the first and second light assemblies configured to generate light and transmit the light to the center plane along a primary light path, each of the first and second light assemblies comprising: a light source configured to generate light; a light guide member comprising a light output surface, the light output surface defining a first interface reference plane that intersects the center plane at an outwardly and rearwardly facing first acute angle ($\theta_1$); the light source optically coupled to the light guide member so that the light is guided through the light guide member to the light output surface along a first portion of the primary light path, the first portion of the primary light path forming a first angle of incidence ($\Phi_1$) with the light output surface; and the light output surface being part of a first multimedia interface that is configured to refract the light exiting the light output surface of the light guide member at a first angle of refraction ($\Psi_1$) along a second portion of the primary light path, wherein the first angle of refraction ($\Psi_1$) is greater than the first angle of incidence ($\Phi_1$).

Exemplary Claim 2: The lighted mirror apparatus according to exemplary claim 1 further comprising: each of the first and second light assemblies further comprising an internal cavity formed at least in part by a cover member in which the light guide member is positioned, the cover member comprising a lens portion having: a lens light input surface being part of a second multimedia interface, the second multimedia interface configured to: (i) receive the light traveling along second portion of the primary light path at a second angle of incidence ($\Phi_2$); and (ii) refract the light passing through the second multimedia interface at a second angle of refraction ($\Psi_2$) so that the light travels through the lens portion along a third portion of the primary light path; and a lens light output surface being part of a third multimedia interface, the third multimedia interface configured to: (i) receive the light traveling along the third portion of the primary light path at a third angle of incidence ($\Phi_3$); and (ii) refract the light exiting the lens light output surface at a third angle of refraction ($\Psi_3$) along a fourth portion of the primary light path; and wherein the following equation is satisfied: $\Phi_2-\Psi_2<\Psi_3-\Phi_3$.

Exemplary Claim 3: The lighted mirror apparatus according to exemplary claim 1 further comprising: the second portion of the primary light path lies along a first refracted light reference plane; each of the first and second light assemblies further comprising a cover member having an internal cavity in which the light guide member is positioned, the cover member comprising a lens portion having: a lens light input surface being part of a second multimedia interface that defines a second interface reference plane; and a lens light output surface being part of a third multimedia interface that defines a third interface reference plane; wherein the first refracted light reference plane intersects: (i) the second interface reference plane to form an outwardly-rearwardly facing second angle ($\theta_2$); and (ii) the third interface reference plane to form an outwardly-rearwardly facing third angle ($\theta_3$), the second and third angles being corresponding angles; and wherein $\theta_3<\theta_2$.

Exemplary Claim 4: The lighted mirror apparatus according to any one of exemplary claims 2 to 3 wherein, for each of the first and second light assemblies, the lens portion of the cover member has a thickness measured from the lens light input surface to the lens light output surface in a direction parallel to the center plane; and wherein the thickness of the lens portion decreases with increasing distance from the center plane.

Exemplary Claim 5: The lighted mirror apparatus according to any one of exemplary claims 2 to 4 wherein, for each of the first and second light assemblies, $\Phi_2$ is less than or equal to 10 degrees.

Exemplary Claim 6: The lighted mirror apparatus according to any one of exemplary claims 2 to 5 wherein, for each of the first and second light assemblies, the lens light output surface of the cover member is a planar surface that is oriented substantially parallel to the mirror surface.

Exemplary Claim 7: The lighted mirror apparatus according to exemplary claim 6 wherein, for each of the first and second light assemblies, the lens light output surface of the cover member is substantially coplanar with the mirror surface.

Exemplary Claim 8: The lighted mirror apparatus according to any one of exemplary claims 2 to 7 wherein, for each of the first and second light assemblies, the cover member is formed of a light transmissive material.

Exemplary Claim 9: The lighted mirror apparatus according to any one of exemplary claims 2 to 8 wherein the lens light output surface of the cover member of each of the first and second light assemblies forms a portion of the front surface of the lighted mirror apparatus that extends the height of the mirror.

Exemplary Claim 10: The lighted mirror apparatus according to any one of exemplary claims 2 to 9 further comprising, for each of the first and second light assemblies, a light diffuser sheet having an arcuate portion positioned between the light output surface of the light guide member and the lens light input surface of the lens portion of the cover member.

Exemplary Claim 11: The lighted mirror apparatus according to any one of exemplary claims 2 to 9 further comprising, for each of the first and second light assemblies: the cover member comprising an outer sidewall having an outer surface that forms an exposed side surface of the lighted mirror apparatus, and a front wall that comprises the lens portion; the light guide member being a light guide plate having a major inner surface and a major outer surface, and the light output surface being a front edge surface that extends between the major inner and major outer surfaces; and a reflector member having a reflective surface adjacent to and opposing the major inner surface of the light guide plate.

Exemplary Claim 12: The lighted mirror apparatus according to exemplary claim 11 wherein, for each of the first and second light assemblies: a gap exists between the reflective surface and the major inner surface of the light guide plate; the gap having a width measured parallel to the mirror surface; and wherein for a front portion of the reflective surface, the width of the gap increases in size with decreasing distance from a front edge of the reflective surface.

Exemplary Claim 13: The lighted mirror apparatus according to exemplary claim 12 wherein, for each of the first and second light assemblies, the width of the gap is a substantially constant for a rear portion of the reflective surface.

Exemplary Claim 14: The lighted mirror apparatus according to any one of exemplary claims 12 to 13 wherein, for each of the first and second light assemblies, the front portion of the reflective surface is a convex surface that curves away from the light guide plate.

Exemplary Claim 15: The lighted mirror apparatus according to any one of exemplary claims 12 to 14 wherein, for each of the first and second light assemblies, the light guide plate extends beyond the front edge of the reflective surface.

Exemplary Claim 16: The lighted mirror apparatus according to any one of exemplary claims 11 to 15 wherein, for each of the first and second light assemblies, both the major inner surface and the major outer surface are substantially planar surfaces that are substantially parallel to the center plane.

Exemplary Claim 17: The lighted mirror apparatus according to any one of exemplary claims 11 to 16 wherein, for each of the first and second light assemblies, the light guide plate is configured to emit: (1) a first percentage of the light entering the light guide plate from the light guide plate via the major outer surface; and (2) a second percentage of the light entering the light guide plate from the light guide plate via the light output surface, the second percentage being greater than the first percentage.

Exemplary Claim 18: The lighted mirror apparatus according to any one of exemplary claims 2 to 17 wherein, for each of the first and second light assemblies, the lens light output surface of the lens portion of the cover member is substantially coplanar with the mirror surface.

Exemplary Claim 19 The lighted mirror apparatus according to any one of exemplary claims 1 to 18 wherein, for each of the first and second light assemblies, the light output surface of the light guide member is a smooth surface.

Exemplary Claim 20: The lighted mirror apparatus according to any one of exemplary claims 1 to 19 wherein, for each of the first and second light assemblies, the light guide member comprises a light input surface, the light source comprising a row of light emitting diodes positioned adjacent to the light input surface, and the light input surface being a planar surface that is substantially parallel to and rearwardly offset from the mirror surface.

Exemplary Claim 21: The lighted mirror apparatus according to any one of exemplary claims 1 to 20 further comprising: a support structure forming a storage cavity having an opening; a door comprising the mirror, the door movably mounted to the support structure so as to be alterable between: (1) an open state in which access is provided to the storage cavity via the opening; and (2) the viewing state in which the opening is enclosed by the door; and the first and second light assemblies mounted to the support structure on opposite sides of the door.

Exemplary Claim 22: A lighted mirror apparatus comprising: a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane; each of the first and second light assemblies configured to generate light and refract a primary light path of the light toward center plane.

Exemplary Claim 23: The lighted mirror apparatus according to exemplary claim 22 wherein each of the first and second light assemblies is configured to refract the primary light path toward the center plane multiple times.

Exemplary Claim 24: The lighted mirror apparatus according to exemplary claim 23 wherein each of the first and second light assemblies is configured to refract the primary light path away from the center plane at least once.

Exemplary Claim 25: The lighted mirror apparatus according to any one of exemplary claims 22 to 23 wherein each of the first and second light assemblies comprises at least two multimedia interfaces along the primary light path, each of the at least two multimedia interfaces having an angle of refraction that is greater than an angle of incidence for light passing through that multimedia interface.

Exemplary Claim 26: The lighted mirror apparatus according to any one of exemplary claims 22 to 25 further comprising: each of the first and second light assemblies comprising a front surface that forms an exposed front surface of the lighted mirror apparatus; and wherein each of the first and second light assemblies is configured to generate the light along a first portion of the primary light path and to emit the light from the exposed front surface along a final portion of the primary light path, wherein a net refraction angle exists between the first and final portions of the primary light path that is at least 20 degrees.

Exemplary Claim 27: The lighted mirror apparatus according to any one of exemplary claims 22 to 26 further comprising: each of the first and second light assemblies further comprising a lens portion having: a lens light input surface configured to: (i) receive the light traveling along the primary light path at an angle of incidence ($\Phi_2$); and (ii) refract and emit the light through the lens portion along the primary light path at an angle of refraction ($\Psi_2$); and a lens light output surface configured to: (i) receive the light traveling through the lens portion along the primary light path at an angle of incidence ($\Phi_3$); and (ii) refract and emit the light from the lens light output surface along the primary light path at an angle of refraction ($\Psi_3$); wherein the following equation is satisfied: $\Phi_2-\Psi_2<\Psi_3-\Phi_3$.

Exemplary Claim 28: The lighted mirror apparatus according to exemplary claim 27 wherein, for each of the first and second light assemblies, the lens portion has a thickness measured from the lens light input surface to the lens light output surface in a direction parallel to the center plane; and wherein the thickness of the lens portion decreases with increasing distance from the center plane.

Exemplary Claim 29: The lighted mirror apparatus according to any one of exemplary claims 27 to 28 wherein, for each of the first and second light assemblies, $\Phi_2$ is less than or equal to 10 degrees.

Exemplary Claim 30: The lighted mirror apparatus according to any one of exemplary claims 27 to 29 wherein, for each of the first and second light assemblies, the lens light output surface is a planar surface that is oriented substantially parallel to the mirror surface.

Exemplary Claim 31: The lighted mirror apparatus according to claim 30 wherein, for each of the first and second light assemblies, the lens light output surface is a planar surface that is substantially coplanar with the mirror surface.

Exemplary Claim 32: The lighted mirror apparatus according to any one of exemplary claims 22 to 31 wherein each of the first and second light assemblies further comprises: a light guide plate having a major inner surface, a major outer surface, a front edge surface that extends between the major inner and major outer surfaces, and a rear edge surface opposite the front edge surface that extends between the major inner and major outer surfaces; the front edge surface being a beveled edge surface that is configured to: (i) receive the light traveling through the light guide plate along the primary light path at an angle of incidence ($\Phi_1$); and (ii) refract and emit the light from the front edge surface along the primary light path at an angle of refraction ($\Psi_1$); wherein $\Psi_1 > \Phi_1$.

Exemplary Claim 33: The lighted mirror apparatus according to exemplary claim 32 wherein each of the first and second light assemblies comprises a reflector member having a reflective surface adjacent to and opposing the major inner surface of the light guide plate.

Exemplary Claim 34: The lighted mirror apparatus according to exemplary claim 33 wherein, for each of the first and second light assemblies, a gap exists between the reflective surface and the major inner surface of the light guide plate; the gap having a width measured parallel to the mirror surface; and wherein for a front portion of the reflective surface, the width of the gap increases in size with decreasing distance from a front edge of the reflective surface.

Exemplary Claim 35: The lighted mirror apparatus according to any one of exemplary claims 32 to 34 wherein, for each of the first and second light assemblies, the light guide plate is configured to emit: (1) a first percentage of the light traveling through the light guide plate from the light guide plate via the major outer surface; and (2) a second percentage of the light traveling through the light guide plate from the light guide plate via the light output surface, the second percentage being greater than the first percentage.

Exemplary Claim 36: The lighted mirror apparatus according to any one of exemplary claims 32 to 35 wherein the beveled edge surface defines a first interface reference plane that intersects the center plane at an outwardly and rearwardly facing first acute angle ($\theta_1$).

Exemplary Claim 37: A lighted mirror apparatus comprising: a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane, each of the first and second light assemblies comprising a lens portion comprising: a lens light input surface configured to: (i) receive the light traveling along the primary light path at an angle of incidence ($\Phi_2$); and (ii) refract and emit the light through the lens portion along the primary light path at an angle of refraction ($\Psi_2$); and a lens light output surface configured to: (i) receive the light traveling through the lens portion along the primary light path at an angle of incidence ($\Phi_3$); and (ii) refract and emit the light from the lens light output surface along the primary light path at an angle of refraction ($\Psi_3$); wherein the following equation is satisfied: $\Phi_2 - \Psi_2 < \Psi_3 - \Phi_3$.

Exemplary Claim 38: The lighted mirror apparatus according to exemplary claim 37 wherein, for each of the first and second light assemblies, $\Phi_2 > \Psi_2$ and $\Psi_3 > \Phi_3$.

Exemplary Claim 39: The lighted mirror apparatus according to any one of exemplary claims 37 to 38 wherein the lens light output surface is substantially parallel to the mirror plane.

Exemplary Claim 40: The lighted mirror apparatus according to exemplary claim 39 wherein the lens light output surface is substantially coplanar with the mirror plane.

Exemplary Claim 41: The lighted mirror apparatus according to any one of exemplary claims 37 to 40 wherein, each of the first and second light assemblies further comprise: a cover member formed of a light transmissive material, the cover member comprising: an outer sidewall having an outer surface that forms an exposed side surface of the lighted mirror apparatus; and a front wall that comprises the lens portion, the lens light output surface being a front surface of the front wall that forms an exposed front surface of the lighted mirror apparatus.

Exemplary Claim 42: The lighted mirror apparatus according to exemplary claim 41 wherein, for each of the first and second light assemblies, the cover member further comprises an inner sidewall, and the front wall comprises a first lip portion that protrudes outwardly beyond the outer sidewall and a second lip portion that protrudes inwardly beyond the inner sidewall.

Exemplary Claim 43: The lighted mirror apparatus according to any one of exemplary claims 41 to 42 further comprising: each of the first and second light assemblies further comprising: an internal cavity formed at least in part by the cover member; a light source positioned within the internal cavity and configured to generate the light; and a light guide plate positioned within the internal cavity and optically coupled to the light source, the light guide plate comprising a major inner surface, a major outer surface opposing the outer sidewall of the cover member, and a beveled front edge surface that extends between the major inner and major outer surfaces and is configured to refract light exiting the front edge surface of the light guide plate toward the light input surface of the lens portion along the primary light path.

Exemplary Claim 44: The lighted mirror apparatus according to exemplary claim 43 wherein each of the first and second light guide assemblies is configured to emit: (1) a first percentage of the light traveling through the light guide plate from the light guide plate via the major outer surface; and (2) a second percentage of the light traveling through the light guide plate from the light guide plate via the front edge surface, the second percentage being greater than the first percentage.

Exemplary Claim 45: The lighted mirror apparatus according to exemplary claim 44 wherein each of the first and second light assemblies further comprises a light diffuser sheet having: a first portion positioned between the front edge surface of the light guide plate and the lens light input surface of the lens portion; and a second portion positioned between major outer surface of the light guide plate and the outer sidewall of the cover member.

Exemplary Claim 46: The lighted mirror apparatus according to any one of exemplary claims 43 to 45 wherein each of the first and second light assemblies further comprises a reflector member having a reflective surface adjacent to and opposing the major inner surface of the light guide plate.

Exemplary Claim 47: The lighted mirror apparatus according to exemplary claim 46 wherein, for each of the first and second light assemblies: a gap exists between the reflective surface and the major inner surface of the light guide plate; the gap having a width measured parallel to the mirror surface; and wherein for a front portion of the reflective surface, the width of the gap increases in size with decreasing distance from a front edge of the reflective surface.

Exemplary Claim 48: The lighted mirror apparatus according to any one of exemplary claims 37 to 47 wherein, for each of the first and second light assemblies, the lens portion has a thickness measured from the lens light input surface to the lens light output surface in a direction parallel to the center plane; and wherein the thickness of the lens portion decreases with increasing distance from the center plane.

Exemplary Claim 49: The lighted mirror apparatus according to any one of claims 37 to 48 wherein, for each of the first and second light assemblies, $\Phi_2$ is less than or equal to 10 degrees.

Exemplary Claim 50: A lighted mirror apparatus comprising: a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane, each of the first and second light assemblies comprising: a light source configured to generate light; a light guide member optically coupled to the light source to receive the light generated by the light source and transmit the light through the light guide member; a reflective surface adjacent to and opposing an inner surface of the light guide member; and a gap between at least a front portion of the reflective surface and the inner surface of the light guide member, the gap having a width that increases in size with decreasing distance from a front edge of the reflective surface.

Exemplary Claim 51: The lighted mirror apparatus according to exemplary claim 50 wherein, for each of the first and second light guide assemblies, the width of the gap is measured parallel to the mirror plane.

Exemplary Claim 52: The lighted mirror apparatus according to any one of exemplary claims 50 to 51 wherein, for each of the first and second light guide assemblies, the gap extends between a rear portion of the reflective surface and the inner surface of the light guide member, the width of the gap being substantially constant between the rear portion of the reflective surface and the inner surface of the light guide member.

Exemplary Claim 53: The lighted mirror apparatus according to any one of exemplary claims 50 to 52 wherein, for each of the first and second light assemblies, the front portion of the reflective surface is a convex surface that curves away from the inner surface of the light guide member.

Exemplary Claim 54: The lighted mirror apparatus according to any one of exemplary claims 50 to 53 wherein, for each of the first and second light assemblies, the light guide plate member forward beyond the front edge of the reflective surface.

Exemplary Claim 55: The lighted mirror apparatus according to any one of exemplary claims 50 to 54 wherein, for each of the first and second light assemblies, the light guide member is a light guide plate in which the inner surface of the light guide member is a major inner surface of the light guide plate, the light guide plate further comprising a major outer surface, and a front edge surface extending between the major inner and major outer surfaces.

Exemplary Claim 56: The lighted mirror apparatus according to exemplary claim 55 wherein, for each of the first and second light assemblies, the front edge surface of the light guide plate is a beveled edge surface.

Exemplary Claim 57: The lighted mirror apparatus according to any one of exemplary claims 55 to 56 wherein, for each of the first and second light assemblies, both the major inner surface and the major outer surface of the lights guide plate are substantially planar surfaces that are substantially parallel to the center plane.

Exemplary Claim 58: The lighted mirror apparatus according to any one of exemplary claims 55 to 57 wherein, for each of the first and second light assemblies, the light guide plate is configured to emit: (1) a first percentage of the light entering the light guide plate from the major outer surface; and (2) a second percentage of the light entering the light guide plate from the front edge surface, the second percentage being greater than the first percentage.

Exemplary Claim 59: A lighted mirror apparatus comprising: a support structure; a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane, each of the first and second light assemblies configured to generate light and emit the light from the first and second light assemblies along a final portion of a primary light path, the final portion of the primary light path: (1) exiting the first and second light assemblies a first distance (D1) from the center plane; and (2) forming an emission angle ($\theta_M$) with the mirror plane, wherein $\theta_M$ and D1 are selected such that tan $(\theta_M) \times D1 = 15$ to 30 inches.

Exemplary Claim 60: A lighted mirror apparatus comprising: a mirror having a front surface defining a mirror plane, a centerline, a center plane that is orthogonal to and intersects the mirror plane along the centerline, and at least one mirror edge; and at least one light assembly mounted to the mirror and comprising: a light source for generating light; and an illumination element comprising a front light emitting surface, the illumination element optically coupled to the light source and configured to transmit the light and emit at least a portion of the light from the front light emitting surface; and the illumination element positioned so that: (1) the front light emitting surface is adjacent to and extends along the at least one mirror edge; (2) the front light emitting surface protrudes outward from the at least one mirror edge in a direction away from the center plane; and (3) the front light emitting surface protrudes outward from the mirror plane in a forward direction.

Exemplary Claim 61: The lighted mirror apparatus according to exemplary claim 60 wherein the illumination element comprises a multi-layer panel comprising: a diffusive light guide layer; and an optically clear cover layer that comprises the front light emitting surface.

Exemplary Claim 62: The lighted mirror apparatus according to exemplary claim 61 wherein the diffusive light guide layer comprises an optically clear body and light diffusive elements embedded in the optically clear body.

Exemplary Claim 63: The lighted mirror apparatus according to any one of exemplary claims 61 to 62 wherein the multi-layer panel is a coextruded multi-layer panel.

Exemplary Claim 64: The lighted mirror apparatus according to any one of exemplary claims 61 to 63 wherein the multi-layer panel has an arcuate transverse cross-sectional profile.

Exemplary Claim 65: The lighted mirror apparatus according to any one of exemplary claims 61 to 64 wherein the light source is positioned behind the mirror and inward from the at least one mirror edge; and wherein a portion of the diffusive light guide layer extends behind the mirror and terminates in a light input edge adjacent the light source.

Exemplary Claim 66: The lighted mirror apparatus according to exemplary claim 65 wherein the optically clear cover layer terminates in a proximal edge adjacent the at least one mirror edge.

Exemplary Claim 67: The lighted mirror apparatus according to any one of exemplary claims 61 to 66 wherein the optically clear cover layer wraps around a distal edge of the diffusive light guide layer.

Exemplary Claim 68: The lighted mirror apparatus according to any one of exemplary claims 61 to 67 wherein the multi-layer panel further comprises a reflective layer, the diffusive light guide layer located between the reflective layer and the optically clear cover layer.

Exemplary Claim 69: The lighted mirror apparatus according to exemplary claim 68 wherein the reflective layer comprises a reflective surface adjacent a rear surface of the diffusive light guide layer; and wherein the reflective surface is a curved surface in a direction orthogonal to the center plane, the reflective surface having a radius of curvature that increases with distance from the center plane.

Exemplary Claim 70: The lighted mirror apparatus according to any one of exemplary clams 59 to 69 wherein the light source is positioned behind the mirror and inward from the at least one mirror edge.

Exemplary Claim 71: The lighted mirror apparatus according to any one of exemplary claims 60 to 70 wherein each individual layer of the multi-layer panel has an arcuate transverse cross-sectional profile.

Exemplary Claim 72: The lighted mirror apparatus according to any one of claims 59 to 71 wherein an inner portion of the front light emitting surface is substantially flush with an edge portion of the front surface of the mirror.

Exemplary Claim 73: The lighted mirror apparatus according to any one of claims 59 to 72 wherein the front light emitting surface is a curved surface in a direction orthogonal to the center plane.

Exemplary Claim 74: The lighted mirror apparatus according to claim 73 wherein the front light emitting surface has a radius of curvature that increases with distance from the center plane.

Exemplary Claim 75: The lighted mirror apparatus according to any one of claims 59 to 74 wherein the at least one light assembly is mounted directly to the mirror.

Exemplary Claim 76: The lighted mirror apparatus according to any one of exemplary claims 59 to 74 further comprising a chassis mounted to the mirror, and the at least one light assembly is mounted to the chassis.

Exemplary Claim 77: The lighted mirror apparatus according to any one of claims 59 to 76 further comprising: the at least one mirror edge comprising a first side mirror edge and a second side mirror edge opposite the first side mirror edge; the at least one assembly comprising: a first one of the light assembly mounted to the mirror along the first side mirror edge; and a second one of the light assembly mounted to the mirror along the second side mirror edge.

Exemplary Claim 78: The lighted mirror apparatus according to claim exemplary claim 77 wherein the first one of the light assembly extends along an entire length of the first side mirror edge and the second one of the light assembly extends along an entire length of the second side mirror edge.

Exemplary Claim 79: The lighted mirror apparatus according to any one of exemplary claims 59 to 78 wherein the light source is configured to output the light in a direction outward from the center plane; and wherein the illumination element is configured to redirect at least a portion of the light being emitted from the front light emitting surface in a direction toward the center plane through reflection, refraction, diffusion, or combinations thereof.

Exemplary Claim 80: A lighted mirror apparatus comprising: a mirror having a front surface and at least one mirror edge; and at least one light assembly mounted to the mirror along the mirror edge and comprising: an illumination element comprising an extruded panel comprising a front light emitting surface and a light receiving edge; a light source for generating light, the light source optically coupled to the light receiving edge of the extruded panel; and the extruded panel configured to receive the light from the light source, transmit the light, and emit at least a portion of the light from the front light emitting surface.

Exemplary Claim 81: A lighted mirror apparatus comprising: a mirror having a front surface and at least one mirror edge; and at least one light assembly mounted to the mirror along the mirror edge and comprising: an illumination element comprising a multi-layer panel, the multi-layer panel comprising: a light receiving edge; a diffusive light guide layer; and an optically clear cover layer that comprises a front light emitting surface of the illumination element; and a light source for generating light, the light source optically coupled to the light receiving edge of the multi-layer panel; the multi-layer panel configured to receive the light from the light source, transmit the light, and emit at least a portion of the light from the front light emitting surface.

Exemplary Claim 82: A method of forming a lighted mirror apparatus, the method comprising: a) extruding an illumination element comprising a front light emitting surface and a light receiving edge; and b) mounting the illumination element along a mirror edge of a mirror, the light receiving edge of the illumination element optically coupled to a light source mounted to the mirror.

Exemplary Claim 83: The method according to exemplary claim 82 wherein step a) comprises: a-1) extruding the illumination element; and a-2) cutting the illumination element to a desired axial length that corresponds to a length of the mirror edge.

Exemplary Claim 84: The method according to any one of exemplary claims 82 to 83 wherein the illumination element is a multi-layer panel comprising a diffusive light guide layer; and an optically clear cover layer; and wherein step a) comprises coextruding the optically clear cover layer and the diffusive light guide layer to form the illumination element.

Exemplary Claim 85: The method according to any one of claims 82 to 84 wherein the multi-layer panel further comprises a reflective layer; and wherein step a) comprises coextruding the optically clear cover layer, the diffusive light guide layer, and the reflective layer to form the illumination element so that the diffusive light guide layer is located between the reflective layer and the optically clear cover layer.

Exemplary Claim 86: The method according to any one of exemplary claims 82 to 85 wherein each of the layers of the illumination element is formed of a plastic.

Exemplary Claim 87: The method according to exemplary claim 86 wherein the plastics of the layers are selected so that chemical bonding occurs between adjacent ones of the layers during the coextrusion.

Exemplary Claim 88: The method according to any one of exemplary claims 82 to 87 wherein step b) comprises adhering the illumination element to a rear surface of the mirror.

Exemplary Claim 89: The method according to exemplary claim 88 wherein step b) further comprises: b-1) applying an adhesive material to at least one of a portion of the rear surface of the mirror or to a portion of a front surface of the illumination element; and b-2) pressing the portion of the rear surface of the mirror and the portion of the front surface of the illumination element together.

Exemplary Claim 90: The method according to exemplary claim 89 wherein the adhesive material is a two-sided adhesive tape.

Exemplary Claim 91: The method according to claim 89 wherein the adhesive material is a fluidic adhesive composition.

Exemplary Claim 92: The method according to any one of exemplary claims 82 to 91 wherein step b) further comprises: b-1) mounting the light source to a portion of a chassis; and b-2) mounting a portion of the chassis to the rear surface of the mirror.

Exemplary Claim 93: The method according to any one of exemplary claims 82 to 92 wherein step b) further comprises: b-1) mounting the light source to a first portion of a chassis; b-2) mounting the illumination element to a second portion of the chassis, thereby forming a light unit; and b-3) mounting the light unit to the rear surface of the mirror so that the illumination element extends along and protrudes outward from the mirror edge of the mirror and the light source is behind the mirror.

Exemplary Claim 94: A lighted mirror apparatus comprising: a mirror having a front surface defining a mirror plane, a centerline, a center plane that is orthogonal to and intersects the mirror plane along the centerline, and at least one mirror edge; and at least one light assembly mounted to the mirror and comprising: a light source for generating light; and an illumination element comprising a front light emitting surface, the illumination element optically coupled to the light source and configured to transmit the light and emit at least a portion of the light from the front light emitting surface; and the illumination element positioned so that: (1) the front light emitting surface is adjacent to and extends along the at least one mirror edge; and (2) the front light emitting surface protrudes outward from the at least one mirror edge in a direction away from the center plane; wherein the illumination element comprises a multi-layer panel comprising a diffusive light guide layer, and an optically clear cover layer that comprises the front light emitting surface.

Exemplary Claim 95: A cabinet comprising: a housing defining a storage compartment having a front opening; a door mounted to the housing by at least one hinge, the hinge comprising a first hinge portion coupled to the housing and a second hinge portion coupled to the door, the first hinge portion pivotably coupled to the second hinge portion so that the door can be pivoted about a door axis between a closed angular orientation and an open angular orientation; and one of the first or second hinge portions fixedly coupled to the door or the housing, the other one of the first or second hinge portions slidably coupled to the door or the housing to allow the door to be axially translated relative to the housing between a fully-lowered state and a fully-raised state; and wherein when the door is in the fully-lowered state and the closed angular orientation, the door covers the entirety of the front opening.

Exemplary Claim 96: The cabinet according to exemplary claim 95 wherein the door can be altered between the open angular orientation and the closed angular orientation in both of the fully-lowered state and the fully-raised state.

Exemplary Claim 97: The cabinet according to any one of exemplary claims 95 to 96 further comprising: a counterweight operably coupled to the door; the first hinge portion coupled to a first sidewall of the housing; and the first sidewall comprising a counterweight track, the counterweight operably mated with the counterweight track so that the counterweight can axially translate along the counterweight track while being transversely retained by the counterweight track.

Exemplary Claim 98: The cabinet according to claim 97 further comprising a counterweight cord having a first end coupled to the counterweight and a second end coupled to the first hinge portion.

Exemplary Claim 99: The cabinet according to any one of exemplary claims 95 to 98 wherein the first hinge portion is slidably coupled to the first sidewall of the housing and the second hinge portion is fixedly coupled to the door.

Exemplary Claim 100: The cabinet according to exemplary claim 99 further comprising: the first sidewall of the housing comprising a first through-slot; wherein the first hinge portion comprises an inner hinge portion located adjacent an inner surface of the first sidewall, an outer hinge portion located adjacent an outer surface of the first sidewall, and a hinge boss extending through the first through-slot; and the inner hinge portion, the outer hinge portion, and the hinge boss fixedly coupled to one another so that the hinge can axially translate along the first through-slot while remaining mounted to the first sidewall.

Exemplary Claim 101: The cabinet according to exemplary claim 100 further comprising: the first sidewall comprising a hinge track on the outer surface of the first sidewall; the outer hinge portion operably mated with the hinge track so that the outer hinge portion can axially translate along the hinge track while being transversely retained by the hinge track.

Exemplary Claim 102: The cabinet according to any one of claims exemplary claims 100 to 101, wherein the outer hinge portion comprises an upwardly extending tab to which an end of a counterweight cord is coupled.

Exemplary Claim 103: The cabinet according to any one of exemplary claims 95 to 102 wherein the housing comprises a rear wall configured to be mounted to a support structure, the first sidewall, a second sidewall opposite the first sidewall, a floor, and a ceiling opposite the floor.

Exemplary Claim 104: The cabinet according to any one of claims 95 to 103 further comprising a ledge mounted to a lower end of the door and protruding from a front surface of the door, the ledge comprising at least one of: (1) a depth of at least one inch; (2) a width that is less than a width of the door; and (3) a retention element for preventing objects from sliding off an upper surface of the ledge.

Exemplary Claim 105: The cabinet according to claim 104 wherein the width of the ledge is less than the width of the door.

Exemplary Claim 106: The cabinet according to any one of exemplary claims 95 to 105 further comprising: wherein when the door is in the closed angular orientation and the fully-raised state, the door covers an upper portion of the front opening and leaves a lower portion of the front opening unobstructed by the door to allow access to a lower portion of the storage compartment; and wherein when the door is in the open angular orientation, the entirety of the front opening is unobstructed by the door.

Exemplary Claim 107: The cabinet according to any one of claims 95 to 106 comprising a pair of the hinges.

Exemplary Claim 108: The cabinet according to any one of exemplary claims 95 to 107 wherein the door comprises a mirror and a plurality of shelves mounted to the housing in the storage compartment.

Exemplary Claim 109: A cabinet comprising: a housing defining a storage compartment having a front opening; and a door mounted to the housing by a mounting unit, the mounting unit configured to: (1) allow the door to be pivoted relative to the housing about a door pivot axis between a closed angular orientation and an open angular orientation; and (2) allow the door to be axially translated between a fully-lowered state and a fully-raised state.

Exemplary Claim 110: The cabinet according to exemplary claim 109 wherein the mounting unit comprises at least one hinge, the hinge comprising a first hinge portion slidably coupled to the housing and a second hinge portion fixedly coupled to the door, the first hinge portion pivotably coupled to the second hinge portion so that the door can be pivoted about the door pivot axis between the closed angular orientation and the open angular orientation.

Exemplary Claim 111: The cabinet according to exemplary claim 109 wherein the mounting unit comprises at least one hinge, the hinge comprising a first hinge portion fixedly coupled to the housing and a second hinge portion slidably coupled to the door, the first hinge portion pivotably coupled to the second hinge portion so that the door can be pivoted about the door pivot axis between the closed angular orientation and the open angular orientation.

Exemplary Claim 112: The cabinet according to exemplary claim 109 wherein the mounting unit comprises a hinge post mounted to the housing and at least one hinge portion fixedly coupled to the door; and wherein the hinge portion is pivotably coupled to the hinge post so that the door can be pivoted about the door pivot axis between the closed angular orientation and the open angular orientation; and wherein the hinge portion is slidably coupled to the hinge post so that the door can be axially translated between the fully-lowered state and the fully-raised state.

Exemplary Claim 113: The cabinet according to claim 109 wherein the mounting unit comprises a hinge post mounted to the door and a body having a receiving bore on the housing; and wherein the hinge post slidably nests within the receiving bore, thereby pivotably coupling the door to the housing and allowing axial movement of the door relative to the housing.

Exemplary Claim 114: A cabinet comprising: a housing comprising a rear wall, a first sidewall, a second sidewall opposite the first sidewall, a floor, and a ceiling opposite the floor that collectively define a storage compartment having a front opening, the front opening opposite the rear wall; a door mounted to the housing so that the door can be translated relative to the housing between a fully-lowered state and a fully-raised state; and a counterweight mounted to the first sidewall and operably coupled to the door.

Exemplary Claim 115: The cabinet according to exemplary claim 114 wherein the first sidewall comprises a counterweight track, the counterweight operably mated with the counterweight track so that the counterweight can axially translate along the counterweight track while being transversely retained by the counterweight track.

Exemplary Claim 116: The cabinet according to exemplary claim 115 further comprising: a counterweight cord having a first end coupled to the counterweight and a second end coupled to the door.

Exemplary Claim 117: The cabinet according to any one of exemplary claims 114 to 116 further comprising: at least one hinge, the hinge pivotably mounting the door to the housing so that the door can be pivoted about a door axis between a closed angular orientation and an open angular orientation; and wherein the door can be altered between the open angular orientation and the closed angular orientation in both of the fully-lowered state, the fully-raised state, and all positions between the fully-lowered state and the fully-raised state.

Exemplary Claim 118: The cabinet according to exemplary claim 117 further comprising: the first sidewall comprising a hinge track; and the hinge operably mated with the hinge track so that the hinge can axially translate along the hinge track while being transversely retained by the hinge track.

Exemplary Claim 119: The cabinet according to any one of exemplary claims 117 to 118 further comprising: the hinge comprising a first hinge portion coupled to the housing and a second hinge portion coupled to the door, the first and second hinge portions pivotably coupled to one another; the first sidewall of the housing comprising a first through-slot; the first hinge portion comprising an inner hinge portion located adjacent an inner surface of the first sidewall, an outer hinge portion located adjacent an outer surface of the first sidewall, and a hinge boss extending through the first through-slot; and the inner hinge portion, the outer hinge portion, and the hinge boss fixedly coupled to one another so that the hinge can axially translate along the first through-slot while remaining mounted to the first sidewall.

Exemplary Claim 120: The cabinet according to exemplary claim 119 wherein the outer hinge portion comprises an upwardly extending tab to which the second end of the counterweight cord is coupled.

Exemplary Claim 121: The cabinet according to any one of exemplary claims 114 to 120 wherein the first sidewall is an integrally formed singular panel component comprising a main panel body, a counterweight track, and a hinge track.

Exemplary Claim 122: A cabinet comprising: a housing defining a storage compartment having a front opening; a door mounted to the housing; and a ledge mounted to a lower end of the door and protruding from a front surface of the door, the ledge comprising at least one of: (1) a depth of at least one inch; (2) a width that is less than a width of the door; and (3) a retention element for preventing objects from sliding off an upper surface of the ledge.

Exemplary Claim 123: The cabinet according to exemplary claim 122 wherein the width of the ledge is less than the width of the door.

Exemplary Claim 124: The cabinet according to exemplary claim 123 wherein the width of the ledge is in a range of eight inches to ten inches.

Exemplary Claim 125: The cabinet according to any one of claims 123 to 124 wherein the width of the ledge is less than one-half the width of the door.

Exemplary Claim 126: The cabinet according to any one of exemplary claims 122 to 125 wherein the depth of the ledge is at least one inch.

Exemplary Claim 127: The cabinet according to any one of exemplary claims 122 to 126 wherein the ledge comprises the retention element.

Exemplary Claim 128: The cabinet according to claim 127 wherein the retention element is selected from a group consisting of a groove, a lip, an adhesive, and a roughened surface.

Exemplary Claim 129: The cabinet according to any one of exemplary claims 122 to 128 wherein the door is mounted to the housing so that the door can be translated relative to the housing between a fully-lowered state in which the door covers the entirety of the front opening and a fully-raised state in which a lower portion of the storage compartment is unobstructed by the door.

Exemplary Claim 130: The cabinet according to any one of exemplary claims 122 to 128 wherein the door is mounted to the housing so that the door can be pivoted about a door axis between a closed angular orientation and an open angular orientation.

Exemplary Claim 131: A method of forming a combined mirror and electronic display viewing assembly, the method comprising: a) positioning an electronic device having a display screen on a ledge coupled to a mirrored door of a cabinet in an upright orientation, the ledge protruding beyond a front surface of the mirrored door, the mirrored door mounted to a housing so that the mirrored door can be translated relative to the housing between a fully-lowered state in which the mirrored door covers the entirety of a front opening of the housing and a raised state in which a lower portion of a storage compartment of the housing is unobstructed by the door; and wherein when the mirrored door is moved between the raised and fully-lowered states, the ledge moves with the mirrored door.

Exemplary Claim 132: The method according to claim 131 further comprising: b) positioning the mirrored door in the raised state and operably coupling a first end of an electrical cord to the electronic device and a second end of the electrical cord to an electrical port located within the lower portion of the storage compartment.

Exemplary Claim 133: The method according to claim 132 further comprising: c) lowering the mirrored door from the raised state to the fully-lowered sate, the electrical cord passing through a gap between the mirrored door and the housing; and wherein during step c), the mirrored door travels in a vertical plane and remains in a fully-closed pivotable orientation relative to the housing.

Exemplary Claim 134: The method according to exemplary claim 133 wherein the gap is formed between an edge of a floor of the housing and an inner surface of the mirrored door.

Exemplary Claim 135: The method according to exemplary claim 133 wherein the gap is formed by a notch in the floor of the housing.

Exemplary Claim 136: The method according to any one of exemplary claims 133 to 135 wherein in the upright orientation, an edge of the electronic device rests on the ledge and electronic device leans against the front surface of the mirrored door.

Exemplary Claim 137: The method according to claim 136 wherein the ledge comprises a retention element, the retention element engaging the edge of the electronic device to prevent the edge of the electronic device from sliding along an upper surface of the ledge away from the front surface of the mirrored door.

What is claimed is:

1. A lighted mirror apparatus comprising:
a mirror in a viewing state, the mirror having a front surface defining a mirror plane and a centerline, a center plane being orthogonal to and intersecting the mirror plane along the centerline;
a first light assembly positioned along a first side of the mirror; and
a second light assembly positioned along a second side of the mirror that is opposite the first side of the mirror;
each of the first and second light assemblies configured to generate light and transmit the light to the center plane along a primary light path, each of the first and second light assemblies comprising:
a light source configured to generate light;
a light guide member comprising a light output surface, the light output surface defining a first interface reference plane that intersects the center plane at an outwardly and rearwardly facing first acute angle ($\theta_1$);

the light source optically coupled to the light guide member so that the light is guided through the light guide member to the light output surface along a first portion of the primary light path, the first portion of the primary light path forming a first angle of incidence ($\Phi 1$) with the light output surface; and the light output surface being part of a first multimedia interface that is configured to refract the light exiting the light output surface of the light guide member at a first angle of refraction ($\Psi_1$) along a second portion of the primary light path, wherein the first angle of refraction ($\Psi_1$) is greater than the first angle of incidence ($\Phi_1$).

2. The lighted mirror apparatus according to claim 1 further comprising:

each of the first and second light assemblies further comprising an internal cavity formed at least in part by a cover member in which the light guide member is positioned, the cover member comprising a lens portion having:

a lens light input surface being part of a second multimedia interface, the second multimedia interface configured to: (i) receive the light traveling along second portion of the primary light path at a second angle of incidence ($\Phi_2$); and (ii) refract the light passing through the second multimedia interface at a second angle of refraction ($\Psi_2$) so that the light travels through the lens portion along a third portion of the primary light path; and a lens light output surface being part of a third multimedia interface, the third multimedia interface configured to: (i) receive the light traveling along the third portion of the primary light path at a third angle of incidence ($\Phi_3$); and (ii) refract the light exiting the lens light output surface at a third angle of refraction ($\Psi_3$) along a fourth portion of the primary light path; and wherein the following equation is satisfied: $\Phi_2 - \Psi_2 < \Psi_3 - \Phi_3$.

3. The lighted mirror apparatus according to claim 1 further comprising:

the second portion of the primary light path lies along a first refracted light reference plane;

each of the first and second light assemblies further comprising a cover member having an internal cavity in which the light guide member is positioned, the cover member comprising a lens portion having:

a lens light input surface being part of a second multimedia interface that defines a second interface reference plane; and a lens light output surface being part of a third multimedia interface that defines a third interface reference plane;

wherein the first refracted light reference plane intersects:
(i) the second interface reference plane to form an outwardly-rearwardly facing second angle ($\theta 2$); and (ii) the third interface reference plane to form an outwardly-rearwardly facing third angle ($\theta 3$), the second and third angles being corresponding angles; and wherein $\theta_3 < \theta_2$.

4. The lighted mirror apparatus according to claim 2 wherein, for each of the first and second light assemblies, the lens portion of the cover member has a thickness measured from the lens light input surface to the lens light output surface in a direction parallel to the center plane; and wherein the thickness of the lens portion decreases with increasing distance from the center plane.

5. The lighted mirror apparatus according to claim 2 wherein, for each of the first and second light assemblies, $\Phi_2$ is less than or equal to 10 degrees.

6. The lighted mirror apparatus according to claim 2 wherein, for each of the first and second light assemblies, the lens light output surface of the cover member is a planar surface that is oriented substantially parallel to the mirror surface.

7. The lighted mirror apparatus according to claim 6 wherein, for each of the first and second light assemblies, the lens light output surface of the cover member is substantially coplanar with the mirror surface.

8. The lighted mirror apparatus according to claim 2 wherein, for each of the first and second light assemblies, the cover member is formed of a light transmissive material.

9. The lighted mirror apparatus according to claim 2 wherein the lens light output surface of the cover member of each of the first and second light assemblies forms a portion of the front surface of the lighted mirror apparatus that extends the height of the mirror.

10. The lighted mirror apparatus according to claim 2 further comprising, for each of the first and second light assemblies, a light diffuser sheet having an arcuate portion positioned between the light output surface of the light guide member and the lens light input surface of the lens portion of the cover member.

11. A lighted mirror apparatus comprising:

a support structure;

a mirror mounted to the support structure in a viewing state, the mirror having a front surface defining a mirror plane and a centerline, a center plane being orthogonal to and intersecting the mirror plane along the centerline; and first and second light assemblies mounted to the support structure on opposite sides of the mirror and on opposite sides of the center plane;

each of the first and second light assemblies configured to generate light and refract a primary light path of the light toward center plane multiple times, wherein each of the first and second light assemblies is configured to refract the primary light path away from the center plane at least once, each of the first and second light assemblies further comprising an internal cavity formed at least in part by a cover member in which a light guide member is positioned, the light guided member having a light output surface being part of a first multimedia interface;

the cover member comprising a lens portion having:

a lens light input surface being part of a second multimedia interface, the second multimedia interface configured to: (i) receive the light traveling along second portion of the primary light path at a second angle of incidence ($\Phi_2$); and (ii) refract the light passing through the second multimedia interface at a second angle of refraction ($\Psi_2$) so that the light travels through the lens portion along a third portion of the primary light path; and a lens light output surface being part of a third multimedia interface, the third multimedia interface configured to: (i) receive the light traveling along the third portion of the primary light path at a third angle of incidence ($\Phi_3$); and (ii) refract the light exiting the lens light output surface at a third angle of refraction ($\Psi_3$) along a fourth portion of the primary light path; and wherein the following equation is satisfied: $\Phi_2-\Psi_2<\Psi_3-\Phi_3$.

12. The lighted mirror apparatus according to claim 11 further comprising:
each of the first and second light assemblies comprising a front surface that forms an exposed front surface of the lighted mirror apparatus; and
wherein each of the first and second light assemblies is configured to generate the light along a first portion of the primary light path and to emit the light from the exposed front surface along a final portion of the primary light path, wherein a net refraction angle exists between the first and final portions of the primary light path that is at least 20 degrees.

13. The lighted mirror apparatus according to claim 11 wherein, for each of the first and second light assemblies, the lens portion has a thickness measured from the lens light input surface to the lens light output surface in a direction parallel to the center plane; and wherein the thickness of the lens portion decreases with increasing distance from the center plane.

14. The lighted mirror apparatus according to claim 11 wherein, for each of the first and second light assemblies, $\Phi_2$ is less than or equal to 10 degrees.

15. A lighted mirror apparatus comprising:
a support structure;
a mirror mounted to the support structure in a viewing state, the mirror having a front surface defining a mirror plane and a centerline, a center plane being orthogonal to and intersecting the mirror plane along the centerline; and
first and second light assemblies mounted to the support structure on opposite sides of the mirror and on opposite sides of the center plane, each of the first and second light assemblies comprising an internal cavity formed by a cover member in which a light guide member is positioned, the cover member comprising a lens portion comprising:
a lens light input surface configured to: (i) receive the light traveling along the primary light path at an angle of incidence ($\Phi_2$); and (ii) refract and emit the light through the lens portion along the primary light path at an angle of refraction ($\Psi_2$); and
a lens light output surface configured to: (i) receive the light traveling through the lens portion along the primary light path at an angle of incidence ($\Phi_3$); and (ii) refract and emit the light from the lens light output surface along the primary light path at an angle of refraction ($\Psi_3$);
wherein the following equation is satisfied: $\Phi_2-\Psi_2<\Psi_3-\Phi_3$.

16. The lighted mirror apparatus according to claim 15 wherein, for each of the first and second light assemblies, $\Phi_2>\Psi_2$ and $\Psi_3>\Phi_3$.

* * * * *